(12) United States Patent  
Kagarlis

(10) Patent No.: US 7,389,210 B2  
(45) Date of Patent: *Jun. 17, 2008

(54) MOVEMENT OF AN AUTONOMOUS ENTITY THROUGH AN ENVIRONMENT

(75) Inventor: Marios Kagarlis, Monaco (MC)

(73) Assignee: The Maia Institute (MC)

( * ) Notice: Subject to any disclaimer, the term of this patent is extended or adjusted under 35 U.S.C. 154(b) by 0 days.

This patent is subject to a terminal disclaimer.

(21) Appl. No.: 10/526,878

(22) PCT Filed: Sep. 9, 2003

(86) PCT No.: PCT/EP03/50616

§ 371 (c)(1), (2), (4) Date: Mar. 9, 2005

(87) PCT Pub. No.: WO2004/023347

PCT Pub. Date: Mar. 18, 2004

(65) Prior Publication Data

US 2005/0261886 A1    Nov. 24, 2005

(51) Int. Cl.  
*G06F 7/60* (2006.01)

(52) U.S. Cl. .......................................................... 703/2

(58) Field of Classification Search ................ 703/2  
See application file for complete search history.

(56) References Cited

U.S. PATENT DOCUMENTS

| 5,206,569 A | 4/1993 | Ozawa ................. 318/568.12 |
| 5,402,050 A | 3/1995 | Ozawa ................. 318/568.12 |
| 5,416,393 A | 5/1995 | Gomi et al. ........... 318/568.12 |
| 6,459,955 B1 | 10/2002 | Bartsch et al. ............. 700/245 |
| 6,611,738 B2 | 8/2003 | Ruffner ....................... 701/23 |
| 6,842,692 B2 | 1/2005 | Fehr et al. ................... 701/200 |
| 2002/0062207 A1 | 5/2002 | Faghri ........................... 703/8 |
| 2003/0139849 A1 | 7/2003 | Kuroki et al. ............... 700/245 |

OTHER PUBLICATIONS

Smith; Evacuation Networks; pp. 1-9; Citeseer; 1998.*  
Goldenstein et al., "Scalable Dynamical Systems for Multi-Agent Steering and Simulation," *Proceedings of the 2001 IEEE International Conference on Robotics & Automation*, South Korea, May 21-26, 2001, pp. 3973-3980.  
Hosoi, et al., "Dynamical Model of a Pedestrian in a Crowd," *IEEE International Workshop on Robot and Human Communication*, Tsukuba, Japan, Nov. 11-14, 1996, pp. 44-49.  
Helbing et al., "Social force model for pedestrian dynamics," *Physical Review E.*, vol. 51, No. 5, May 1995, pp. 4282-4286.  
R. Hosoi et al., "Dynamical model of a pedestrian in a crowd", Robot and Human Communication, 5th IEEE International Workshop on Tsukuba, Nov. 11, 1996, pp. 44-49, XP010212810.

(Continued)

*Primary Examiner*—Hugh Jones  
(74) *Attorney, Agent, or Firm*—Nixon & Vanderhye P.C.

(57) ABSTRACT

A method of determining a path of an autonomous entity through an environment, the method comprising providing a provisional path through a model of the environment from a current location to an intended destination, providing a profile for said autonomous entity, determining a preferred step towards said intended destination based upon said profile and said provisional path, determining a personal space around said autonomous entity and determining whether said preferred step is feasible by considering whether obstructions infringe said personal space.

47 Claims, 31 Drawing Sheets

OTHER PUBLICATIONS

D. Helbing et al., "Social force model for pedestrian dynamics", Phys. Rev. E, Stat, Phys, Plasmas Fluids Relat. Interdiscip. Top., Physical Review E (Statistical Physics, Plasmas, Fluids, and Related Interdisciplinary Topics), May 1995, vol. 51, No. 5, Pt. A, May 1995, pp. 4282-4286, XP002277054.

S. Goldstein et al., "Scalable dynamical systems for multi-agent steering and simulation", Proceedings of the 2001 IEEE International Conference on Robotics and Automation., Proceedings of the IEEE International Conference on Robotics and Automation, vol. 1 of 4, May 21, 2001, pp. 3973-3980, XP010550757.

* cited by examiner

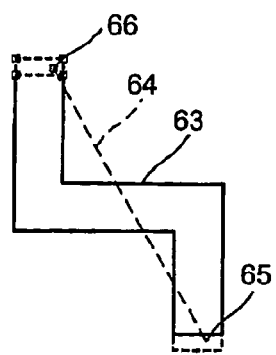
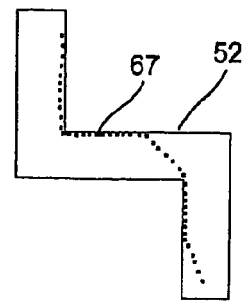
Fig. 30  Fig. 31
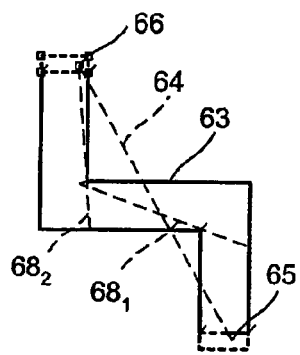
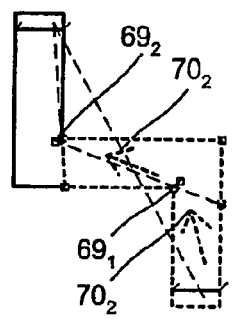
Fig. 32  Fig. 33
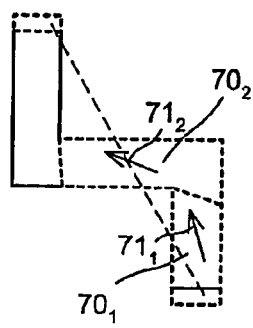
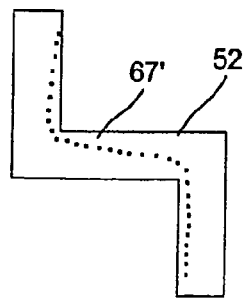
Fig. 34  Fig. 35

MOVEMENT OF AN AUTONOMOUS ENTITY THROUGH AN ENVIRONMENT

This application is the U.S. national phase of international application PCT/EP2003/050616 filed 9 Sep. 2003 which designated the U.S. and claims priority of U.S. Ser. No. 10/237,178, filed 9 Sep. 2002,the entire contents of each which are hereby incorporated by reference.

FIELD OF THE INVENTION

The present invention relates to a method of simulating movement of an autonomous entity through an environment, for particular but not exclusive use in a method of modelling pedestrian crowd movement.

BACKGROUND ART

A physical system may be considered as a collection of individual constituents interacting with each other and their surroundings. The constituents, usually referred to as "agents", may be characterized by several attributes and modes of interaction.

Systems may or may not be self-contained and such systems are usually referred to as being "closed" and "open" respectively. Furthermore, if the interactions between agents are sufficiently complicated, then the system is said to be "complex". Moreover, if agents are endowed with a feedback mechanism for perceiving and reacting to signals and thus adjust their behaviour or interaction mechanisms, then they are said to be "adaptive".

A system comprising many interacting agents is commonly referred to as a "multi-agent complex system". One example of such a system is a pedestrian crowd.

A multi-agent complex system may be considered from two different points of view. Either one may consider the collective patterns that characterize the system in its entirety or one may focus on interaction mechanisms at the level of each individual constituent. These approaches are referred to as "macroscopic" and "microscopic" formulations respectively.

It is known to use a macroscopic model to describe a pedestrian crowd as a quasi-uniform medium, such as a fluid, without regard to individual constituents. It is typically low-resolution and results in only rough estimates of bulk measures, such as flows and densities, under certain conditions. Thus, it treats a pedestrian crowd as a quasi-uniform continuous fluid rather than interacting individuals.

Such a model is best suited to situations involving large spaces and large, uniform crowds, where there are no rapid variations in conditions, little change in the landscape and little variety in the purpose and function of the environment. Under these conditions, a macroscopic model may provide a reasonable estimate of the densities and flows.

An example of a macroscopic model is given in "Forecasting the Flow of People" by K. Ando, H. Ota and T. Oki, Railway Research Review, volume 45, page 8 (1988).

However, a macroscopic model is poorly suited to situations involving multi-directional flows and varied pedestrian profiles, where there are complicated geometries, rich in structure, and where there is a multitude of rapidly changing conditions. Under these conditions, macroscopic models may be misleading and lead to erroneous conclusions.

Despite this drawback, many methods of modelling pedestrian movement, including those used to set safety standards for buildings and spaces, use macroscopic approaches.

In contrast, microscopic models address the behavior of individual agents.

Microscopic models, such as Cellular Automata and other heuristic rule-based models, use ad-hoc parameterizations based on arbitrary probabilistic and statistical rules. These models are higher-resolution in that they consider individual agents and short-range variations in conditions. They also exhibit dynamic and emergent behavior. Nevertheless, they have several drawbacks. They tend to rely on having a homogeneous space and identical individuals. They are also difficult to calibrate and validate and are also erratic and unreliable. In fact, microscopic models which cannot be calibrated using empirically measured data are of questionable utility for practical applications and predictions. Thus, although qualitatively plausible, they are not suited to practical applications. At best they are used for illustrative purposes only.

Attempts have been made to formulate better microscopic models and an example is described in "Simulating dynamical features of escape panic" by Dirk Helbing, Illés Farakas and Tamás Vicsek, Nature, volume 407, pages 487 to 490 (2000). However, these models are applied to a specific set of circumstances which allow simplification.

It is desirable to develop a method of simulating movement of an autonomous entity through an environment for use in a method of modelling pedestrian crowd movement which can allow for design challenges such as non-uniform spaces, a variety of user profiles, a multitude of agent choices, dynamic changes in environment and chance events.

The method can be used for designing venues, troubleshooting flow problems, operational management, setting and implementing safety standards and quality control.

SUMMARY OF THE INVENTION

The present invention seeks to provide a method of simulating movement of an autonomous entity through an environment.

According to the present invention there is provided a method of simulating movement of an autonomous entity through an environment, the method comprising providing a provisional path through a model of the environment from a current location to an intended destination, providing a profile for said autonomous entity, determining a preferred step towards said intended destination based upon said profile and said provisional path, determining a personal space around said autonomous entity, determining whether said preferred step is feasible by considering whether obstructions infringe said personal space.

This has the advantage of providing a more accurate simulation of movement.

If the preferred step is not feasible, then the method may further comprise determining a region in which to seek a compromise step and determining whether at least one compromise step is feasible.

This has the advantage that it reduces the computational effort needed to determine a compromise step.

The method may comprise choosing one of a plurality of compromise steps. The method may comprise determining said region includes adapting within said region in dependence upon at least one locally perceivable condition. The determining of the region may include adapting within said region in dependence upon memory of past conditions. The determining of the personal space may comprise defining a region in which absence of obstructions is sought. Obstructions may include other autonomous entities and fixed obstructions. The determining of the preferred step may comprise determining a first dissatisfaction function comprising a sum of an inconvenience function and a frustration function. The method may comprise determining the inconvenience function. The provisional path may include a direction from said current location to said intended destination and the profile includes a preferred step length, and wherein the determining of the inconvenience function and may include determining a fist amount of work required to take a step of given step length and determining a second amount of work which is a proportion of said first amount of work corresponding to a component which is not directed in said optimal direction. The determining of the inconvenience function may include determining an acceleration associated with a change in velocity between said step and a previous step and determining a third amount of work required to produce said acceleration. The determining of the inconvenience function may include summing said second and third amounts of work. The method may include determining the frustration function. The profile may include a preferred walking speed and the determining of the frustration function may comprise determining a preferred instantaneous walking speed by adding said preferred walking speed to a value of walking speed noise and determining a fourth amount of work dependent upon a difference between the walking speed and the preferred instantaneous walking speed. The determining of the preferred step may comprise minimising said first dissatisfaction in respect of step length, minimising said first dissatisfaction in respect of step orientation thereby to obtain a preferred step length and a preferred step orientation. The determining whether said preferred step is feasible may comprise determining whether there is any discomfort arising from the entity having to keep a distance less than a preferred distance from an obstruction. The method may comprise determining if there is discomfort arising from the entity having to keep a distance less than a preferred distance from an obstruction.

The method may comprise providing a preferred clearance tolerance for said entity; and determining a personal space around said entity in dependence upon said clearance tolerance. The method may comprise determining a density of neighbouring entities and determining said personal space around said entity in dependence upon said clearance tolerance and said density of neighbouring entities. The method may comprise providing information relating to velocity of said entity; and determining an angular dependency for said personal space in dependence upon said velocity. The considering whether obstructions infringe said personal space may comprise determining whether said personal space is infringed at a first position along said preferred step and determining whether said personal space is infringed at a second position along said preferred step. The considering whether obstructions infringe said personal space may further comprise determining whether said personal space is infringed at a third position along said preferred step. If the preferred step is not feasible, then the method may further comprise determining a region in which to seek a compromise step. The determining of said region may comprise determining an arc and may include determining upper and lower angular limits and determining a radius of said arc.

The method may comprise providing a set of attributes for said autonomous entity in dependence upon said profile. The determining of said set of attributes may comprise determining at least one attribute at time of generating said entity.

The method may comprise modifying at least one attribute of said set of attributes for said autonomous entity.

Providing the profile for said autonomous entity may comprise basing the profile on a set of measured attributes. Providing the profile for said autonomous entity may comprise statistically assigning said profile. Providing the profile for said autonomous entity may comprise providing the profile in dependence upon at least one aspect of said environment. Providing the provisional path through said model of the environment from the current location to the intended destination may comprise determining a bearing from the current location to the intended destination.

According to the present invention there is also provided a method of simulating movement of an autonomous entity through an environment, the method comprising providing a preferred clearance tolerance for said entity and determining a personal space around said entity in dependence upon said clearance tolerance. The personal space may be anisotropic.

The method may comprise determining a density of neighbouring entities and determining said personal space around said entity in dependence upon said clearance tolerance said density of neighbouring entities. The method may comprise providing information relating to velocity of said entity and determining an angular dependency for said personal space in dependence upon said velocity.

According to the present invention there is also provided a method of designing a building structure, the method comprising providing a model of said building structure, simulating movement of at least one entity through said building structure, the simulating of said movement of said at least one entity comprises providing a provisional path through a model of the environment from a current location to an intended destination, providing a profile for said autonomous entity, determining a preferred step towards said intended destination based upon said profile and said provisional path, determining a personal space around said autonomous entity and determining whether said preferred step is feasible by considering whether obstructions infringe said personal space and revising said model of said building structure in dependence upon movement of said at least one entity.

The building structure may be a building, such as a house, office block or railway station, an outside space for people, such as a sports stadium, or a mixture of both. The building structure may be a portion of a building or a portion of an outside space. The building structure may be passenger ship or aircraft. The building structure may be an open structure which is marked, for example with arrows and lines.

According to the present invention there is also provided a method of controlling movement of an entity through an environment, the method comprising providing a provisional path through a model of the environment from a current location to an intended destination, providing a profile for said autonomous entity, determining a preferred step towards said intended destination based upon said profile and said provisional path, determining a personal space around said autonomous entity, determining whether said preferred step is feasible by considering whether obstructions infringe said personal space.

According to the present invention there is still further provided a method of determining a path of an autonomous entity through an environment, the method comprising providing a provisional path through a model of the environment from a current location to an intended destination and selecting a step towards said intended destination while minimising deviation from said provisional path. Minimising deviation from the provisional path may also be expressed as trying to keep to the provisional path.

The method may comprise additionally or alternatively determining said step towards said intended destination while minimising deviation from a preferred speed. The method may comprise additionally or alternatively selecting said step towards said intended destination while maintaining at least a minimum distance from obstacles.

According to the present invention there is further provided a method of simulating movement of an autonomous entity through an environment from a current location to an intended destination, the method comprising defining a neighbourhood, scanning said neighbourhood for obstacles, determining at least one condition relating to said obstacles and defining an area in which to seek a step towards said destination in dependence upon said at least one condition.

Determining said at least one condition relating to said obstacles may comprise determining a density of one type of obstacle, such as another entity appearing to be heading in an opposite direction to the entity.

According to the present invention there is provided a computer program for performing the method.

According to the present invention there is also provided a computer-readable medium storing the computer program.

According to the present invention there is also provided apparatus for performing the method.

According to the present invention there is also provided apparatus for simulating movement of an autonomous entity through an environment, the apparatus comprising means for providing a provisional path through a model of the environment from a current location to an intended destination, means for providing a profile for said autonomous entity, means for determining a preferred step towards said intended destination based upon said profile and said provisional path, means for determining a personal space around said autonomous entity, means for determining whether said preferred step is feasible by considering whether obstructions infringe said personal space.

According to the present invention there is still further provided apparatus for simulating movement of an autonomous entity through an environment, the apparatus comprising an interface for providing a provisional path through a model of the environment from a current location to an intended destination, an interface for providing a profile for said autonomous entity, a processor for determining a preferred step towards said intended destination based upon said profile and said provisional path, a processor for determining a personal space around said autonomous entity, a processor for determining whether said preferred step is feasible by considering whether obstructions infringe said personal space.

BRIEF DESCRIPTION OF THE DRAWINGS

An embodiment of the present invention will now be described, by way of example, with reference to the accompanying drawings in which:

FIG. 30 shows linking of an entrance to an exit;
FIG. 31 shows results of a simulator;
FIG. 32 shows another computer-aided design (CAD) plot of a corridor;
FIG. 33 shows a corridor divided into focal drift zones;
FIG. 34 shows a corridor divided into focal drift zones and preferred orientation;
FIG. 35 shows results of a simulator.

DETAILED DESCRIPTION OF THE INVENTION

A method of simulating movement of an autonomous entity through an environment according to the present invention is described which is suitable for use modelling pedestrian crowd movement. Thus, in this context, the terms "agent", "entity" and "pedestrian" may be used interchangeably.

Motion of a Pedestrian

Navigating from a current position to an intended destination may be considered as involving two aspects, namely long-range, quasi-static navigation and short-range, dynamic navigation. These are hereinafter referred to as "macro-navigation" and "micro-navigation" respectively.

Navigation: Macro-Navigation

Figure 1:
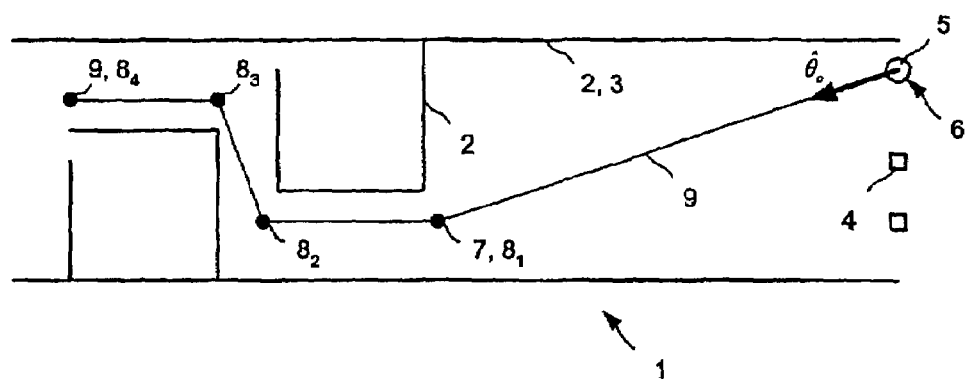
FIG. 1 is a plan view of a vacant venue.

Referring to FIG. 1, a vacant venue 1 is shown as an architectural plan of the geometry and positions of walls 2, corridors 3 and fixed obstacles 4.

The walls 2, corridors 3 and fixed obstacles 4 do not change position over time and so they constitute static attributes of the environment. Static features may also include slow-moving obstacles, which are stationary over a timescale of approximately one step, i.e. quasi-static obstacles. For example, a stationary group of people may be treated as a fixed obstacle. Static features may also include moveable obstacles that are temporarily stationary, such as a barrier or door. Static information is employed to define a compass to indicate an apparent general direction en route to the ultimate destination.

A pedestrian 5 standing at a current location 6, in this case an entrance to the venue, usually aims himself or herself at an intended destination 7, such as an exit, by virtue of being familiar with the venue or by consulting a map or sign. In doing so, the pedestrian 5 selects a general direction of travel, which is called the "original direction". The original direction may be maintained if the intended destination 7 is directly accessible from the current location 6. Alternatively, the original direction may be successively updated whenever an intermediate landmark $8_1$, $8_2$, $8_3$ is reached, for example when an ultimate destination 9 is invisible or inaccessible from the current location 6. Thus, progress to an ultimate destination 9 comprises updating the pedestrian's current location 6 and, when an intermediate intended destination 7 is reached, setting a new intermediate intended destination, for example fixed on a new landmark $8_1$, $8_2$, $8_3$.

The process of selecting a general direction on the basis of long-range quasi-static information, such as the geometry of a venue and the presence of large fixed obstacles, is referred to as "macro-navigation".

Macro-navigation supplies a sequence of such intended intermediate destinations, starting from an entrance to ending at an exit or other final destination. The sequence may be supplied all at once, on entry to the venue, or one at a time, dynamically en route. Macro-navigation supplies an orientation angle $\theta_o$ to a current intermediate intended destination from any point accessible from within the interior of a venue and at all times.

Macro-navigation may be "hard-wired", implemented heuristically or using a sophisticated algorithm. For example, if macro-navigation is "hard-wired", a venue is divided into zones and an intended orientation is provided for each zone. An example using zones is described later.

In an embodiment of the present invention, a rough approximation of an optimal path 9 is determined using a spatial objective, i.e. the ultimate intended destination, in conjunction with the geometry of the venue 1. The rough approximation of the optimal path serves as a compass indicating an intended orientation. The rough approximation of the optimal path 9 is also referred to as a provisional path.

For example, an optimal path 9 in relation to the geometry of the venue may be considered as a sequence of straight line segments taking the pedestrian from an entry point, around corners and obstacles, through intermediate intended destinations 7 or decision points, to the a final destination.

Thus, macro-navigation supplies an optimal path to a lowest order on the basis of a pedestrian's current position, intended destination and any static or quasi-static elements of the geometry of a venue. Macro-navigation does not take into account any preferences and attributes of each individual or dynamical considerations and is, therefore, subject to adjustments and corrections.

Navigation: Micro-Navigation

Figure 2:
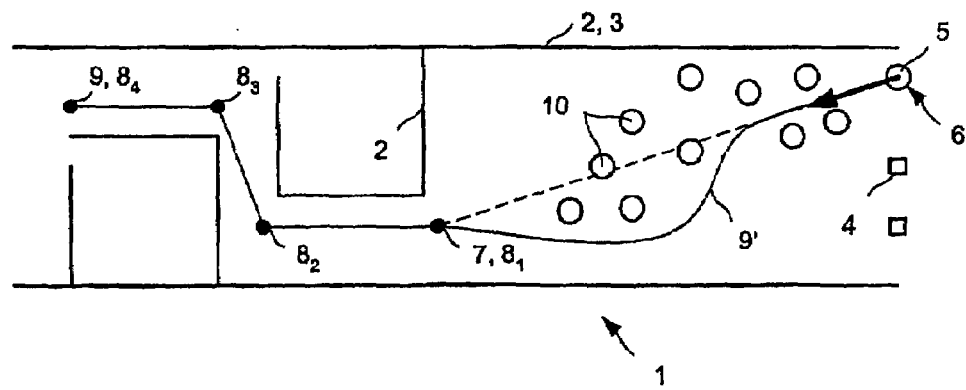
FIG. 2 is a schematic diagram of a venue filled with pedestrians.

Referring to FIG. 2, the vacant venue 1 is now filled with other pedestrians 10 and is subject to dynamic events.

A busy railway station, for example, may include large numbers of arriving and departing pedestrians which are moving in different directions, waiting or queuing. Planned events may occur, such as scheduled arrivals and departures of trains. Also, chance events, for example arrival of delayed trains, may occur.

The pedestrian 5 needs to modify its route to avoid other pedestrians 10 and the process of adjusting and correcting for short-range, dynamic interactions is referred to as "micro-navigation". This results in a modified route 9'. This is described in more detail later.

Discretisation

Figure 3:
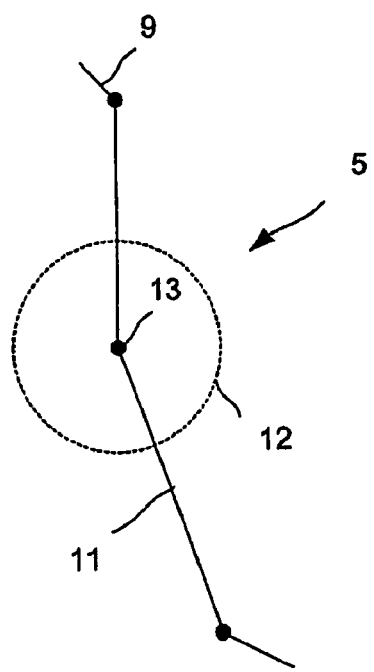
FIG. 3 is a simplified plan view of a pedestrian and his or her path.

Referring to FIG. 3, a simplified plan view of the pedestrian 5 is shown.

The pedestrian 5 advances in whole steps 11, each of duration $\Delta t$. Thus, if a previous step $j-1$ began at time $t_{j-1}$, then the previous step ends and a current step $j$ starts at $t_j = t_{j-1} + \Delta t$. Similarly, the current step ends and a subsequent step begins at $t_{j+1} = t_j + \Delta t$.

Walking is a complicated process. Therefore, the process is simplified by making some assumptions.

The effect of pedestrian "zigzagging" may be eliminated or reduced by choosing the centre of the pedestrian's head 12 to represent the position 13 of the pedestrian. This is because the pedestrian's head 12 lies, on average, approximately half way between the two feet in two successive steps. Any residual zigzagging between steps is attributable to spurious noise or intentional changes of direction.

Variations in the walking speed may be assumed to be exclusively due to variations in the step length rather than variations in the step duration Walking is a non-linear process. Each foot is successively raised, then placed in contact with the ground so as to apply traction for locomotion. Over the course of any one step non-constant forces are exerted that result in irregular acceleration patterns and complicated speed dependencies. Nevertheless, uniform acceleration is assumed. This is a reasonable assumption provided that the duration of a step $\Delta t$ is kept small. In this case, the duration of a step for an adult is set as 600 ms, i.e. $\Delta t=0.6$ s.

Thus, the pedestrian 5 may be described in terms of three independent variables, namely:

$$\vec{r}_{j-1,j,j+1} \qquad (1a, 1b, 1c)$$
$$\vec{v}_j = \frac{\vec{r}_{j+1} - \vec{r}_j}{\Delta t}$$
$$\vec{a}_j = \frac{\vec{v}_j - \vec{v}_{j-1}}{\Delta t} = \frac{\vec{r}_{j+1} - 2\vec{r}_j + \vec{r}_{j-1}}{\Delta t^2}$$

where $\vec{r}$ is position, $\vec{v}$ is velocity, $\vec{a}$ is acceleration and t is time.

Thus, a series or sequence of steps, represented by line segments 11 each of duration $\Delta t$, form the path 9.

Preferred Speed

An unhurried pedestrian walking on a level surface without any obstacles in sight has a preferred walking speed $v_0$. Preferred walking speed may also be known as "natural walking gait".

Values of preferred speed may be experimentally determined for different populations in different circumstances, such as different venues, surfaces, inclines etc.

There is a linear relationship between speed v and step length l. Thus, variations in pedestrian speed for fixed step duration may be attributed to variations in step length. Therefore, a preferred step length $l_0$ may be defined as:

$$l_0 = v_0 \Delta t \quad (2)$$

Step length $l_0$ may also be expressed as half a stride interval.

A value of preferred speed is randomly drawn from a preferred speed continuous probability distribution. This usually occurs only once per entity when the entity is generated. However, further value of preferred speed may be drawn or existing values modified according to changes in environment.

The preferred speed continuous probability distribution is included in a profile and is derived from a statistical analysis of measured values of preferred walking speed for a large number of pedestrians over many steps. A profile includes one or more continuous distribution functions for one or more corresponding attributes, such as preferred speed, which characterise a particular type or "species" of pedestrian.

To a lowest order, step length variability may be approximated by noise or spontaneous random fluctuations. Thus, fluctuations in the step length may be represented as fluctuations in preferred speed. Experiments may be used to measure these variations and thus determine probability distributions.

Thus, a spontaneous preferred-speed noise may be defined as:

$$\delta v_0 = \alpha_n \Delta t \quad (3)$$

where $\alpha_n$ is a spontaneous value of acceleration.

A value of $\delta v_0$ (or $\alpha_n$) is drawn from a spontaneous preferred-speed probability distribution also comprised in the profile. However, unlike preferred speed, a value of spontaneous preferred-speed noise is usually drawn once per entity per step.

Micro-Navigation

A macro-navigation module supplies a provisional path for taking a pedestrian from an entry point through a venue to his final destination. The provisional path is corrected and adjusted to account for individual pedestrian preferences.

As explained earlier, at each point in time a pedestrian need only know the next intermediate destination point, such as a corner or obstacle, and not necessarily the final destination which may only be determinable at a later decision point. It does not matter whether the full optimal path is available from the outset or only the current leg leading up to the next intermediate destination. Once the lowest-order optimal path is available, at least up to the next intermediate destination or decision point, pedestrians or entities invoke micro-navigation.

The micro-navigation process seeks to supply criteria, decision making powers, learning and adaptation faculties that permit an entity to read signals from its surroundings, process these together with the lowest-order optimal path and the knowledge of one's own preferences and attributes so as to deduce a truly optimal path. It also seeks to learn and update memory with up-to-the-moment information, project the intentions of neighbouring entities and negotiate with them and ultimately execute one step so as to stay nearest the true optimal path while at the same time suffering the least harm or degrading in regard to the pedestrians own well-being.

Every optimal step leading to the final destination belongs to the optimal path. Thus, if a pedestrian has their way, as for example in the empty railway station, the process of achieving the ultimate destination would be accomplished by simply following the optimal path, one step at a time, at the pedestrian's preferred speed.

However, the presence of obstacles and/or other entities and impeding external factors beyond one's control, usually render the optimal step non-viable. Thus, a compromise needs to be made. Micro-navigation is concerned with this situation and includes three stages:

In a first stage, the method comprises receiving the provisional path and the entity's preferences and attributes and determining a preferred step. The result of the first stage is a preferred position for the next step.

In a second stage, the method comprises determining a personal space around said entity and determining whether the preferred step is feasible. This comprises determining whether personal space around the entity is infringed by another entity or obstacle at any point during the preferred step. This includes determining whether a projected path of the other entity infringes the entity's personal space. As will be explained in more detail later, personal space is anisotropic and may depend on a number of factors including the velocity of the entity and apparent velocity of neighbouring entities.

If the preferred step is not feasible, the method includes determining a region in which to seek a compromise step. The result of the second stage is an area in proximity to the preferred position in which an alternative position is sought. Another result is knowledge of the local conditions which will facilitate more prudent decision making in the future, as well as adjustment of the entity's own preferences, such as its preferred speed and size of its personal space.

In a third stage, the method comprises determining whether at least one compromise step is feasible within the specified region. As will be explained in more detail, this process comprises minimising a function referred to as "full dissatisfaction" and seeking compromise steps from the least dissatisfying to the most dissatisfying. Any solution constitutes a compromise in that the entity no longer seeks to satisfy his or her original preferences (as in the first stage), but rather strives for degraded, adjusted preferences obtained by the end of the second stage. It may include eliminating candidate solutions due to unavailability, after negotiating with neighbours by cooperating or competing, and evading fixed obstacles. The result of the third stage is a solution for a compromise step. Thereafter, the step may be taken.

This process is iterated, one step at a time, for each entity until it reaches its destination.

Micro-Navigation: Stage I

Figure 4:
FIG. 4 shows a pedestrian taking a step from a previous position to a new position.
Figure 4:
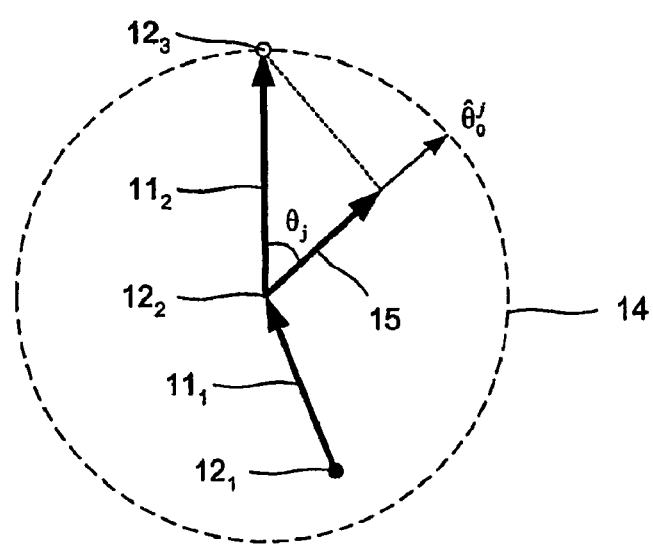

Referring to FIG. 4, the pedestrian completes a step $11_1$ from a previous position $12_1$ to a current position $12_2$, i.e. from $(x_{j-1}, y_{j-1})$ to $(x_j, y_j)$, and is about to embark on his next step $11_2$.

The pedestrian's objective is to reach intended destination 7, i.e. at target coordinates $(x_t, y_t)$. To achieve this, an orientation angle $\theta_0^j$ is provided corresponding to the lowest-order optimal path.

In effect, the pedestrian uses this orientation angle $\hat{\theta}_0^j$ as a tough compass. However, to determine a truly optimal next step, the pedestrian's preferences are taken into account.

To achieve this, a first Action function $J_S$ is determined and minimised. This is executed without considering any external impediments. The first Action function $J_S$ is herein referred to as "self-dissatisfaction". As will be explained later, another Action functional $J_T$ is determined during later stages of micro-navigation which includes external impediments and is referred to as "full dissatisfaction" or simply "dissatisfaction".

The pedestrian may take the next step $11_2$ and move to a new position $12_3$ within a dashed circle 14. There are two degrees of freedom represented by two independent variables, namely length l and direction angle θ of the next step.

Polar coordinates (l,θ) ate used instead of Cartesian coordinates (x,y) as a matter of convenience.

If the pedestrian considers step $11_2$ as a candidate for the next step to a virtual position $12_3$ at $(x_{j+1}, y_{j+1})$, then he or she expends work against friction-like forces in traversing the path, namely:

$$W_f^j = \mu g m l_j \quad (4)$$

where g is gravitational acceleration, m is the mass of the individual pedestrian, μ is a coefficient of friction and $l_j$ is the length of the step actually traversed over time step j. The coefficient of friction induces the work against friction to be proportional to the softness or hardness between the two surfaces of contact, namely the pedestrian's shoes and the floor. A coarse floor results in a larger value of μ, while a polished floor results in a smaller value.

Here, "friction" is taken to encompass all possible friction-like forces depending on the path length and the mass of the moving object. Therefore, μ can be considered more generally as a "coefficient of difficulty". Thus, not only is traversing a coarse floor energetically more costly than traversing a polished floor, i.e. "standard" friction, but also traversing an inclined floor, as opposed to a level floor, will be energetically more expensive. The coefficient is a spatial attribute which can be established empirically by analysing behaviour of pedestrians on different types of floors.

If the pedestrian picks step $11_2$ as the next step, then he or she would end up moving in a direction different from his apparent present intended orientation $\hat{\theta}_0^j$. Working against friction so as to move the pedestrian toward the intended destination 7 is acceptable, but not otherwise. Thus, a component 15 of the path corresponding to the step $11_2$ along the intended direction $\hat{\theta}_0^j$, amounts to the useful path. A component $\Delta W_f^j$ corresponds to wasteful work, namely:

$$\Delta W_f^j = \mu g l_j [1 - \cos(\theta_j - \theta_0^j)] \quad (5)$$

Thus, $\Delta W_f^j$ may be interpreted as one component of perceived inconvenience due to wasteful work against friction induced by deviating from the intended direction over the course of one step.

The previous and current steps $11_1$, $11_2$ may differ in both length l and angle θ. These changes are caused by a force and result in acceleration. For example, a force exerted parallel to the direction of travel may cause acceleration which results in $l_j > l_{j-1}$ or conversely deceleration which results in $l_j < l_{j-1}$. A force exerted perpendicular to the direction of travel results in a change of direction from $\theta_{j-1}$ to $\theta_j$. Thus, equation 1c may be written as:

$$\vec{a}_j = \frac{1}{\Delta t^2} \{(l_j \cos\theta_j - l_{j-1} \cos\theta_{j-1})\hat{x} + (l_j \sin\theta_j - l_{j-1} \sin\theta_{j-1})\hat{y}\} \quad (6)$$

The work $\Delta W_\alpha^j$ expended during step j toward changing direction via a presumed force $\vec{F}_j$ exerted by the pedestrian, associated with acceleration $\vec{a}_j$, may be defined as:

$$\Delta W_\alpha^j = \int \vec{F}_j \cdot \overline{ds}_{j,j-1} = m\vec{a}_j^2 \int_0^{\Delta t} t\, dt \quad (7)$$

$$= \frac{m}{2\Delta t^2}[l_j^2 - 2l_j l_{j-1}\cos(\theta_j - \theta_{j-1}) + l_{j-1}^2]$$

The work $\Delta W_\alpha^j$ may be considered as a second component of inconvenience.

Thus, a total inconvenience, I, associated with perceptions of wasteful effort over the course of a step may be defined as:

$$I(l,\theta) \equiv c_i(\Delta W_f^j + \Delta W_\alpha^j) \quad (8)$$

where coefficient $c_i$ is a context-dependent scaling factor. The scaling factor may be determined by fitting a model to measured data.

So far, the expended work associated with inconvenience may be thought as physical work in a traditional classical mechanical sense.

However, "work" can also be expended in other ways, as we shall now explain.

As we explained earlier, the entity has a velocity that fluctuates about a preferred speed $v_0$ which is an individual attribute of each entity and subject to spontaneous fluctuations $\delta v_j^0$, namely:

$$v_j^0 = v_0 + \delta v_j^0 \quad (9)$$

where $v_0$ is the preferred cruising speed and $\delta v_j^0$ is the spontaneous speed noise for step j. A value of $v_0$ is assigned to each entity and is drawn from a preferred speed distribution function. A value of $\delta v_j^0$ is randomly drawn from a corresponding spontaneous speed noise distribution function for each entity for each step. Thus, $v_j^0$ is an instantaneous preferred speed of an individual pedestrian over step j.

A preferred speed, which is self-imposed, is tantamount to a constraint. Thus, it may be classified as an effective potential energy term, as can be shown by invoking variational techniques. Here, a quadratic energy term is assigned:

$$F_j(l) = c_f \frac{1}{2} m \left(\frac{l_j}{\Delta t} - v_j^0\right)^2 \quad (10)$$

which has a potential minimum when $l_j = v_j^0 \Delta t$, i.e. when the length of the step results in an instantaneous speed equal to the preferred cruising speed.

$F_j$ is referred to as "frustration" and considered as virtual rather than physical, work. It reflects the cost due to differences between the actual instantaneous speed $l_j/\Delta t$ and the desired speed $v_j^0$.

Figure 5:
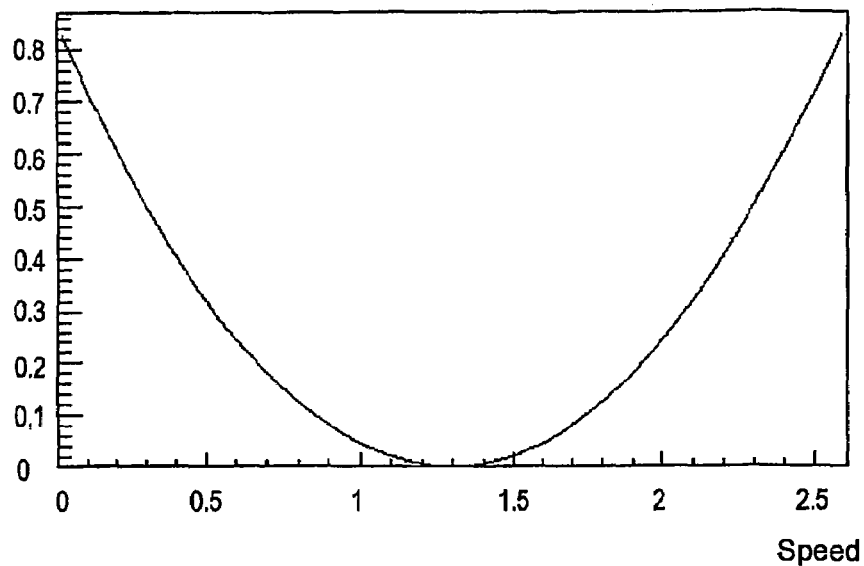
FIG. 5 is a plot of frustration against pedestrian speed.

Referring to FIG. 5, a plot of frustration against instantaneous speed is shown, wherein $v_j^0 = 1.3$ ms$^{-1}$, $c_f = 1$.

The sum of inconvenience and frustration is hereby defined as "self-dissatisfaction", i.e.:

$$\Delta J_S(l,\theta) \equiv I(l,\theta) + F(l) \quad (11)$$

Figure 6:
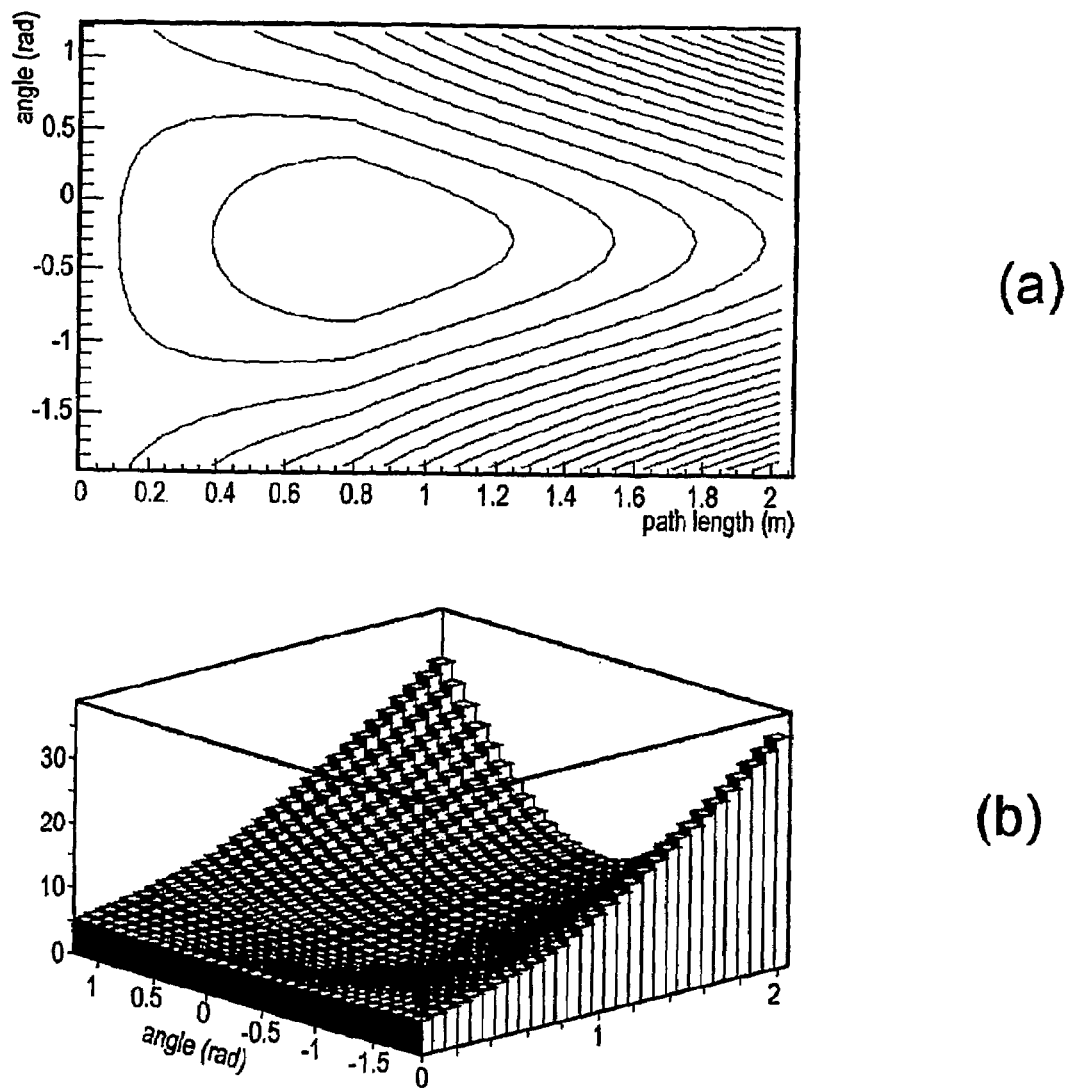
FIGS. 6a and 6b show two- and three-dimensional plots of self-dissatisfaction.

FIGS. 6a and 6b show two- and three-dimensional plots of self-dissatisfaction for initial values $l_{j-1} = 1.0$ m and $\theta_{j-1} = 50°$ and current preferences of $\theta_j^0 = 90°$ and $v_j^0 = 1.3$ ms$^{-1}$.

Self-dissatisfaction is the perceived undesirable cost contrary to physical and physiological traits. It is self-referential and does not take account of external factors.

In this example, equation 11 is derived using the Lagrangian formalism. Following an approach based on variational techniques, equations of motion can be obtained by determining the stationary point of Action by minimizing $\Delta J_S(l,\theta)$ or solving the system of differential equations, namely:

$$\frac{d}{dl}\Delta J_S(l,\theta) = 0 \quad (12)$$

$$\frac{d}{d\theta}\Delta J_S(l,\theta) = 0 \quad (13)$$

The equations of motion may also be obtained by invoking ad-hoc phenomenological forces which lead to an analogous result.

The solution yields the optimal next step, namely:

$$\theta_j^{opt} = \arctan\left[\frac{l_{j-1}\sin\theta_{j-1} + \mu g \Delta t^2 \sin\theta_j^0}{l_{j-1}\cos\theta_{j-1} + \mu g \Delta t^2 \cos\theta_j^0}\right] \quad (14, 15)$$

$$l_{opt}(\theta_j) = \frac{1}{c_i + c_f}[c_f v_j^0 \Delta t - c_i \mu g \Delta t^2 (1 - \cos(\theta_j - \theta_j^0)) + c_i l_{j-1}\cos(\theta_j - \theta_{j-1})]$$

Equation 14 supplies a single value for the optimal orientation angle $\theta_j^{opt}$. Equation 15 expresses the step length as a function of orientation angle. In particular, for any chosen direction $\theta_j$ the optimal path for that angle is given by $l_{opt}(\theta_j)$. The optimal step length is obtained by replacing $\theta_j$ by $\theta_j^{opt}$, so that the set $(\theta_j^{opt}, l_{opt}(\theta_j^{opt}))$ describes the optimal step. The optimal orientation angle $\theta_j^{opt}$ and optimal step length $l_{opt}$ specify the step which the pedestrian would like to take. Thus, they are referred to as the "preferred orientation angle" and "preferred step length" respectively.

The values of $(\theta_j^{opt}, l_{opt}(\theta_j^{opt}))$ are used in the next stage of micro-navigation.

Pedestrian Interactions

The preferred step described by the set of values $(\theta_j^{opt}, l_{opt}(\theta_j^{opt}))$ is achievable in the absence of environmental impediments such as fixed obstacles or other pedestrians which may otherwise prohibit it from being taken. In practice, however, the preferred step usually cannot be taken. This may be because the pedestrian is in a densely populated area or due to fixed obstacles.

As will be described in more detail later, the preferred step is not taken if any point along its length is associated with a non-vanishing value of a function referred to as "discomfort". Discomfort arises as a result of infringement of a subjectively determined area known as personal space.

If the preferred step cannot be taken, then a search is made for an acceptable, feasible compromise step.

Potentially, a search space lies within a circle centred on the pedestrian's current location and having a radius equal to the maximum distance possible over the course of one step. However, it is unusual for a pedestrian to consider taking a step backwards when avoiding other pedestrians and obstacles. Similarly, it is rare that the pedestrian will come to a complete stand still or run at full speed. Thus, many potentially feasible next steps can be immediately eliminated. Thus, acceptable compromise steps are picked from narrower range of angles and step lengths The second stage of micro-navigation comprises establishing criteria for deciding which subset of feasible next steps is worth looking into and applying these criteria to restrict the domain of acceptable solutions from a full circle to a narrow subspace with fixed angular and step-length boundaries.

A second Action function $J_T$ called "dissatisfaction" is used which considers discomfort arising when neighbouring pedestrians and fixed obstacles infringe an entity's personal space.

The interaction of the pedestrian with their surroundings may be considered as competition for space. The pedestrian, by virtue of being a physical object, occupies physical space. At the very least, the area physically available must be sufficient to accommodate the pedestrian's physical space. However, there are also psychological spatial requirements. Pedestrians require personal space, or clearance from their nearest neighbours and obstacles in order to feel comfortable. In dealing with pedestrian interactions, account is taken of both the physical and psychological requirements for personal space. To achieve this additional attributes and preferences for pedestrians are used.

Pedestrians are assigned a set of characteristics including intrinsic attributes, such as physical space requirements, and preferences, such as preferred speed. These characteristics are included in a profile.

As explained earlier, a profile includes one or more continuous distribution functions for one or more corresponding attributes, such as preferred speed, which characterise a particular type or "species" of pedestrian. Each continuous distribution function describes empirically established attributes of real population samples which have been measured and analysed.

Core profiles may include pedestrian attributes based on fundamental criteria such as ethnicity, which may represent physical and cultural differences, venue, which represent contextual differences such as behaviour in a railway station as opposed to a stadium, and sex, which reflect physical differences such as physical space occupied or speed. The assignment of a core profile to an entity is a one-off event, for example when generating an entity in a simulation and subsequently remains the same. Some attributes, such as preferred walking speed are drawn only once when the entity is generated. Other attributes may be repeatedly, randomly drawn, for example every step. Attributes described in core profiles are referred to as "intrinsic" attributes.

Secondary or transient features may also be used. These may include physical space occupied due to the carrying of luggage. These attributes can be assigned to the entity at the same time as the core feature, although they may change one or more times.

One aspect of the second Action function $J_T$, is the introduction of an additional term referred to as "discomfort" which accounts for the perceived reduction of desired personal space due to external impediments. Thus, a spatial area is defined having a specific form and size which the pedestrian attempts to keep clear of fixed obstacles and neighbouring pedestrians. Another aspect is that it may use modified entity attributes, as for example a modified preferred speed adjusted for local circumstances, rather than the value originally drawn from its profile.

Physical Size of a Pedestrian

Figure 7:
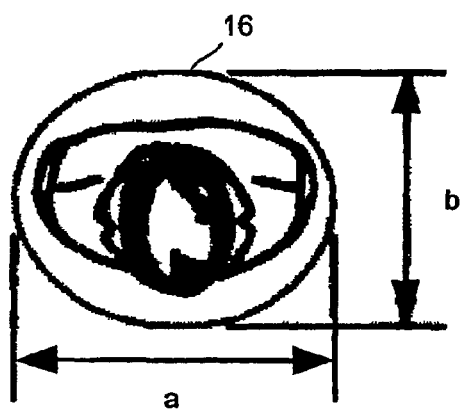
FIG. 7 is a plan view of a pedestrian approximated by an ellipse.

Referring to FIG. 7, a physical form or area 16 that a pedestrian occupies may be approximated by an ellipse. The ellipse 16 is defined in terms of its major and minor axes a, b, which are referred to here as "shoulder breadth" and "body depth" respectively.

Reference is made to "Bodyspace Anthropometry, Ergonomics and the Design of Work" by Stephen Pheasant (2$^{nd}$ Edition, Taylor and Francis, London 1998) which describes numerous population samples selected by ethnicity, sex and age groups. The major and minor axis parameters are drawn from as Gaussian (or normal) distribution or other suitable curves. For a Gaussian representation, four parameters are used to represent each population sample, namely a centroid and a standard deviation of the Gaussian probability distribution curve for each ellipse axis.

Assigning a physical size to an entity is equivalent to attributing suitable values for the shoulder breadth and body depth axes of the ellipse. However, a simpler form can be used, such as a circle, which requires a single parameter, namely radius, and which is easier to manipulate due to its symmetry. This is useful when considering overlap between the pedestrian and other pedestrians and obstacles.

The ratio of major to minor axis is near constant per population sample for the mean, lower (5%) and higher end (95%) of the Gaussian probability distributions supplied. For example, for British men the ratio (b/a) is close to 0.637, wherein a is the shoulder breadth (major axis) and b the body depth (minor axis). Thus, sampling one parameter from its proper distribution function, say the shoulder breadth, the other parameter may be determined by the ratio above.

Whereas the net area of the physical space is important, it appears that there is no sensitivity in the form between an ellipse and a circle of equal area. For densities up to about 9.5 persons per square meter (ppsm), which are extremely high and rate, pedestrians maintain a personal space around them that is larger than their physical space. While this is the case, the area of the physical space is entirely contained within the personal space, i.e. psychological considerations take precedence over physical constraints. Under those circumstances the form of physical space is not important so long as the area is preserved and replacing the elliptical form by a circular one has no noticeable quantitative effect. For extremely high densities, again the net area is more important.

Figure 8:
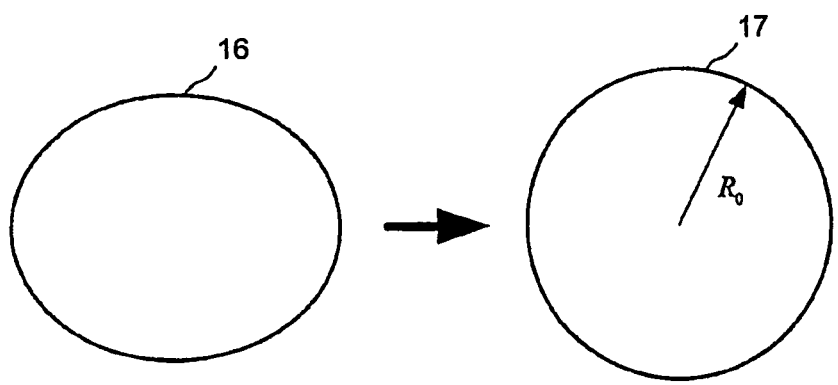
FIG. 8 shows equivalence, in terms of area, of an ellipse and a circle.

Referring to FIG. 8, the physical space occupied by a pedestrian may be approximated by a circle 17 of radius $R_0$, namely:

$$\pi \frac{ab}{4} \approx \pi \langle b/a \rangle \frac{a^2}{4} = \pi R_0^2 \Rightarrow R_0 = \sqrt{\langle b/a \rangle} \frac{a}{2} \quad (16)$$

and <b/a> is the mean value of the ratio of the two axes per population sample. The radius is derived by setting the area of the ellipse equal to the area of the circle.

In summary, population samples selected by ethnicity, sex, age group and other criteria can be described using a Gaussian probability distribution of shoulder breadth and a mean ratio of shoulder breadth to body depth from empirical measurements.

Physical Size of Luggage-Carrying Pedestrians

A frequently encountered transient attribute is the increase in physical size due to the carrying of luggage.

Figure 9:
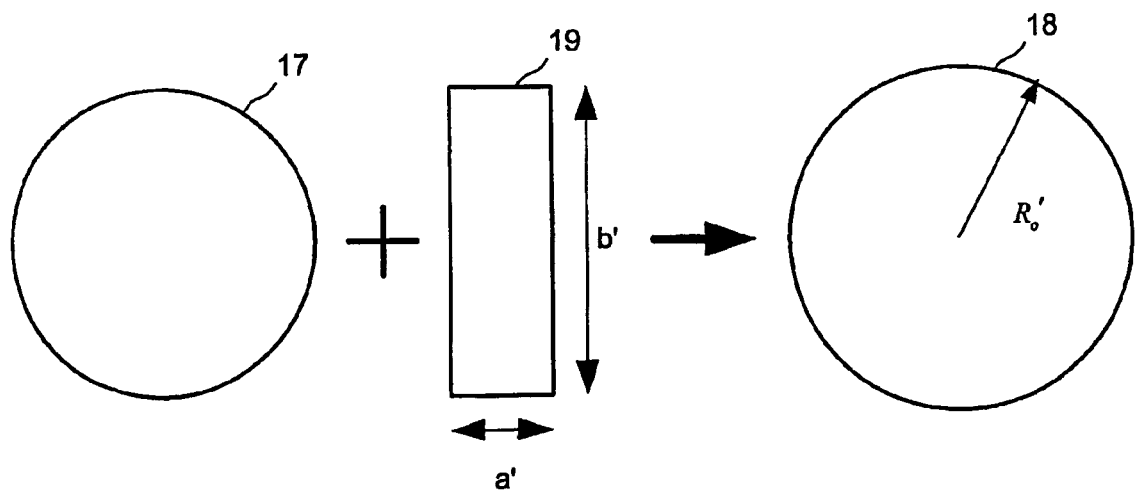
FIG. 9 shows an increase in effective area of a pedestrian due to luggage.

Referring to FIG. 9, an increase in size due to carrying luggage can be absorbed into an extended circle 18 with area equal to the sum of the original entity area 17 and that of the luggage 19.

Thus, if $R_0$ is the entity radius and a',b' are the length and width respectively of a piece of luggage, then the areas occupied by the entity and the luggage are $A=\pi R_0^2$ and $\alpha=a'b'$ respectively. Thus, the effective area is calculated as:

$$A' = A + \alpha \quad (17)$$

and the effective entity radius is determined to be:

$$R_0' = \sqrt{A'/\pi} \quad (18)$$

Figure 10:
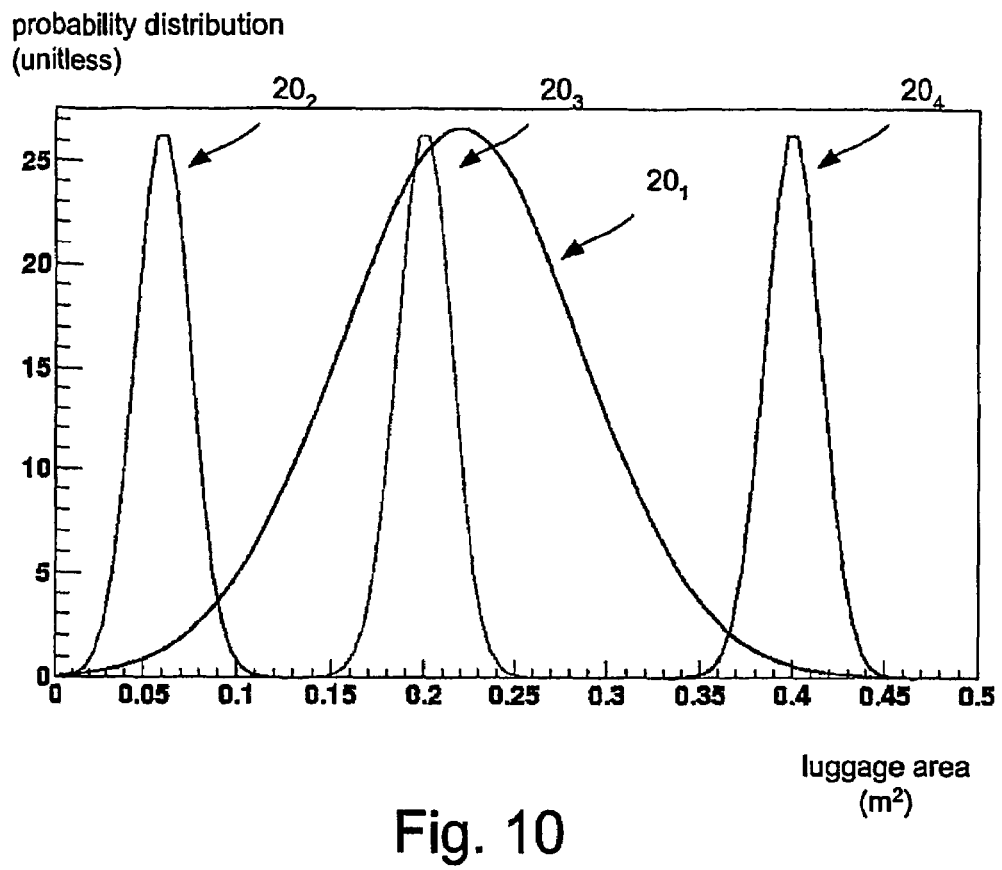
FIG. 10 shows probability distributions used to assign luggage of random sizes.

Referring to FIG. 10, Gaussian distribution functions $20_1$, $20_2$, $20_3$, $20_4$ for assorted, small, medium and large luggage are shown. For example, for small luggage, a mean area may be 0.3 m×0.2 m=0.06 m². For medium and large luggage, mean areas may be 0.7 m×0.3 m=0.21 m² and 1.0 m×0.4 m=0.04 m² respectively. The Gaussian distribution functions $20_1$, $20_2$, $20_3$, $20_4$ are used to assign luggage sizes randomly to designated entities.

Personal Space in Pedestrian Behaviour

Personal space is the area a pedestrian strives to maintain clear of obstacles and other pedestrians while walking or standing.

Discomfort Arising from Neighbouring Pedestrians

Figure 11:
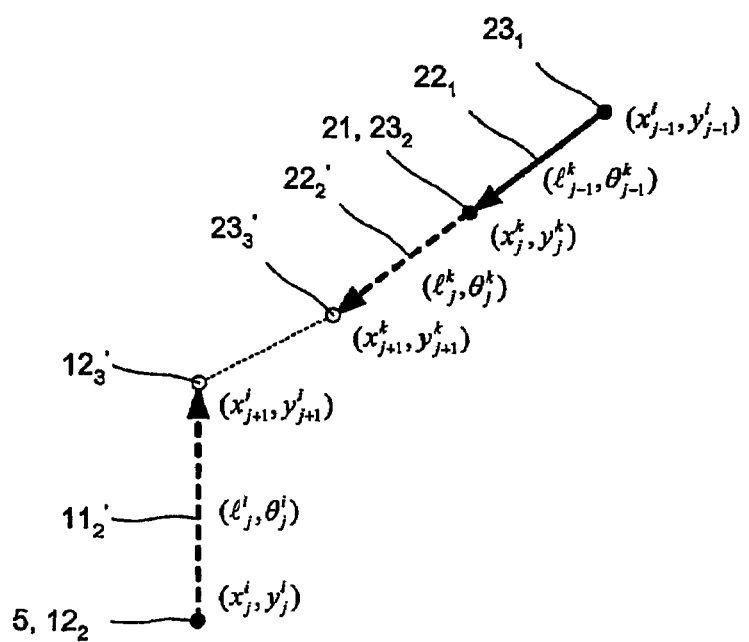
FIG. 11 shows a pedestrian and another pedestrian nearby.

Referring to FIG. 11, the pedestrian 5 at current location $12_2$ is evaluating position $12_3'$ as candidate for their next step. The pedestrian 5 is also estimating the personal space that will be available at that position $12_3'$ given that a neighbouring pedestrian 21 may also be competing with them for the space. Other neighbouring pedestrians may also be competing for the space and may also be included. Nevertheless, for the sake of clarity, only one neighbouring pedestrian is shown.

The neighbouring pedestrian 21 previously took a step $22_1$ from a first position $23_1$ to their current position $23_2$ at time j−1 and, from the point of view of the pedestrian 5, appears to be considering taking a step $22_2$ to a new position $23_3$ at time j.

The pedestrian 5 estimates the future position of neighbouring pedestrian 21. The true intention of the neighbouring pedestrian is unknown and so any prediction is based on observations. This prediction is based on an apparent speed and direction of the neighbouring pedestrian 21, namely those of their most recently completed step $22_1$.

The situation may be described by the following set of equations:

$$\delta \vec{r}^i_{j,j+1} = l^i_j \hat{\theta}^i_j \quad (19, 20, 21, 22, 23, 24)$$

$$\vec{r}^i_{j+1} = x^i_{j+1} \hat{x} + y^i_{j+1} \hat{y}$$

$$\delta \vec{r}^k_{j,j+1} = l^k_{j-1} \hat{\theta}^k_{j-1}$$

$$\vec{r}^k_{j+1} = \vec{r}^k_j + \delta \vec{r}^k_{j,j+1}$$

$$\delta \vec{r}^{ik}_j = \vec{r}^k_{j+1} + \vec{r}^i_{j+1}$$

$$\delta \theta^{i,k}_j = \arccos \left( \frac{\delta \vec{r}^i_{j,j+1} \cdot \delta \vec{r}^{ik}_j}{|\delta \vec{r}^i_{j,j+1}||\delta \vec{r}^{ik}_j|} \right)$$

where $\delta \vec{r}^i_{j,j+1}$ is the change in position of the pedestrian 5 over step j, $\vec{r}^i_{j+1}$ is the targeted position $12_3'$ of the pedestrian 5, $\delta \vec{r}^k_{j,j+1}$ is the projected change of position of the neighbouring pedestrian 21 over step j, $\vec{r}^k_{j+1}$ is the projected position $23_3'$ of the neighbouring pedestrian 21 after step j, $\delta \vec{r}^{ik}_j$ is the position of neighbouring pedestrian 21 relative to the pedestrian 5 after step j and $\delta \theta^{i,k}_j$ is the angle between the projected position $23_3'$ of neighbouring pedestrian 21 relative to step $11_2$ of the pedestrian 5.

In defining personal space, several considerations may be taken into account:

As described earlier, the clearance sought from surrounding neighbours depends on the position and velocity of both the individual and the surrounding neighbours. The positions of surrounding neighbours are projected by processing available information and prognosticating intentions, i.e. assuming that they will continue to be moving in the same direction and with the same speed over their next step as they were last observed to have in their most recently completed step.

The angular dependence of desired clearance is correlated with speed. In particular, personal space is distributed uniformly while standing, whereas it is increased in favour of the forward direction when moving forward. Thus, the shape and size of personal space is dynamically adjusted as a function of the pedestrian's motion relative to their surrounding neighbouring pedestrians and obstacles.

The personal space also depends on density. In densely packed crowds individuals tend to relax their requirements and accept less space than they would have under less constrained circumstances. This is a form of adaptation by habituation, which is described in more detail later.

Differentiations in preferences for personal space across species or different population samples selected, for example by ethnicity or context, also exist. The origin of these may be either physical, cultural, or contextual, also exist. Furthermore, even within a uniform population sample or species, individuals range in their needs for personal space.

Variations in needs for personal space are described in terms of a "rank". Entities are classified by their tank within their own population. A number between 0 and 1 may be used to indicate the proportion of the population which is more tolerant with regard to requirements of clearance for personal space. Thus, an entity may draw a mean personal space rank $S_i^0$.

There are spontaneous variations, or noise, in the individual personal space preferences of pedestrians, similar to speed noise described earlier. Thus, an instantaneous personal space rank $S_i^j$ may be defined as:

$$S_i^j = S_i^0 + \delta S_i^j \tag{25}$$

where $S_i^0$ is the mean personal-space rank and $\delta S_i^j$ is the instantaneous noise. $S_i^0$ and $\delta S_i^j$ are drawn randomly from probability distribution functions derived from fits to measurements.

Based on these considerations and using standard statistical analysis techniques and fits to empirical data, personal space $R_{j+1}^i$ may be defined as:

$$\mathcal{R}_{j+1}^i(\theta) = \frac{S_i^j}{\sqrt{\rho_j^i}}\left[1 + \frac{l_j^i}{\Delta t}(c_1\cos\theta + c_2\cos 2\theta)\right] \tag{26}$$

$$\mathcal{R}_{j+1}^{ik} \equiv \mathcal{R}_{j+1}^{ik}(\delta\theta_{j+1}^{i,k}) \tag{27}$$

where $R_{j+1}^{ik}$ is the desired clearance of pedestrian 5 from neighbouring pedestrian 21 following step j as a function of its instantaneous personal-space rank $S_i^j$ and the relative angle $\delta\theta_{j+1}^{ik}$ between the pedestrians 5, 21. Parameters $c_1$, $c_2$ are derived from fitting the model to data, $\Delta t$ is the duration of a step and $\rho_j^i$ is the pedestrian density in units of pedestrians per square meter (ppsm), as experienced by the pedestrian 5 at time j.

In equation 26, personal space $R_{j+1}^i$ exhibits anisotropic angular dependence. Personal space is also a function of the entity's own speed $l_j^i/\Delta t$ and local density $\rho_j^i$. The dependency of personal space on local density $\rho_j^i$ is a manifestation of adaptation by habituation, which will be described n more detail later.

In equation 27, $R_{j+1}^{ik}$ is defined with reference to neighbouring pedestrians by a relative angle $$\delta\theta_{j+1}^{i,k}$$

which takes account of the relative position and projected speed of the neighbouring entity to the entity. It is individually calculated for each individual pedestrian at each time step.

Figure 12:
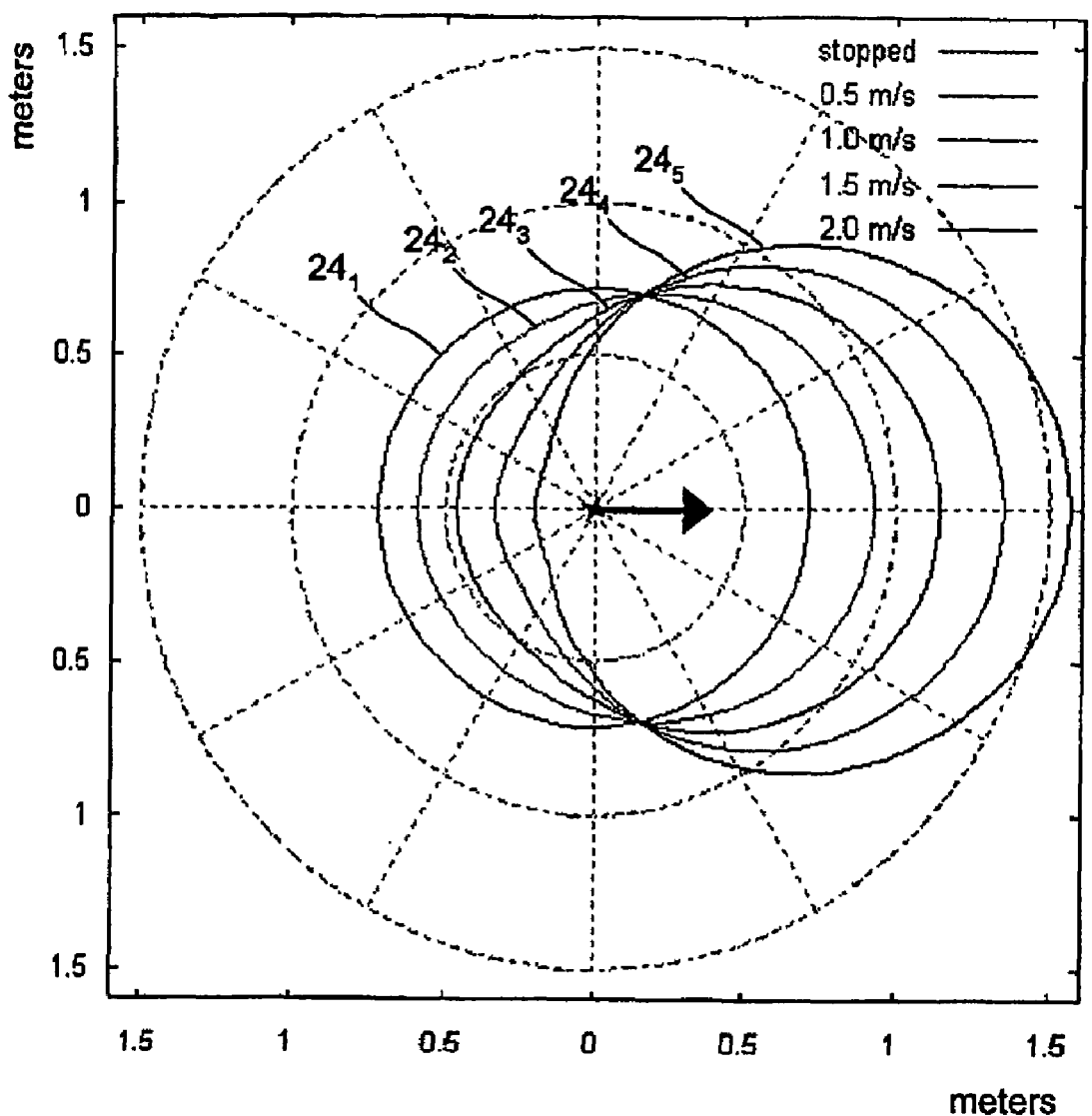
FIG. 12 shows plots of personal space at different pedestrian speeds.

Referring to FIG. 12, plots of personal space $R_{j+1}^i$ for a pedestrian for different speeds and having a rank equal to the mean obtained from fitting measured personal spaces is shown. First, second, third, fourth and fifth plots $24_1$, $24_2$, $24_3$, $24_4$, $24_5$ are for a pedestrian at rest and moving at 0.5, 1.0, 1.5 and 2.0 ms$^{-1}$ respectively.

The virtual work corresponding to the perceived cost of being deprived of desired personal space is referred to as "discomfort". An effective potential energy term is assigned similar to the potential energy of a compressed spring. Other forms of effective potential energy may be used. The potential energy may vary linearly or non-linearly, logarithmically or exponentially or may include polynomial terms.

The preferred distance of a pedestrian from each of their neighbours is similar to a relaxation length of a spring. Being obliged to keep a shorter distance than the one preferred one is similar to compressing a spring which consequently acquires potential energy equal to the work needed to compress it.

Thus, discomfort is the sum of potential energy terms for each neighbour, namely:

$$\Delta r_{j+1}^{ik} = \mathcal{R}_{j+1}^{ik} - |\vec{r}_{j+1}^i - \vec{r}_{j+1}^k| \tag{28, 29, 30}$$

$$V_{j+1}^{ik} \equiv \frac{1}{2}c_d(\Delta r_{j+1}^{ik})^2 \Theta(\Delta r_{j+1}^{ik} \geq 0)$$

$$D_{j+1}^{neighbors} \equiv \sum_{k \in \{neighbors\}} V_{j+1}^{ik}$$

$\Delta r_{j+1}^{ik}$ is the deficit between the desired clearance $R_{j+1}^{ik}$ and the actual head-to-head distance $|\vec{r}_{j+1}^i - \vec{r}_{j+1}^k|$ between the pedestrian 5 and an offending neighbour such as pedestrian 21. $V_{j+1}^{ik}$ is the compression energy arising between the pedestrian 5 and an offending neighbour, such as pedestrian 21. The step $\Theta$ function ensures that neighbouring entities outside a pedestrian's personal-space do not contribute to discomfort since they are sufficiently far away. The parameter $c_d$ is a strength parameter extracted from fits to data. The total discomfort $$D_{j+1}^{neighbors}$$

experienced by pedestrian 5 is the sum of all the 'compression energy' terms of all offending neighbours including neighbouring pedestrian 21.

Discomfort Arising from Fixed Obstacles

Discomfort arising from nearby fixed obstacles is treated similarly to discomfort arising from neighbouring pedestrians save for some minor adjustments.

Figure 13:
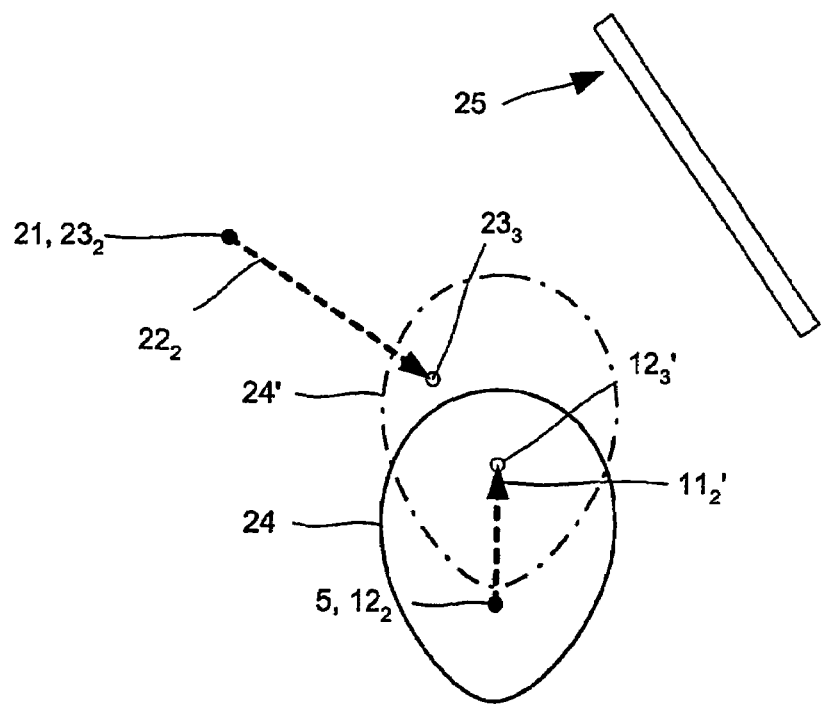
FIG. 13 shows determination of whether a preferred step is feasible.

Referring to FIG. 13, a pedestrian 5 is located at position $12_2$ is considering taking the preferred step $11_2'$ to position $12_3'$.

Determining whether the preferred step $11_2'$ is feasible comprises determining whether another pedestrian 21 or obstacle 25 is found in their personal space 24. This is performed over the course of the step. Thus, the personal space 24 is moved along the track of the preferred step $11_2'$ and a search is conducted within the personal space 24 for other pedestrians 21 or obstacle 25. An instance of a shifted personal space 24' is illustrated. The search may include determining whether another pedestrian 21, perceived to be taking a projected step $22_2$, will move to a position $23_3$ which is found in personal space 24.

Figure 14:
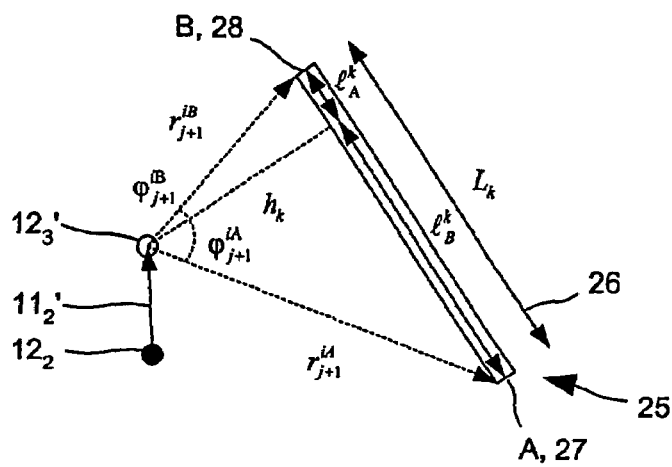
FIG. 14 a pedestrian and a fixed obstacle nearby.

Referring to FIG. 14, an obstacle 25 maintains a fixed position and may be represented by a sequence of segments 26, each segment having a beginning and end 27, 28. Discomfort is evaluated relative to the obstacle 25 by considering only portion $26_1$ of segments infringing their personal space.

Thus, relations similar to equations 19, 20, 21, 22, 23, 24, 28, 29 and 30 may be derived in relation to a pedestrian 5 and a fixed obstacle 25, namely:

$$\delta\theta_j^{i,k} = \cos^{-1}\left(\frac{\delta\vec{r}_{j,j+1}^i \cdot \vec{L}_k}{|\delta\vec{r}_{j,j+1}^i||L_k|}\right) \quad (31)$$

$$r_{j+1}^{ik;A,B} = \sqrt{(x_{j+1}^i - x_{A,B}^k)^2 + (y_{j+1}^i - y_{A,B}^k)^2} \quad (32)$$

$$l_{A,B}^k = \frac{L_k^2 \pm \left(r_{j+1}^{ik;A}\right)^2 \mp \left(r_{j+1}^{ik;B}\right)^2}{2L} \quad (33)$$

$$\phi_{j+1}^{ik;A,B} = \arcsin\left(\frac{l_{A,B}^k}{r_{j+1}^{ik;A,B}}\right) \quad (34)$$

$$h_k = \sqrt{\left(r_{j+1}^{ik;A,B}\right)^2 - \left(l_{A,B}^k\right)^2} \quad (35)$$

$$\Delta r_{j+1}^{ik} = \mathcal{R}_{j+1}^{ik}(\phi) - \frac{h_k}{\cos\phi} \quad (36)$$

$$U_{j+1}^{ik} \equiv \frac{1}{2}c'_d \int_{\phi_{j+1}^{ik;A}}^{\phi_{j+1}^{ik;B}} d\phi (\Delta r_{j+1}^{ik})^2 \Theta(\Delta r_{j+1}^{ik} \geq 0) \quad (37)$$

$$D_{j+1}^{obstacles} \equiv \sum_{k \in \{obstacles\}} U_{j+1}^{ik} \quad (38)$$

where index k identifies the offending obstacle, where $\delta\theta_j^{i,k}$ is the angle of path of pedestrian 5 and segment 26 over step j, $$r_{j+1}^{ik;A,B}$$

is the distance between pedestrian 5 from beginning 27 and end 28, $l_{A,B}^k$ is a portion of a segment portion $26_1$, $$\phi_{j+1}^{ik;A,B}$$

are angular limits, as seen from the entity's test position, corresponding to the beginning and end 27, 28 of the segment 26 of the obstacle that infringes personal space over step j, $h_k$ is the distance of the pedestrian from segment 26 or the "height" of a triangle formed by the entity's current position and the end points 27, 28 of the segment 26 of the obstacle infringing personal space, $$\frac{h_k}{\cos\phi}$$

is the distance of an infinitesimal length on segment 26 at angle $\phi$ relative to the pedestrian's path and $\Delta r_{j+1}^{ik}$ is the infringement relative to the preferred clearance $\mathcal{R}_{j+1}^{ik}(\phi)$ at that angle, $U_{j+1}^{ik}$ is the compression energy of pedestrian 5 relative to segment 26 of obstacle 25 and $$D_{j+1}^{obstacles}$$

is the sum of discomforts due to all segment constituents of obstacles within the personal space of pedestrian 5 over time step j. The parameter $c'_d$ is the entity-obstacle interaction strength extracted empirically from fitting to measurements. A cruder approximation of equation 37 may also be used.

Combining equations 30 and 38, the total discomfort is obtained namely:

$$D_{j+1}^i = D_{j+1}^{neighbors} + D_{j+1}^{obstacles} \quad (39)$$

and a total dissatisfaction is also found, namely:

$$\Delta J_{j+1}^{T;i} \equiv \Delta J_{j+1}^{S;i} + D_{j+1}^i \quad (40)$$

Micro-Navigation: Stage II

A pedestrian who is impeded by external factors, such as a neighbouring pedestrian or fixed obstacle, may be prevented from taking their preferred step. These external factors are perceived, processed and reconciled with the pedestrian's objectives and preferences. An ultimate decision regarding a least dissatisfying next step is one that better serves the pedestrian's interests.

The information on which this decision is based tends to be local, noisy and imperfect. The faculties that allow perceiving and processing information, learning, adapting and making a decision are characteristics of autonomous intelligent agents. These faculties lead to emergent behaviour known as self-organization.

The second stage of the micro-navigation includes establishing criteria and employing them to limit a search space for suitable next-step candidates. This principally involves finding suitable lower and upper angle bounds within which to seek the direction of the next step and adjusting the preferred speed, as required, to cope better with perceived local conditions.

To make a decision, the following considerations are taken into account, namely the unavailability of physical space due to the presence of neighbours and obstacles, the probability for competition with pedestrians in an apparent collision course and the necessity for cooperation with pedestrians in a similar course.

Thus, should the preferred next step be unavailable, a pedestrian can seek alternatives by reducing or increasing the length of their next step relative to their preferred length, additionally or alternatively by deviating left or tight from their preferred orientation.

A first criterion is employed, namely the principle of habituation, which states that entities become accustomed to enduring certain dissatisfaction over time, commensurate with local conditions. They acquire a memory of dissatisfaction that serves as the yardstick for a rough first assessment of their well-being. Perceived compliance or advantage relative to the norm is reason to stay the intended course. A perceived deficit induces deviating, to seek improvements.

Thus, each entity establishes a norm of dissatisfaction, i.e. a subjective level that it deems acceptable on the basis of what is to be expected locally from previous experience. This norm is effectively a memory of past dissatisfaction levels over a number of previous steps with a rule for updating. Likewise, entities maintain a memory of actual step lengths, or equivalently walking speeds, over the same number of steps and updated by the same rule.

A simple rule for updating information is employed, which gradually phases out old information and incorporates new information at the end of each step.

After completing step j−1 and prior to launching a new search for step j, a dissatisfaction norm $\overline{\Delta J}_j^{T:i}$ and a feasible step length $\overline{l}_j^i$ are updated for each pedestrian, namely:

$$\overline{\Delta J}_j^{T:i} = \frac{(N_{mem}-1)\overline{\Delta J}_{j-1}^{T:i} + \Delta J_j^{T:i}}{N_{mem}} \quad (41)$$

$$\overline{l}_j^i = \frac{(N_{mem}-1)\overline{l}_{j-1}^i + l_j^i}{N_{mem}} \quad (42)$$

where $\Delta J_j^{T:i}$ is a current level of instantaneous dissatisfaction, $$\overline{\Delta J}_{j-1}^{T:i}$$

is a dissatisfaction norm after completing step j−2, $l_j^i$ is a current instantaneous step length, $\overline{l}_{j-1}^i$ is a feasible step length norm after completing step j−2 and $N_{mem}$ is the number of memory steps.

Other updating rules may be used provided the number of memory steps $N_{mem}$ is obtained a posteriori by fitting empirically to data.

By comparing the current level of instantaneous dissatisfaction $\Delta J_j^{T:i}$ with the norm $\overline{\Delta J}_{j-1}^{T:i}$ it is established whether the current course appears to be satisfactory, if the instantaneous current level of total dissatisfaction $\Delta J_j^{T:i}$ is inferior than or equal to the dissatisfaction norm $\overline{\Delta J}_j^{T:i}$ or whether dissatisfaction levels are being induced that are higher than what appears to be reasonable to anticipate, if otherwise.

In the latter case, a perceived habituation-adapted dissatisfaction deficit $\delta J_j^{T:i}$ serves as incentive to deviate, namely:

$$\delta J_j^{T:i} = \max(0, \Delta J_j^{T:i} - \overline{\Delta J}_j^{T:i}) \quad (43)$$

The dissatisfaction deficit $\delta J_j^{T:i}$ is used to establish first rough estimates of angular bounds to the right (lower angles) and left (higher angles) of the pedestrian's preferred orientation $\theta_j^{opt}$ given by equation 14 above.

The following assumption is made in order to render the habituation deficit of equation 43 into first angular bounds for the search, namely that a reasonable candidate for the next step j should achieve a step length or walking speed not worse than the norm, it should result in a new position of comparable but not worse density (and thus discomfort) and it should induce a comparable level of inconvenience due to friction as defined in equation 5 above.

Based on these conditions, the dissatisfaction deficit $\delta J_j^{T:i}$ can be attributed to the inconvenience due to accelerating/turning defined in equation 16, which yields an angular range:

$$\cos\phi = \min\left(1, \max\left(-1, 1 - \frac{\delta J_j^{T:i}\Delta t^2}{c_i m (\overline{l}_j^i)^2}\right)\right) \quad (44)$$

$$\Delta\theta_j^{i;l,h} = \min(\pi, \max(0, \phi)) \quad (45)$$

where $$\phi = \theta_j^i - \theta_{j-1}^i \in [0, \pi]$$

$$\theta_j^i \in [\theta_{j-1}^i - \Delta\theta_j^{i;l}, \theta_{j-1}^i + \Delta\theta_j^{i;h}]$$

The imposed conditions are conservative and thus inclusive of all possible solutions.

Figure 15:
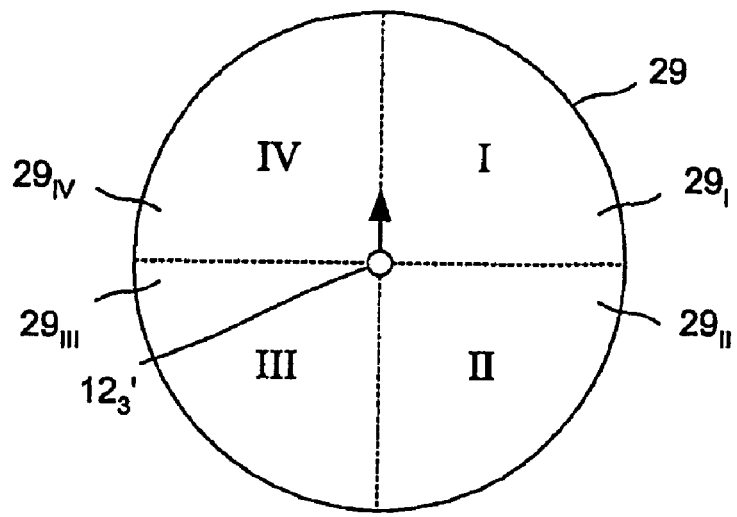
FIG. 15 shows a test area around a position to which a pedestrian would prefer to step.

So far the angular range has been estimated relative to the orientation angle $\theta_{j-1}^i$ of the just completed step j−1. The estimate is refined by scanning the pedestrian's neighbourhood and determining local conditions, as will now be described in more detail:

Referring to FIG. 15, a neighbourhood 29, hereinafter referred to as a test area, is defined around the preferred position $12_3'$ given by equation 14 and 15 above. Preferably, the test area 29 is in the form of a circle which is large enough to contain a personal space defined by equations 35 and 36 for any feasible pedestrian speed. Thus, the edge of test area 29 is the farthest that the pedestrian need "look" in order to obtain information for making a decision. A typical radius of the test area is between 1.5 and 2.5 meters.

The test area 29 in divided in four quadrants $29_I$, $29_{II}$, $29_{III}$, $29_{IV}$ relative to the preferred forward orientation defined in equation 14 above. Each quadrant is scanned independently and so as to extract any relevant information.

The areas of the test area 29 and four quadrants $29_I$, $29_{II}$, $29_{III}$, $29_{IV}$ are given by:

$$\alpha_{test} = \pi R_{test}^2$$

$$\alpha_q = \alpha_{test}/4 \quad (46, 47)$$

where $R_{test}$ is the radius of the test area 29.

For each quadrant $29_I$, $29_{II}$, $29_{III}$, $29_{IV}$, an estimate is made of the number of neighbours likely to be within it by the time the pedestrian 5 completes step j. This is done by projecting the position of the neighbours at the end of their step on the basis of their velocity and position as prognosticated by the pedestrian 5. It is assumed that a neighbour will continue to move with the same speed and in the same direction when last "observed", namely that of their last completed step. The number of neighbours so counted is denoted $N_x$, where the subscript x=I,II,III,IV is the index of the corresponding quadrant $29_I$, $29_{II}$, $29_{III}$, $29_{IV}$.

Figure 16:
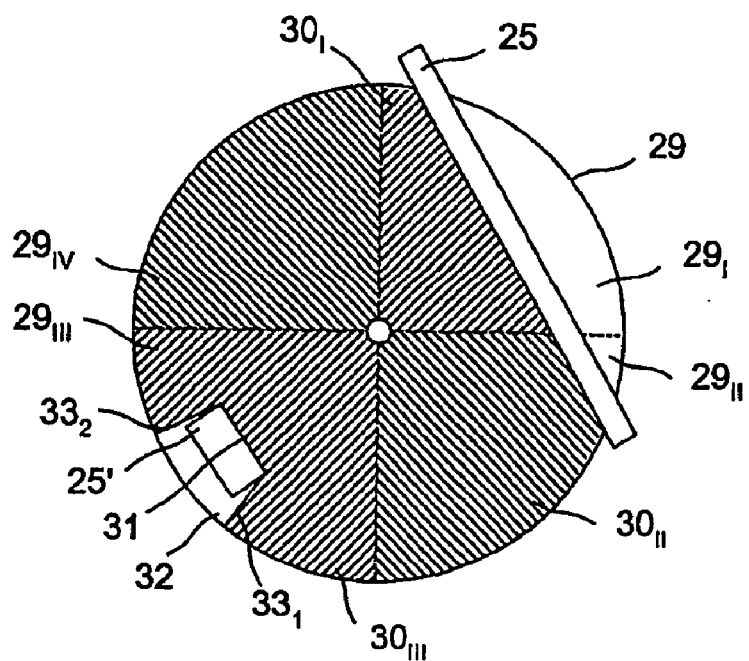
FIG. 16 shows regions of a test area which are free of fixed obstacles.

Referring to FIG. 16, a scan is performed for fixed obstacles 25, 25'. The physical area that is accessible and free of fixed obstacles per quadrant is then calculated. If $\alpha_x^0$ is the area occupied or rendered inaccessible by an obstacle 25, 25', then an obstacle free area $\alpha_x^f$ within a quadrant may be calculated, namely:

$$\alpha_x^f = \alpha_q - \alpha_x^0 \quad (48)$$

For example, the obstacles 25, 25' infringe the first, second and third quadrants $29_I$, $29_{II}$, $29_{III}$.

For first and second quadrants $29_I$, $29_{II}$, the accessible areas $\alpha_I^f$, $\alpha_{II}^f$ which are free and accessible comprises regions $30_I$, $30_{II}$ of quadrants $29_I$, $29_{II}$ to the left of the obstacle 25. For the third quadrant $29_{III}$ which entirely contains a smaller obstacle 25', the accessible area $\alpha_{III}^f$ excludes not only a physical area 31 occupied by the obstacle 25', but also a portion 32 of the quadrant $29_{III}$ in the shadow of the obstacle 25' as viewed from the pedestrian 5. Thus, the accessible area $\alpha_{III}^f$ for the third quadrant $29_{III}$ comprises the region $30_{III}$ excluding the area 31, 32 delimited by a front edge 32 of the obstacle 25 and two lines of sight $33_1$, $33_2$.

Having estimated the accessible area per quadrant $\alpha_x^f$ and the number of neighbours contained therein, the personal space per entity $\alpha_e$ is estimated, using:

$$\alpha_e = \max\left(\alpha_e^{max}, \frac{\sum_{x=I,II,III,IV} \alpha_x^f}{1 + \sum_{x=I,II,III,IV} N_x}\right) \quad (49)$$

$$\alpha_x^e = \sum_{\substack{k \in \{x, k_{j-1}^k \to 0\} \\ x=I,II,III,IV}} \alpha_e \quad (50)$$

where $\alpha_e^{max}$ maximum area allocated per entity, which is an empirically obtained value from fitting data. The personal space per entity $\alpha_e$ is the area which is free of obstacles and which is divided among the neighbouring pedestrians and the pedestrian themselves. However, if the density of pedestrians in the test area 29 is low then the maximum area allocated per entity $\alpha_e^{max}$ is used. This is because the pedestrian expands his or her personal space, the fewer neighbours there are in his or her neighbourhood 29. A larger personal space leads to a greater sense of well-being. If, however, there are few or no neighbours infringing the pedestrian's neighbourhood 29, then the pedestrian is content with a maximum area available as personal space. Beyond that, they do not care whether more personal space is available.

Having determined how much of neighbourhood 29 is free of obstacles 25, how many neighbours axe infringing the test neighbourhood 29 and how much personal space per entity can be expected pet quadrant, an area of a lane, $\alpha_{pass}$, required for passage through the neighbourhood 29 is then estimated using:

$$\alpha_{pass} = R_{test} R_0 \quad (51)$$

This area is expected to be available if enough area free of obstacles is available, but not otherwise.

The net free area $\alpha_x$ of a quadrant $29_I$, $29_{II}$, $29_{III}$, $29_{IV}$ and forward spatial availability weights $w_{l,k}$ for the first and fourth quadrants $29_I$, $29_{IV}$, are estimated using:

$$\alpha_x = \alpha_x^f - \alpha_x^e \quad (52)$$

$$\text{if } (\alpha_{I,IV}^f \geq 4\alpha_{size}) \begin{cases} \alpha_{I,IV}^f -= \alpha_{pass} \\ \alpha_q -= \alpha_{pass} \end{cases} \quad (53)$$

$$w_{l,h} = \frac{\alpha_{I,IV}}{\alpha_q} \quad (54)$$

The first and fourth quadrants $29_I$, $29_{IV}$ are the quadrants where the pedestrian is most likely to look for its next step. The forward spatial availability weights $w_{l,h}$, which can take values between zero and unity, express the likelihood that free space is to be found there. Thus, a value of $w_{l,h}=1$, where the indices l,h correspond to forward low or high angles respectively, i.e. first and fourth quadrants $29_I$, $29_{IV}$, means that the entire quadrant $29_x$ is fully available and free of obstacles and neighbours. By contrast, a value of $w_{l,h}=0$ means that the quadrant $29_x$ is saturated with obstacles and neighbours and there appears to be no area available to be claimed. Thus, the forward spatial availability weights $w_{l,h}$ is an important indicator when selecting a quadrant $29_x$ that is likely to yield a satisfactory solution.

Having estimated the availability of physical space, the offending neighbours found in the test area 29 are categorized as "friends" or "foes". Cooperation and competition are extremely important in emergent phenomena induced by the interactions of intelligent agents.

Figure 17:
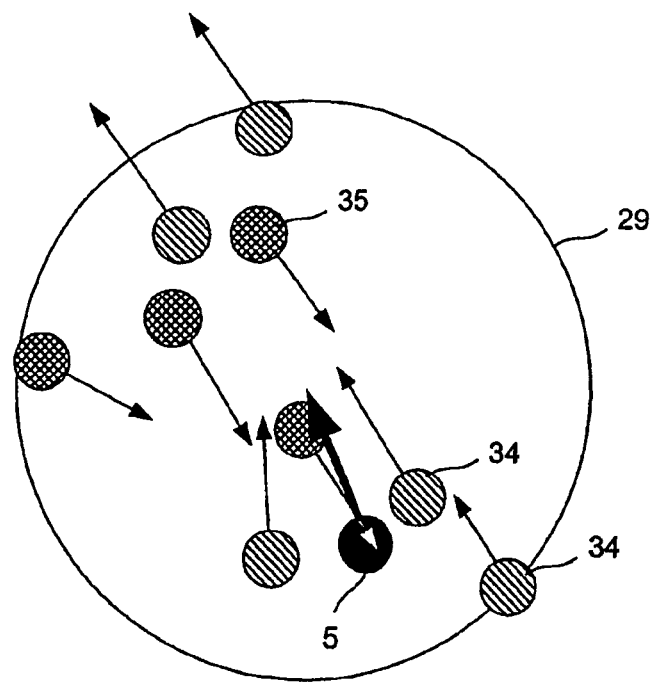
FIG. 17 shows neighbouring pedestrians walking with or against a pedestrian.

Referring to FIG. 17, a friend 34 may be classified as a neighbouring pedestrian which appears to be moving in the pedestrian's approximate direction. A foe 35 may be classified on the other hand as a neighbouring pedestrian that is moving in an opposing direction.

If the density of friends 34 in the neighbourhood 29 is very high, it can enforce synchronization. For a high-density pocket of slow-moving friends 34 lying ahead of the pedestrian 5, if there is insufficient space for overtaking, then the pedestrian 5 is forced to slow down. This synchronization effect is a collaborative phenomenon, which causes a slowing down to speed levels below the preferred speed. Likewise, for a fast-moving, high-density pocket of friends lying behind the pedestrian 5, if there is not enough room to move out of the way, then the pedestrian 5 speeds up.

Apart from adjustments to the cruising speed, synchronization may also cause re-ordering. In extreme situations at high density, the pedestrian may be forced to take a step only after the person directly ahead has moved and no earlier.

The density of friends and the apparent synchronization speed are considerations to be taken into account since they enforce deviating from one's preferred speed and therefore act as deterrents. These considerations, however, are only necessary for instantaneous adjustments of the speed and do not need to be "remembered". This is because cruising speed is resumed when synchronization is no longer necessary.

For oncoming neighbours, i.e. foes 35, the considerations to be taken into account are somewhat different. The pedestrian is competing rather than collaborating with their foes.

The higher the density of oncoming foes 35, the higher the probability of collision becomes. Thus, the cost for successfully negotiating and avoiding collision tends to become greater also.

The density of foes 35 and collision probability are important factors for consideration. Unlike synchronization, which can be taken into account instantaneously, collision probability is remembered to facilitate future intelligent decisions. Thus, in high-volume multi-directional traffic one should not only take into account the instantaneous physical presence of oncoming foes, but also any history of foes. The history or memory of past collision probabilities serves to project the likelihood that one might encounter yet-invisible foe downstream, even if not quite yet in sight, by which time it may be too late for corrective manoeuvring.

For friends and foes, a cooperation weight $w_{k;j}^{\parallel}$ and competition weight $w_{k;j}^{\perp}$ assigned by the pedestrian 5 to each friend 34 and foe 35 respectively who are projected be in the test area 29 by the end of step j are:

$$w_{k;j}^{\|} = \frac{1}{2}[1 + \cos(\theta_j^{i;opt} - \theta_{j-1}^k)] \quad (55)$$

$$w_{k;j}^{\perp} = \frac{1}{2}[1 - \cos(\theta_j^{i;opt} - \theta_{j-1}^k)] \quad (56)$$

The assignment is on the basis of the extent to which the projected direction of motion of a neighbour appears to be parallel of anti-parallel to that of the pedestrian using equations similar to equations 19 to 24 above.

For friends, the position $(r)_j^{ik}$ and angle $\theta_j^{ik}$ of a neighbour k relative to the position and direction of pedestrian 5 are calculated using:

$$\vec{r}_j^{ik} = (x_{j+1}^k - x_{j+1}^i)\hat{x} + (y_{j+1}^k - y_{j+1}^i)\hat{y} \quad (57)$$

$$\theta_j^{ik} = \cos^{-1}\left(\frac{\delta \vec{r}_{j,j+1}^i \cdot \vec{r}_j^{ik}}{|\delta \vec{r}_{j,j+1}^i| |\vec{r}_j^{ik}|}\right) \quad (58)$$

These parameters lead to estimates of forward, lateral, and combined proximity weights $$w_{k;j}^{f,l,prox},$$

namely:

$$w_{k;j}^f = \min\left(0, 1 - \frac{|\vec{r}_{j+1}^i - \vec{r}_{j+1}^k| \cos\theta_j^{ik} - R_0^i - R_0^k}{R_{test} - R_0^i - R_0^k}\right) \quad (59)$$

$$w_{k;j}^l = \min\left(0, 1 - \frac{|\vec{r}_{j+1}^i - \vec{r}_{j+1}^k| \sin\theta_j^{ik} - R_0^l - R_0^k}{R_{test} - R_0^l - R_0^k}\right) \quad (60)$$

$$w_{k;j}^{prox} = w_{k;j}^f w_{k;j}^l \quad (61)$$

Thus, the nearer a friend 34 is to the pedestrian 5 in both forward and lateral sense, then the more it enforces speed synchronization.

Lastly, weighted counts of friends 34 and foes 35 per quadrant and corresponding densities $\rho_x^{\|}$, $\rho_l^{\perp}$, $\rho_h^{\perp}$ are determined:

$$n_x^{\|} = \sum_{\substack{k \in x \\ x=I,II,III,IV}} w_{k;j}^{\|} w_{k;j}^{prox} \Theta(\cos(\theta_j^{i;opt} - \theta_{j-1}^k) \geq \cos\theta_{ii}) \quad (62)$$

$$n_x^{\perp} = \sum_{\substack{k \in x \\ x=I,II,III,IV}} w_{k;j}^{\perp} \Theta(\cos(\theta_j^{i;opt} - \theta_{j-1}^k) < \cos\theta_{ii}) \quad (63)$$

$$\rho_x^{\|} = \frac{n_x^{\|}}{\alpha_x} \quad (64)$$

$$\rho_l^{\perp} = \frac{n_I^{\perp} + n_{II}^{\perp}}{\alpha_I + \alpha_{II}} \quad (65)$$

$$\rho_h^{\perp} = \frac{n_{III}^{\perp} + n_{IV}^{\perp}}{\alpha_{III} + \alpha_{IV}} \quad (66)$$

The step $\Theta$ function enforces the condition in parenthesis. Thus, if the condition is true, then the $\Theta$ function is equivalent to unity, otherwise zero. The parameter $\theta_{\|}$ is set empirically to $\pi/3$. Thus, neighbours whose direction of motion is to within $\theta_{\|}$ on either direction (i.e. higher or lower) from that of pedestrian 5 are considered to as moving in a similar direction and are counted as friends 34, thus resulting in collaboration and synchronization. Those neighbours, however, whose direction of motion falls outside this range are counted as foes 35 and contribute to competition in the form of higher probability for collisions.

The process described in relation to equations 59 to 66 and extracting information relating to neighbouring pedestrians is referred to as scanning the neighbourhood 29 in the vicinity of the pedestrian 5 and assessing local conditions. The information derived from computation of equations 59 to 66 is subsequently used to establish criteria applied in restricting the search space.

Starting with the density of foes 35, a probability of collision towards lower or higher angles translates into a probability that the pedestrian 5 will be on a collision course with an offending neighbour should it decide to deviate to the right (i.e. lower angles) or left (higher angles) of its optimal orientation as defined in equation 14. This probability requires further refinements of the angular acceptance range derived earlier in equation 53.

In summary, the information relating to the density of foes 35 in the test area 29 is used to impose angular restrictions in the search space of acceptable feasible candidate next steps and to decide whether seeking a solution toward the left or right of the optimal orientation is more profitable.

An instantaneous competition strength $p_{l,h}^{\perp}$ is derived from the instantaneous information foe density $\rho_{l,h}^{\perp}$ and the estimated personal space per entity $\alpha_e$, namely:

$$p_{l,h}^{\perp} = \min(1, \rho_{l,h}^{\perp} \alpha_e) \quad (67)$$

This admits values between zero (collision impossible) and unity (collision certain) for either side (index l for lower angles, or to the right of the optimal orientation, and h for higher angles or to the left).

A collision probability memory $\bar{p}_{l,h}^{\perp}$ maintained by the pedestrian 5 and updated according to the rules described earlier is defined using a dynamic memory length $N_m^{\perp}$ (expressed using C++ programming convention), i.e.:

$$\bar{p}_{l,h}^{\perp} = \frac{(N_m - 1)\bar{p}_{l,h}^{\perp} + p_{l,h}^{\perp}}{N_m^{\perp}} \quad (68)$$

$$N_m^{\perp} = (p_l^{\perp} \geq \epsilon \| p_h^{\perp} \geq \epsilon)?\min(++N_m^{\perp}, N_{\max}) : \max(--N_m^{\perp}, 1); \quad (69)$$

The memory length $N_m^{\perp}$ corresponds to the number of steps over which memory is maintained and $N_{max}$ is set to 10. Thus, from the moment a foe 35 is detected, a collision probability memory starts to be built for the pedestrian 5 for up to ten steps. Similarly, when foes 35 are no longer detected, the pedestrian begins to "forget". If no foes are detected over the course of ten consecutive steps, then there is no memory of earlier collision information. Foe collision information begins to accumulate it anew when the next foe is detected. The cap of ten steps amounts to a medium-term memory and has been determined empirically from fitting to data.

There may also be empirical rules for resetting memory. For example, if the environment changes dramatically in such a way that the new conditions no longer correspond to earlier experience, a mechanism may be used to erase memory, reset the memory length and begin rebuilding memory afresh. An example of when this may happen is if the pedestrian steps out of a concourse, characterised by busy multi-directional motion, and into a corridor, characterised by unidirectional low-volume traffic.

Thus, the updated collision probability memory becomes the perceived collision probability of the pedestrian 5 at time step j. This is used to derive the left-right asymmetry $P^\perp$ (expressed using C++ programming convention), namely:

$$P^\perp = (\overline{p}_l^\perp \geq \epsilon \| \overline{p}_h^\perp \geq \epsilon) ? \frac{\overline{p}_l^\perp - \overline{p}_h^\perp}{\overline{p}_l^\perp + \overline{p}_h^\perp}: 0; \qquad (70)$$

which amounts to a measure of how much more likely it is to encounter a collision in deviating on one side of the optimal orientation as opposed to the other.

So far, the asymmetry construed by pedestrian 5 is entirely dynamic, depending exclusively on its own reading of signals fromn its surroundings. Hence, it is fully emergent. This asymmetry is the main reason fot complex emergent patterns such as the spontaneous formation of lanes above a critical density in multi-directional environments.

Spatial or cultural bias may be introduced, should there be need for one, using:

$$P^\perp = \min(1, \max(-1, P^\perp + \Delta P_{bias}^\perp)) \qquad (71)$$

The term $\Delta P_{bias}^\perp$ allows introduction of a forced, rather than emergent, bias or preference to the left or right. Such as bias may be induced, for example using a sign "keep to the right", or a cultural habit, such as keeping to the tight in continental Europe or keeping to the left in the UK.

A preliminary range $\delta\theta_{l,h}$ relative to the preferred orientation $\theta_j^{i;\ opt}$ of equation 14, may be derived using equation 45, namely:

$$\delta\theta_{l,h} = \min(\pi, \max(0, \Delta\theta_j^{i;\ l,h} \pm \theta_j^{i;\ opt} \mp \theta_{j-1}^i)) \qquad (72)$$

The left-right asymmetry is used to redistribute the angular range from the least to the more favourable side, which leads to (expressed using C++ programming convention):

$$\delta\theta_{asym} = (P^\perp \geq 0) ? P^\perp w_l \delta\theta_l : -P^\perp w_h \delta\theta_h; \qquad (73)$$

which is the range of angles to be removed from an unfavourable side and added to a favourable one. For example, an angular range is derived using equation 54. A first range of angles to be scanned for candidate solutions is to the right of the preferred orientation and a second range of angles is to the left. If the left-right asymmetry relation turns out to favour the left in preference to the right, a slice of angles $\delta\theta_{asym}$ is removed from the right side and added to the left side. To the extent that the pedestrian 5 deems it more likely to collide with a foe on the right than on the left, means that the pedestrian 5 does not look as far to the right for its next step as it would have done if there had been no foes. Instead it looks farther to the left since collisions are less likely.

Making use if this information, the angular range is finally corrected yielding a final range $\Delta\theta_j^{i;\ l,h}$ of least competition, namely:

$$\Delta\theta_j^{i;\ l,h} = \min(\delta\theta_{l,h}, \max(0, w_{l,h}(1-p_{l,h}^\perp)\delta\theta_{l,h} \mp \delta\theta_{asym})) \qquad (74)$$

This is the range of angles to the right ($\Delta\theta_j^{i;\ h}$) and left ($\Delta\theta_j^{i;\ l}$) relative to the preferred angle $\theta_j^{i;\ opt}$ given in equation 14 where the pedestrian 5 seeks an acceptable candidate for the $j^{th}$ step.

Finally, a preferentiality $p_{l,h}$ to either side is determined, where $p_{l,h}$ take on values between zero and unity (expressed using C++ programming convention):

$$p_{l,h} = (\Delta\theta_l = \Delta\theta_h = 0) ? \frac{1}{2} : \frac{1}{2}\left[1 \pm \frac{\Delta\theta_l - \Delta\theta_h}{\Delta\theta_l + \Delta\theta_h}\right]; \qquad (75)$$

The higher the value of $p_{l,h}$, the higher the preferentiality.

The density of friends and the effect of synchronization will now be described in more detail:

First, an instantaneous density $u_x$ of friends per quadrant of the test area 29 is translated into a strength of cooperation, admitting values between zero and unity:

$$u_x = \min(1, \rho_x \alpha_e) \qquad (76)$$

The larger the more likely to be forced to synchronize). As explained earlier, cooperation arises as-and-when needed, i.e. instantaneously. It does not help to prevent errors in the future the way the collision probability does. Thus, no memory of it is kept.

A weighted average of step length $\bar{l}_x$, or equivalently speed, of all the friends in the neighbourhood (per quadrant) is estimated:

$$\bar{l}_x = \frac{\displaystyle\sum_{\substack{k \in \{friend\ in\ qudrant\ x\} \\ x = I, II, III, IV}} l_{j-1}^k w_{k;j}^{\|} w_{k;j}^{prox}}{\displaystyle\sum_{\substack{i \in \{friend\ in\ qudrant\ x\} \\ x = I, II, III, IV}} w_{k;j}^{\|} w_{k;j}^{prox}} \qquad (77)$$

Slower neighbours behind the pedestrian do not matter because they do not catch up. Likewise, faster neighbours ahead do not matter since the pedestrian does not catch up. In either case, the pedestrian Nay continue walking at their preferred speed.

Faster neighbours behind, on the other hand, can have a chasing effect. They may exert pressure on a pedestrian ahead of them to either move faster or get out of the way. Likewise, slower neighbours in front may force an undesirable slowing down. Hence, synchronization is relevant when there are slower neighbours in front or faster neighbours behind.

This bias is reflected in forward and backward synchronisation weights, $u'_{I,IV}$, $u'_{II,III}$ (expressed using C++ programming convention), namely:

$$u'_{I,IV} = (\bar{l}_{I,IV} > l_j^{i;\ opt}(\theta))?0:u_{I,IV}; \qquad (78)$$

$$u'_{II,III} = (\bar{l}_{II,III} < l_j^{i;\ opt}(\theta))?0:u_{II,III}; \qquad (79)$$

The forward and backward synchronization strength $u'_{I,IV}$ $u'_{II,III}$ depend on the density of friends and the degree of alignment of their orientation with the desired orientation of entity i.

To the extent that $u'_{I,IV}$ and $u'_{II,III}$ impose external synchronization due to dynamical external conditions in the neighbourhood outside the pedestrian's control, the pedestrian is forced to degrade the weight of its own free will, i.e. to maintain the preferred step length or preferred speed. This leads to a weight of the pedestrian's own free $u_{opt}$ which is updated after taking into account external constraints, namely:

$$u_{opt} = 1 - u'_{I,IV} - u'_{II,III} \qquad (80)$$

Combining the weights of the various components, another estimate may be made of the feasible step length $$l_{l,h}^{i;j}$$

on the basis of its own desires adjusted to external constraints (expressed using C++ programming convention), namely:

$$l_{l,h}^{i;j} = (u_{opt} > 0)?u_{opt}\bar{l}_j^{i;opt}(\theta) + \qquad (81)$$

$$u'_{l,IV}\bar{l}_{l,IV} + u'_{ll,III}\bar{l}_{ll,III} : \frac{u'_{l,IV}\bar{l}_{l,IV} + u'_{ll,III}\bar{l}_{ll,III}}{u'_{l,IV} + u'_{ll,III}}$$

Thus, the pedestrian will no longer strive to achieve the unrealistic step length $l_j^{i;\,opt}$ which it would have preferred based on equation 21. While searching for a compromise solution, $l_j^{i;\,opt}$ becomes the "adjusted" preferred step length which is inserted in place of the preferred step length when minimising the full dissatisfaction function. By contrast, the instantaneous preferred speed and resultant instantaneous preferred step length were used when minimising self-dissatisfaction during the first stage. By now, the pedestrian has deemed this preference unrealistic and, after taking into account local information, has learned what is realistic and adjusted their speed preference accordingly. Thus, it considers a more realistic step length $$l_{l,h}^{i;j}$$

which is the best it can do given the synchronization constraints imposed upon it by the environment.

A threshold $l_{thr}$, empirically set to 5 cm, is introduced to prevent agitation for the conditions:

$$\text{if } (l_{l,h}^{i;j} < l_{thr})l_{l,h}^{i;j} = 0; \qquad (82)$$

This may be used, for example, in situations where pedestrians file into a bottleneck and the adjusted step length turns out to be extremely small. According to equation 82, if the feasible step length turns out to be less that the threshold, pedestrians consider themselves blocked and maintain their previous position until their neighbourhood clears. When the neighbourhood clears a longer step length is allowed.

A step length deficit $$\delta l_{l,h}^{i;j}$$

is defined as:

$$\delta l_{l,h}^{i;j} = \frac{|l_{l,h}^{i;j} - l_j^{i;opt}|}{l_{l,h}^{i;j} + l_j^{i;opt}} \qquad (83)$$

and is a normalised measure of the difference between the adjusted step length and the preferred step length, taking values between 0 (when the preferred and feasible lengths identical) and 1 (when the difference between preferred and feasible step lengths is greatest. It is a measure of preferentiality of the adjusted step length.

A preferentiality of one side over the other may be defined (expressed using C++ programming convention) using:

$$q_{l,h} = (\delta l_l = \delta l_h = 0)?\frac{1}{2} : \frac{1}{2}\left[1 \mp \frac{\delta l_l - \delta l_h}{\delta l_l + \delta l_h}\right]; \qquad (84)$$

Preferentiality uses the proximity of an apparent feasible step length on either side to one's own preference as a criterion. If the preferentiality for both left and right is the same, then $q_l = q_r = \frac{1}{2}$.

The second stage of micro-navigation ends with the determination of a favourite side, right (l) or left (h), namely:

$$Q_{l,h} = q_{l,h}p_{l,h}\alpha_{l,l}r^f$$

if $(Q_l > Q_h)$ $j = l$;

else if $(Q_l < Q_h)$ $j = h$;

else $j = (mdm()>0.5)?l : h;$ \qquad (85)

In the case of a draw, a dice is thrown.

In summary, the second stage of micro-navigation establishes an angular range for a search, for deviations on either side of the ideal orientation while looking for an acceptable candidate, adjusts the preferred speed (or step length) to a feasible speed as close as possible to the pedestrian's preferred speed and determines the favourite side from which to launch the search.

Micro-Navigation: Stage III

During the first stage of micro-navigation, self-dissatisfaction is minimised so as to identify a preferred step to a preferred position. If the preferred position is available and no discomfort is associated with it, the pedestrian can proceed to take this step. However, if either the preferred position is unavailable or there is some discomfort associated with it due the presence of either offending neighbours or fixed obstacles then the second and third stages are brought into play.

During the second stage of micro-navigation, upper and lower angular bounds are found relative to a preferred orientation. Between these angular bounds candidate solutions may be sought. Finally, it is determined which side (left or right) of the preferred orientation appears preferable when looking for a candidate solution first. Thus a subspace is defined. Moreover, the preferred speed requirement is adjusted for each side to reflect dynamical conditions imposed upon the pedestrian by its surroundings, to a value that appears more reasonable to attempt to achieve on the basis of local conditions.

Figure 18:
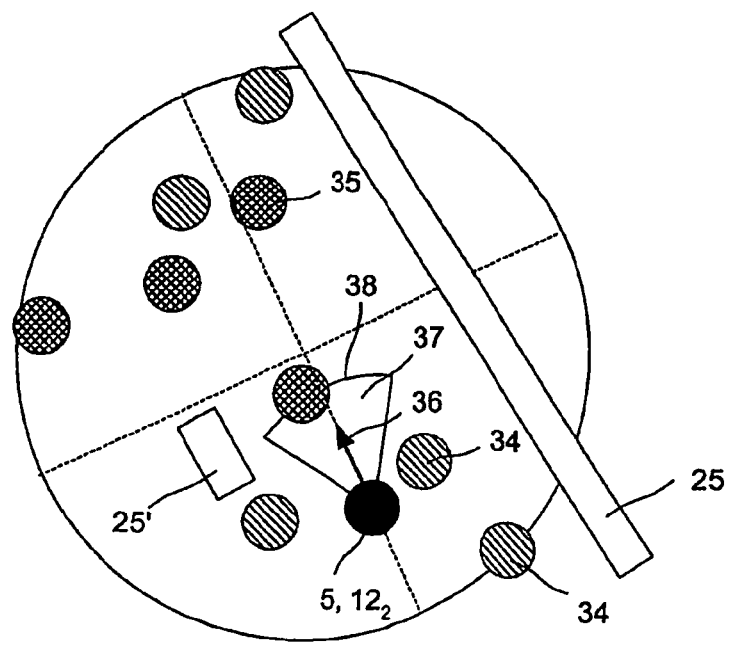
FIG. 18 shows a pedestrian and a sub-space in which a search is made for a position to which the pedestrian may step.

During the third stage, a detailed search is performed to determine and execute the pedestrian's next step. This will now be described in more detail:

Referring to FIG. 18, the pedestrian 5 has a preferred orientation $\theta_j^{opt}$ indicated by reference numeral 36.

A final search is begun. Starting from the preferred orientation $\theta_j^{opt}$ and turning towards a preferred side 37, for example to the right, a solution is sought which minimizes the total dissatisfaction of equation 40. This comprises solving equations of motion, namely:

$$\frac{d}{dl}\Delta J_T\bigg|_{l_d,\theta_d} = 0 \qquad (86)$$

-continued $$\frac{d}{d\theta}\Delta J_T \bigg|_{l_d,\theta_d} = 0 \quad (87)$$

A heuristic algorithm is used to solve the equations of motion.

This is contrasted with minimization of self-dissatisfaction during the first stage of micro-navigation, which results in a preferred orientation angle and step length. The main difference is in that whereas the preferred solution is obtained in a self-referential manner without regard to the possible presence of neighbours and obstacles, the final solution takes these into account. In particular, the presence of offending neighbours and obstacles now induces discomfort.

A search for a compromise step is conducted varying orientation angle $\theta_j^i$ and step length $l_j^i$.

Starting from the preferred angle $\theta_j^{i;\,opt}$ and turning first towards the preferred side determined using equation 85, step length l is varied starting from l=0, i.e. the current location. At each orientation angle $\theta_j^i$, a check is made is whether there are any entities or obstacles impeding passage. If there is, then the step length $l_j^i$ is varied only as far as the entity or obstacle. Otherwise, the limit is the adjusted step length $l=l_{l,j}^{i;\,j}$. The search continues on the preferred side up to the limit $\theta_j^{i;\,opt}+\Delta\theta_j^{i;\,l,h}$.

All the candidate solutions corresponding to incremented step length along the currently tested direction are evaluated. This is achieved in a similar way as described earlier and comprises determining a personal space where now the current step length relative to the position of origin is treated as the actual step length. Thus, the form of personal space is no longer uniform along the path tested in the current direction. A search is performed within the personal space for other pedestrians 21 or obstacles 25. Only sufficient space for passage, or accommodating the entity's physical rather than personal space, is required up to the currently tested position. The full dissatisfaction function is thus evaluated, including discomfort, as obtained for the personal space form corresponding to the currently tested angle and step length in the search. Only the best candidate, namely that of least dissatisfaction, is considered per tested angle. If the candidate is associated with zero discomfort, then the search ends. Otherwise, the best candidate for the current angle is tested against the best candidate of angles tested so far and the "best so-far candidate" information is updated. The search continues until a zero-discomfort candidate is found or the search is exhausted, whereupon the "best so-far" candidate is the winning candidate for a compromise solution.

There are some differences between the first stage and this stage, when determining a preferred step.

Firstly, in the first stage, only a position at the end of the preferred step is considered as a final destination. In this stage, a plurality of positions, starting at the current location and ending at a position at the end of a step having the adjusted step length, is considered as a possible final position for the step.

Secondly, in first stage, personal space is translated along the preferred path and, as this is done, a check is made as to whether neighbouring entities or obstacles infringe it. In this stage, personal space is not translated. A check is made as to whether neighbouring entities or obstacles infringe the personal space in respect of a candidate step under consideration.

Should the search toward the favoured side be exhausted without a conclusive success, i.e. no solution with zero discomfort, the search continues on the other less-favoured side with continuous updating of the best candidate over the current search. If the entire search subspace is scanned without success the entity misses a step, i.e. it is bottlenecked and cannot move until more space becomes available.

The first least-dissatisfying candidate to be found, amounting to the nearest local minima of equations 86 and 87 is accepted, unless negotiations with interfering offending neighbours result in yielding. For example, in the situation illustrated FIG. 18, the paths of a friend 34 and a foe 35 cross into the search subspace 38. If the solution obtained by equations 86 and 87 results in a path from the pedestrian's current position to the proposed position which crosses the projected path of a neighbour, then collision-avoidance negations are engaged.

Collision avoidance may be implemented using a game theory algorithm. If the outcome of collision avoidance algorithm is to yield to a neighbour, then the search is interrupted and the pedestrian loses a step, a compromise is worked out between the negotiating entities or the proposed solution is rejected and the search continues towards less favourable solutions.

The method of simulating movement of an entity is used in a simulator and apparatus for designing a venue, as will now be described in more detail:

Design system

Hardware

Figure 19:
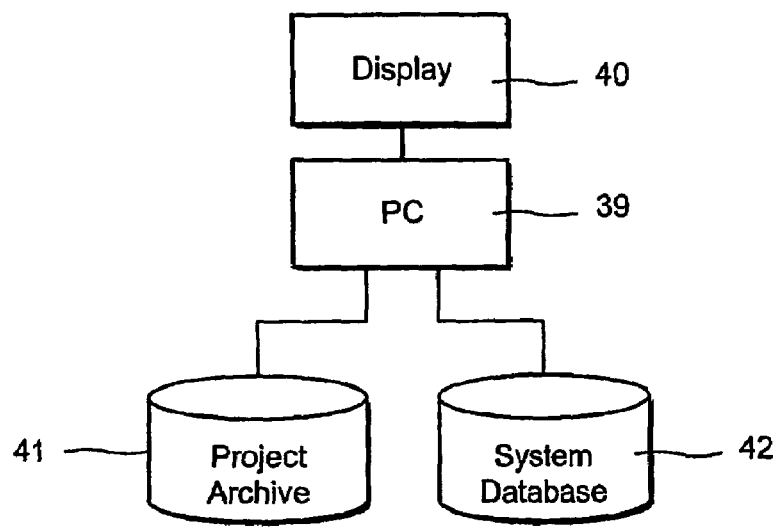
FIG. 19 is a schematic diagram of a design apparatus.

Referring to FIG. 19, a design system is implemented on a personal computer 39, a display monitor 40, storage for a project archive 41 and a system database 42. The personal computer 39 may be workstation or desktop PC and may have a Pentium IV class processor with clock speeds about or above 1.5 GHz and 512 MB of random access memory.

The personal computer 39 loads and runs a computer program, which performs the method of simulating movement of the entity. The computer program may be stored on a computer readable medium, such as a compact disc, or downloaded form a computer server.

Figure 20:
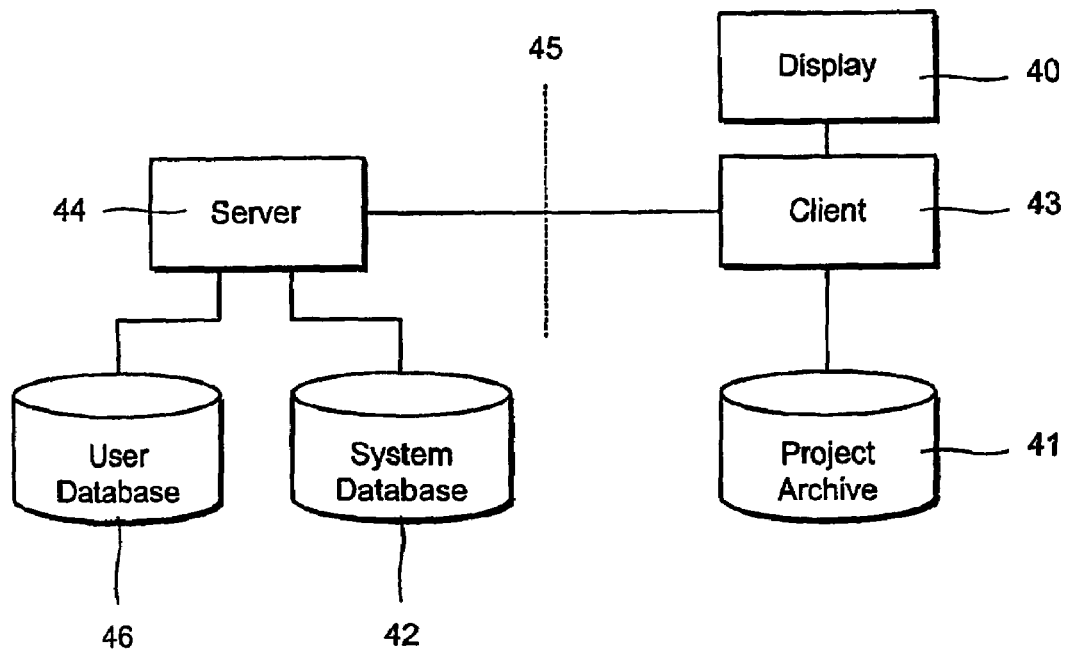
FIG. 20 is a schematic diagram of an alternative design apparatus.

Referring to FIG. 20, the design system may alternatively be implemented using a client computer 43 and a server computer 44. The client computer 43 is connected to the server computer 44 via a network 45, such as the Internet. The project archive 41 is local to the client computer 43 and the system database 42 is local to the server computer 44. A user database 46 is also provided locally to the server computer 44.

Architecture

Figure 21:
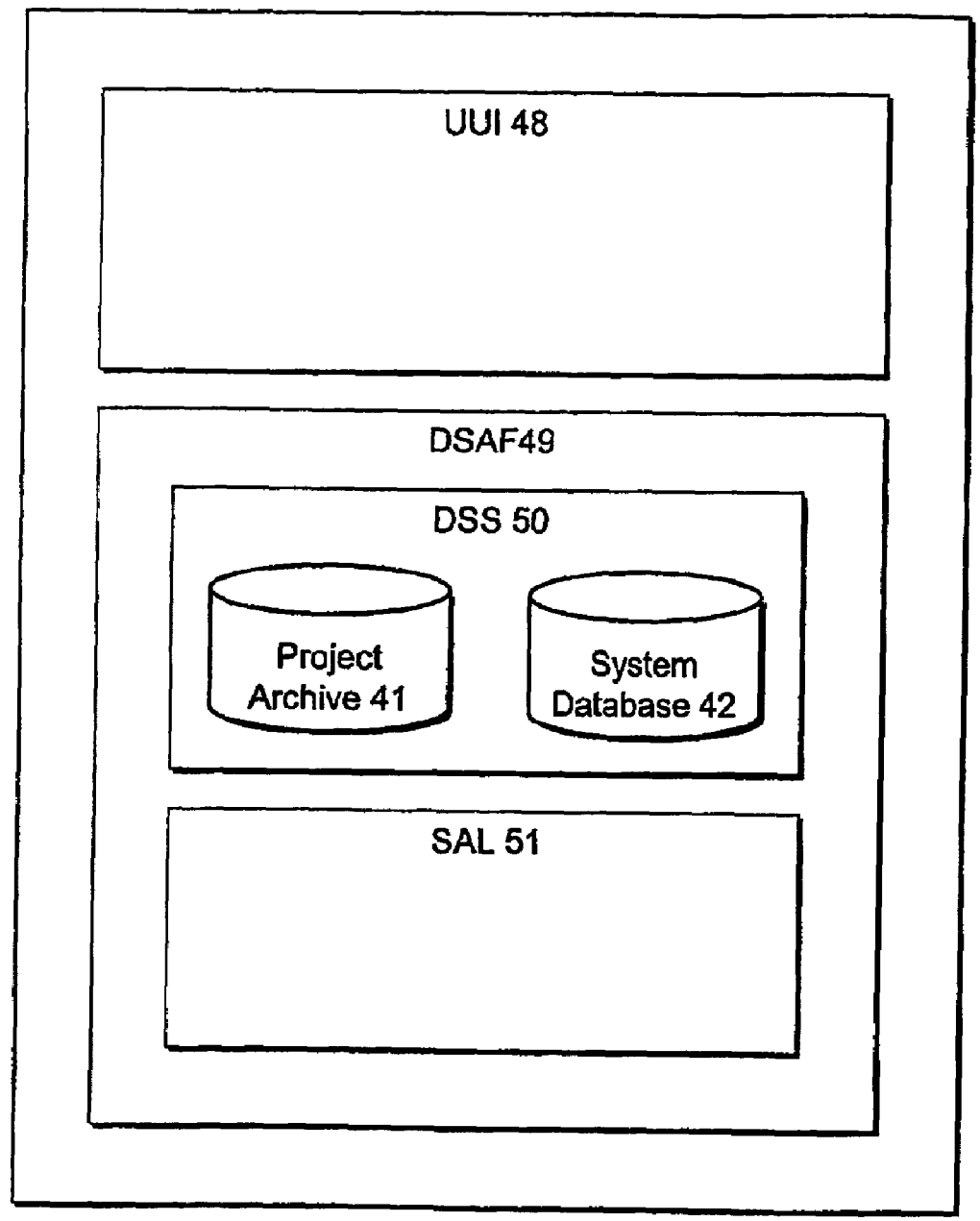
FIG. 21 shows a system architecture for a design system.

Referring to FIG. 21, a system architecture 47 for performing the method of simulating movement of an entity as herein described is shown.

The system architecture 47 is divided into a Universal User Interface (UUI) 48 and a Data, Simulation, and Analysis Framework (DSAF) 49.

The UUI 48 provides an interface for between a user and model design, simulation and analysis systems. The UUI 48 provides project management, data input, and data visualization systems.

The DSAF 49 a Data Storage System (DSS) 50 and a Simulation-Analysis Library (SAL) 51.

The DSS 50 includes a set of systems that are used by the UUI 48 and the SAL 51 to access and store data used in the system. The DSS 50 comprises the project archive 41 and the system database 42.

The system database 42 stores empirical measurements for defining simulation object properties and entity characteristics. The database 42 is divided into two sections. A first section $42_1$ houses system certified measurements and a second section $42_2$ houses user-defined content which is intended to be used across multiple projects. As described earlier, the database 42 may be implemented on a local medium or as a relational database via the server 44.

The project archive 41 is a file-based system for storing model designs and simulation data that are specific to one project.

The SAL 51 is a collection of objects and algorithms that are used to process a fully defined model into simulated data, and analyse and interpret the output. The DSAF 49 is an underlying set of software libraries that allow components to communicate and operate together.

UUI 48

The UUI 48 provides means for a user to interact with all components of the system. The UUI 48 comprises a set of Microsoft Foundation Classes (MFC) controls, dialogs and displays that are used to carry out tasks fox creating and processing a simulation.

The UUI 48 includes a core graphics rendering engine, a CAD interpreter, such as .dxf parser, project archive browser, a set of model objects and property dialogs used in their specification, a data manager, a quality assurance wizard and various toolbars and organizational constructs to facilitate use. The UUI 48 operates under the following modes of interaction: model design, simulation, analysis, data management and browsing. These modes can be selected by the user and are automatically detected in some cases through the context of a specified action.

Model Design is the process of transforming a venue design into a form that can be processed using the SAL 51. To build a model, a user creates or imports a design from a CAD source, supplies additional data for the simulation of the model and performs error checking and quality assurance on the resulting design. At each step in this process any resulting model is stored in the project archive 41.

A model can be described as an environment with a set of obstacles, such as walls, benches, buildings etc., a population and a schedule of events that occur over a specified time interval. A specification of a model is determined by a set of geometrical primitives describing the environment and a set of profiles and object definitions describing the population and other dynamic elements in the model. A primitive environment and obstacle geometry are supplied by the imported venue design. The remaining items are specified by the user via a model design interface. The specification of these items is facilitated via a component of the interface called a Data Manager (DM).

The function of the DM is to provide an interface that allows the user to access, define and manipulate empirical simulation object data used in the application. The components of the data manager include an MFC control for importing data from generic file formats, such as comma separated value (CSV)), and performing data cleansing operations. The DM also provides a suite of dialogs used to specify the characteristics of the various simulation objects and/or access existing values from the system database 42. The data stored in the database are logically organized into relational trees that map a unique key to each stored value. This allows the UUI 48 to maintain lists of the available content via the data keys without requiring that the entire database be loaded into memory. When a user wishes to specify details for an object, he is presented with an interface showing the values that are available in the system database 42 for a particular object type. The user may specify the object's parameters simply by associating the object with the key to the data stored in the database. The actual data are loaded when required for the performance of a simulation or analysis within the SAL 51, or if requested for visualization within the UUI 48. The user also has the option to manually define object parameters with custom content. In this case, the user is given the option to store any custom objects in the database so that they may be available in other projects The simulation process requires that a model pass a series of tests in order to be verified as simulation-ready. Failure to pass these tests results in a model that will have unexpected results under simulation. In order to help users avoid mistakes a quality assurance wizard (QAW) is used to verify the model and/or the imported CAD design. The QAW is able to identify flaws or incomplete specifications in a model's design. The QAW begins by performing a battery of tests on the model and then presenting a series of dialogs which show any issues found. Users interact with the provided interfaces and are able to affect any necessary corrections.

The project archive 41 is a file that provides persistent storage for project-specific model designs and simulated data. The project archive 41 logically belongs to the DSAF framework. Objects that can be stored in the archive include full or partially specified model designs, simulation results, and analysis macros. The project archive browser is a UI extension to the archive that allows users to view the contents of an archive and interact with them in various ways. The browser is implemented as a class which inherits from the MFC tree control which uses a directory tree to display the contents of the archive. Users can select objects within the browser and have them opened up in the UUI in the correct context. For example, models are opened in either model design/simulation mode, simulation results are opened in analysis mode.

Simulations are executed by loading a model definition from the project archive 41 and processing it with the SAL 51. The simulation interface in the UUI comprises a visualization system and a toolbar control that allows users to play, stop, pause, restart, and record the simulation. The simulation is displayed as a sequential set of snapshots showing the current position of each entity in the model as it progresses over time. At each time step, the simulation algorithms perform various calculations and update data tables which may be used in online analysis and/or stored in the project archive 41 and later used for offline analysis. Alternatively, they can be generated on demand during replay from the minimal set of data stored in the project archive 41 by default. Analysis of the simulated data is accomplished using a system where the user specifies a region of interest using either a polygon (for areas) or a polyline (for lines). After the user has specified a region, he must associate a function or set of functions to be performed on the entities inside or crossing the region over a specified range of time. As the simulation progresses, the data from each analysis region are updated and shown using the UUI data visualization system. For example, a user may be simulating a large venue such as a football stadium.

However, the user may be interested in viewing statistics dealing with a very small portion of the area that lies around a food vendor. The user is able to filter the data to this exact region by placing an analysis polygon around the zone of interest. Then by specifying an associated filter, the user will be presented with only the requested data.

DSAF 49

The DSAF 49 is a set of underlying software libraries that implement the utilities and communication infrastructure of the entire system. Constituent libraries of the framework may include both $3^{rd}$ party and in-house developed libraries, namely:

ROOT
   a. I/O system
  Interface Library
   b. DSS
   c. Root Manager
   d. Neutral Data Structures
  Simulation and Analysis Library (SAL)
   e. Object-Oriented simulation objects and containers
   f. Simulation and Analysis algorithms
  Geometry Library (GeoLib)
   g. Geometrical primitives
   h. Geometrical algorithms The ROOT library is a comprehensive data analysis system based on an object-oriented framework that is used for simulation and analysis in particle physics. ROOT has classes for performing data analysis coupled with a system for space intensive data handling and I/O (input/output). The classes borrowed from the ROOT library are TFile and MTree, which together form an object serialization and I/O package. The I/O system uses a premise called object serialization, which is the process of converting a memory-resident instance of a class into an array of byte data which can then be stored. The process is reversible and results in a method which allows the persistent storage and retrieval of program objects. The requirement for building serialized objects is that there must be some definition of a class cast in such a way that the serializing system knows how to translate an instance of an object into a serialized form. ROOT maintains a system for automatically generating these definitions which are called class dictionaries. The TFile class implements file based storage for collections of serialized objects. The TTree class extends this functionality by supplying a framework for storing and accessing large collections of these objects using tandom access iterators. The cost of using these classes in our framework lies in dealing with an incompatibility between ROOT and the MFC libraries used in the UUI. In the current version ROOT is used only as a matter of convenience. Future versions may dispense with the use of ROOT in favor of a home-grown solution for I/O and object is serialization.

DSS 50

The system uses a database to store measurements of the characteristics of the objects and entities that are used in model specification. As explained earlier, the database may be implemented using two schemes. One scheme uses a network-server-based solution, and the other a file-based system which resides on a local medium.

The network based system uses the SAP-DB Open Source Release developed by SAP and released under the Gnu Public License (GPL). The file based system uses the I/O system from ROOT, a scientific library in support of particle physics applications developed at CERN and released under an open source license. The system database 42 is implemented as a single relation indexed by a key which maps to a set of properties for each object instance. The database has three different interfaces which provide different levels of access and models of use. The basic mode of access is user-level which is defined in a class called UserDBSession. A user session is allowed read-only access to system data keys and full access (read, write, delete) to user-defined data. The user based mode is typically used for retrieving lists of the available data in the database, and for managing any custom content defined by the users. The second mode of access is used by the SAL and is defined in a class called SimDBSession. The SAL has read-only access to system data and user-defined data. The SAL only accesses the database to retrieve those items that are required to perform a simulation. The third mode of access, defined by a class called SystemDB-Session, is used in building the system database 42. This interface provides full access and control over anything in the database and is used to manage the system database 42 contents. The second aspect of the DSS is the project archive 41 which is implemented via the RootManager class. The use of either SAP DB or the ROOT based TFile are not binding, and other solutions are possible and may be implemented in future releases.

In order to accommodate the ROOT-MFC incompatibility, a wrapper class called RootManager is created to act as an interface and buffer between the two libraries. The purpose of the RootManager class is to tender the functionality of the ROOT library accessible from within a conflicting namespace such as MFC (in this context, conflicting refers to platform neutrality as well as the compatibility of two libraries when compiled together.) The I/O system from ROOT is used in conjunction with RootManager to implement the project archive 41. The project archive 41 is a file, based on ROOT's TFile class and is created and maintained via RootManager. The structure of the project archive 41 is realized as a set of directories each used for storing a particular object type. These directories include categories for model definitions and simulation and analysis results. RootManager provides a wrapper interface that allows for the creation, access, and manipulation of these files that can be used from within the UUI. As stated earlier, one of the costs of implementing the ROOT I/O system is caused by incompatibilities between ROOT and MFC. This limitation extends to all class dictionaries generated by ROOT for the purpose of object serialization. In order to have access to such objects within the UUI framework and reap the benefits of the ROOT I/O system, a twin set of objects were created that allow full disclosure of such class contents within the UUI, and a system for transforming said objects into a mirroring format that can be used in conjunction with ROOT class dictionaries for object serialization. The classes consist of a set of classes called the Neutral Data Structures along with a corresponding set of mirror classes called the IO Data Structures.

A Neutral Data Structure refers to a class whose members consist of only native types (int, float, char etc.) or objects generated by home-grown utility libraries (e.g. could contain GeoLib objects). By following this paradigm any such data structure can be passed between platforms in a wholly independent and neutral fashion. The neutral data structures are the classes that are used within any endpoint component of the framework. Whenever any such object must be stored persistently, it is transformed into an IO data structure and written to the project archive 41. Upon retrieval, such objects are recast into a neutral format before being given to the requesting application. The advantage of using this method is that the objects are utilizable within any component of the system without the need to affect translations or changes to the objects. In cases where the components use a shared memory, these objects can be directly referenced by each component.

The SAL consists of the set of algorithms and data structures that are used to process a model definition into a set of simulation data, analyze, and interpret those data. The simulation process begins either when a user selects a fully specified model from the project archive 41 or chooses to execute one already in memory. Before the simulation is executed, the user is given the option to record the results of the simulation in the project archive 41. The UUI provides a toolbar interface which allows the user to play, pause, and inspect individual entities as well as access complex analysis functions and visualizations via the aforementioned analysis toolkit. In addition to the simulation algorithms, the SAL defines a set of classes used to describe the objects and data used in a simulation called Profiles.

A Geometry library (GeoLib) comprises two parts, one implementing a basic set of geometrical primitives, and the other implementing specialized algorithms which deal with these primitives. The GeoLib primitive library includes objects to describe points, segments, polylines and polygons, circles, and arcs. These objects follow the neutral structure paradigm and are used within the system whenever an object is needed to define some geometrical property. The algorithms library consists of a toolkit of specialized and generic algorithms used in managing various problems that are encountered in computational geometry. These algorithms include collision/intersection detection, segment overlapping, determination of geometrical encapsulation, and various sorting routines.

Process for Designing a Venue

Figure 22:
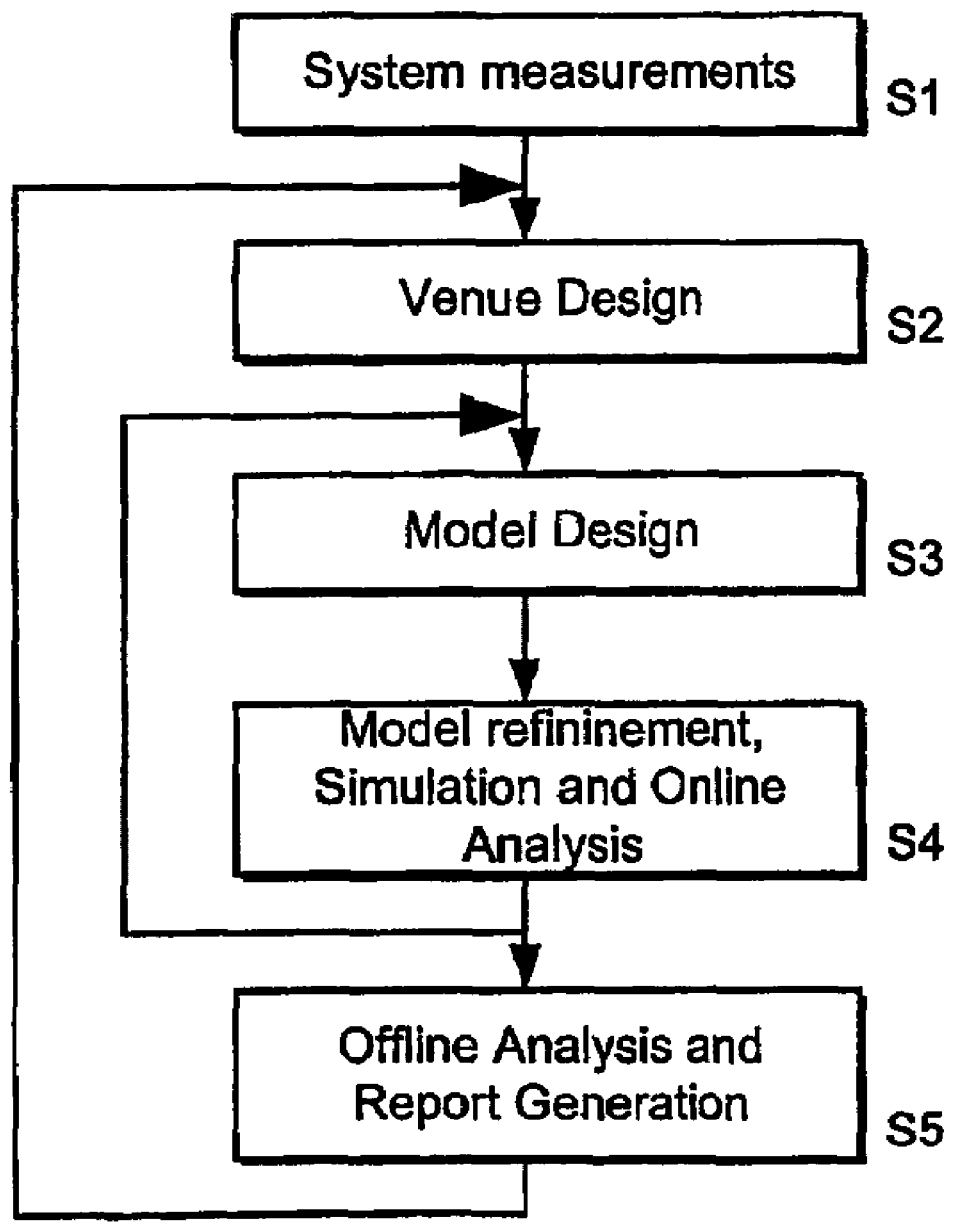
FIG. 22 is a process flow diagram for designing a venue

Referring to FIG. 22, a process for designing a venue will now be described:

Before any venue is designed, a database of measurements that describe characteristics of a population in various venues is built and made available to the system (step S1).

Then the process of designing a venue can begin.

A first or successive version of a design of a venue is provided.

The user launches the UUI 48 and either imports or manually specifies an architectural specification for a particular venue (step S2). The design of the venue is amended through a process that transforms it into a fully defined model that is able to be simulated and analysed using the SAL 51 (step S3). A simulation is performed on the model and may be viewed, analysed and recorded by the user (step S4). The user will usually return to step S3 to make refinements and improve the model using the results of the simulation visualization and online analysis as feedback. During simulation a limited set of simulated measurements are calculated and stored in the project archive 41. The user has the option of analysing these data further either on-line or off-line (step S5). Any such data derived by the user may also be stored in the project archive 41 in a raw format or as in human-readable reports.

If the simulation indicates that the design of venue is in some way deficient, then the venue can be re-designed. It is preferable that the results of the simulation are used to re-design the venue. Additionally or alternatively, a process of "trial-and-error" may also be used.

The process for designing a venue will now be described in more detail in terms of preconditions, processing and post conditions:

Step S1: System Measurements

A research team identifies which measurements are needed, plans a measurement schedule, performs experiments, collects empirical data and analyses it. Based on the analysis, the research team supplies simulation objects and profiles via a database interface (provided by DSS 50) to be stored in the system database 42.

Profiles are data structures that contain distributions of measurements that describe a single characteristic of a particular species or subspecies within a population. These characteristics may include data for walking speeds, personal space preferences, size, etc. The term "species" is used to refer to the entire population within a single venue and locale. The term "subspecies" is used to refer to a subset of the species that has been constrained to contain only certain individuals, for example men, tourists, etc.

Step S2: Venue Design

The user provides a detailed description of the venue, which usually takes the form of an architectural design, together with a specification of the constituents that make up a population to be considered and schedule data describing the dynamic aspects of the venue. The designs may be created using the UUI 48 or imported from prior sources.

Figure 23:
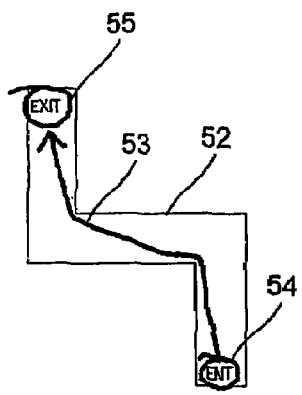
FIG. 23 shows a computer-aided design (CAD) plot of a corridor.

Referring to FIG. 23, a CAD file of a design of a corridor 52 is created or imported. In this case, the CAD file is in a .dxf file format. For the purpose of illustration, a general path 53 is shown between an entrance 54 and an exit 55.

Figure 24:
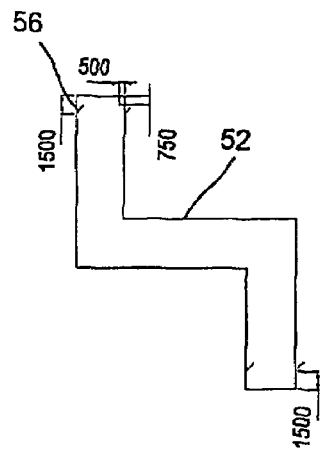
FIG. 24 shows another plot of the corridor shown in FIG. 23.

Referring to FIG. 24, if a template is used, then markers 56 may be placed to aid design.

Figure 25:
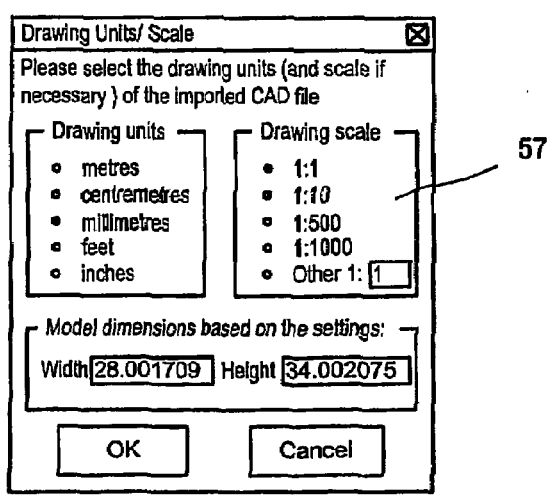
FIG. 25 illustrates a dialog box for providing model parameters.

Referring to FIG. 25, details regarding properties of the model, such as model dimensions, are supplied through dialog boxes.

The file is loaded into the UUI 48, converted into an internally-used format, herein referred to as a ".lgm" format, and stored in a project archive 41. Processing may include annotations to the CAD design in the form of data cleansing and geometrical corrections done for quality assurance.

The project archive 41 is now ready for processing into a model ready for simulation.

Step S3: Model Design

The project archive 41 comprises an initial description of the venue to be simulated.

Processing of the model design comprises defining the participant entities and objects to be used in the simulation, specifying event schedules, defining entity sources and sinks, such as entrances, exits, supply rates and limits, creating a high level description of how the simulation should be realized. It usually includes multiple transactions with the project archive 41 and possibly the system database 42 as the model is built and its persistent state in the archive is updated. Transactions with the system database 42 may include downloading pertinent data for designing a model, or uploading custom objects so that they may be available for later reuse.

Thus, a version of the model is fully specified and is stored in the project archive 41 in a 'ready-to-run' state. It may be run in a simulation or reopened for further construction and refinement.

Figure 26:
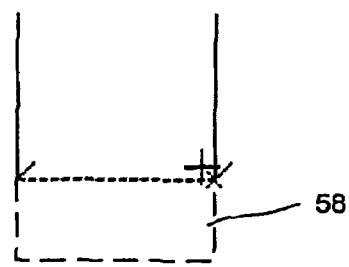
FIG. 26 shows a magnified plot of a first end of the corridor shown in FIG. 24 with an entrance.

Referring to FIG. 26, in a model design mode of interaction, a rectangular entrance 58 is defined. This may involve drawing and "snapping" a rectangle to the corners of the corridor.

Figure 27:
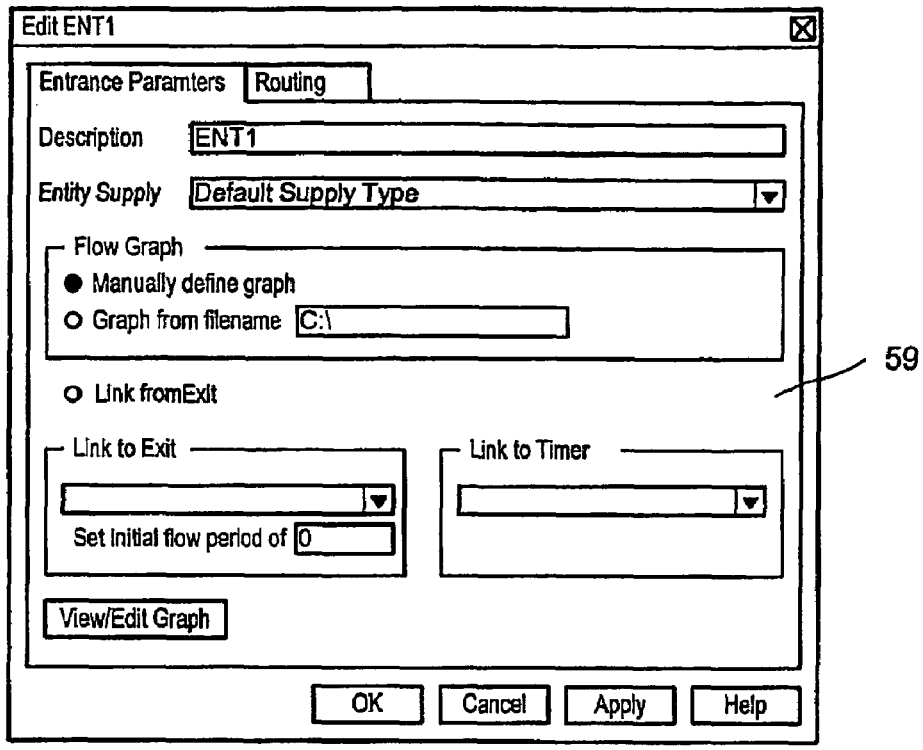
FIG. 27 illustrates a dialog box for providing entrance parameters.
Figure 28A:
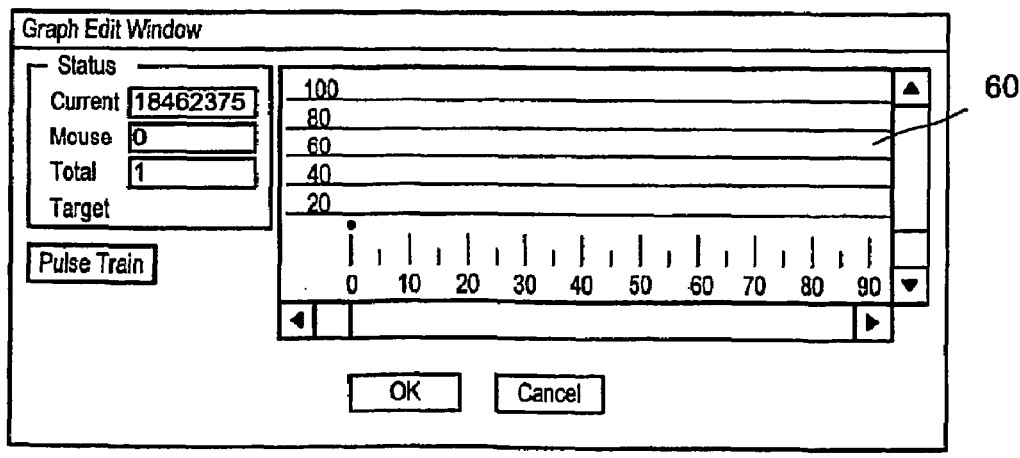
FIG. 28a shows a pulse train of supply of pedestrians through the entrance.
Figure 28B:
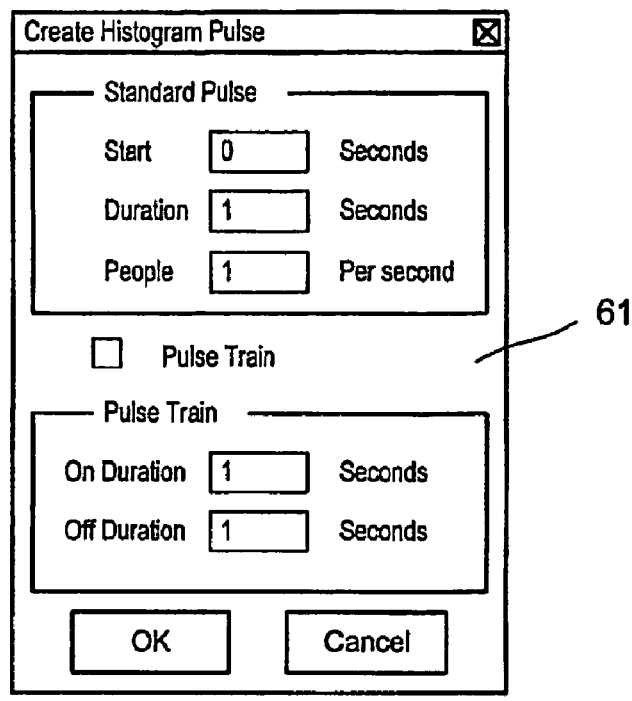
FIG. 28b illustrates a dialog box for providing pulse train parameters.

Referring to FIGS. 27 and 28a and 28b, properties of the entrance 58 are defined via a dialog box 59. For example, this may include defining a pulse train 60 in terms of duration and flow which are entered through a dialog box 61.

Figure 29:
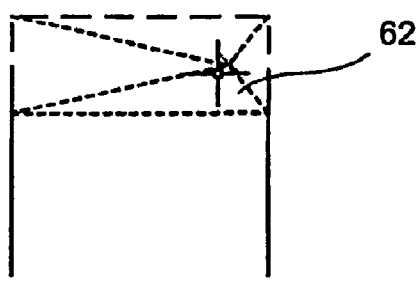
FIG. 29 shows a magnified plot of a second end of the corridor shown in FIG. 24 with an exit.
Figure 36A:
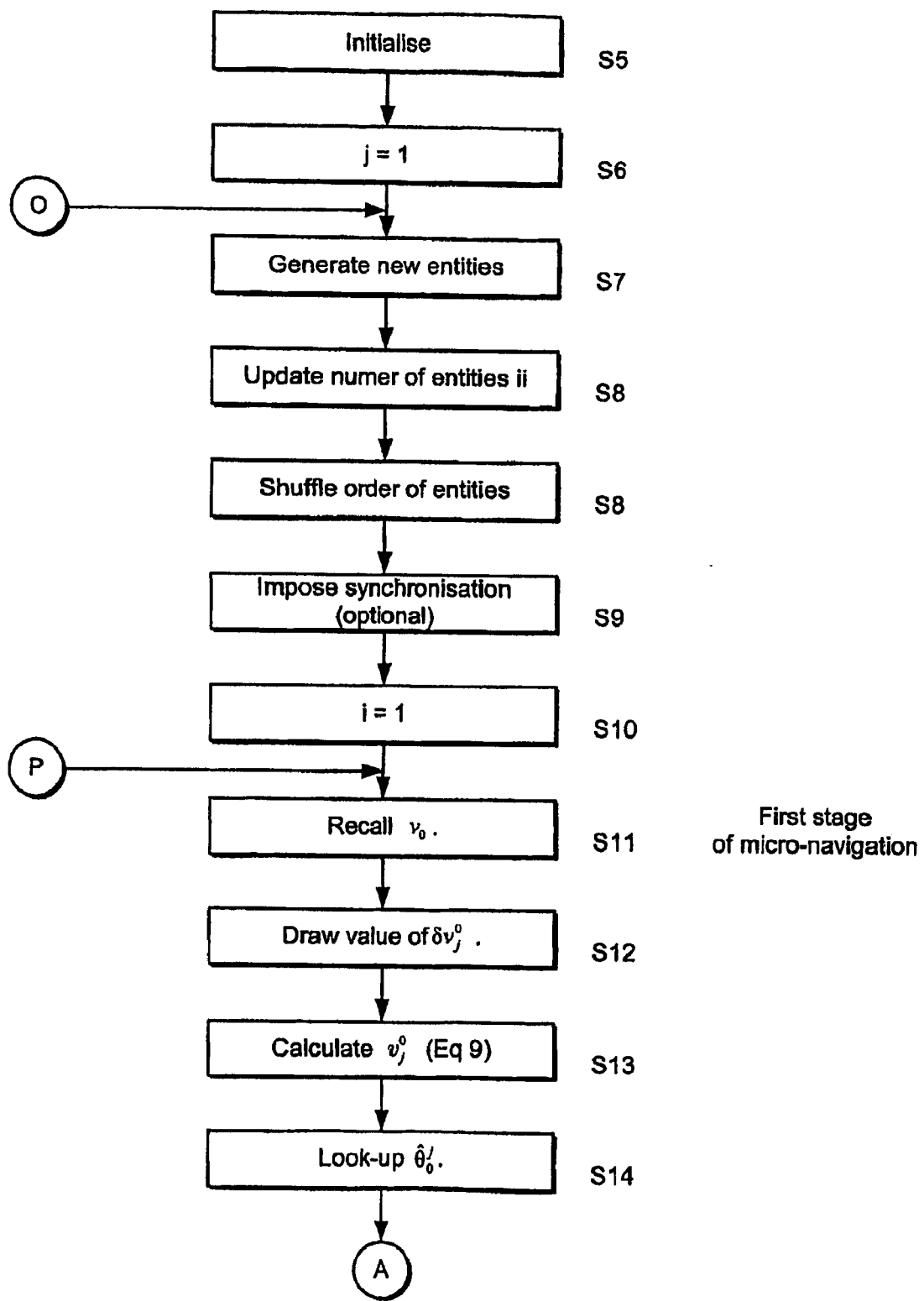
FIG. 36 is a process flow diagram for simulating movement of an autonomous entity.
Figure 36B:
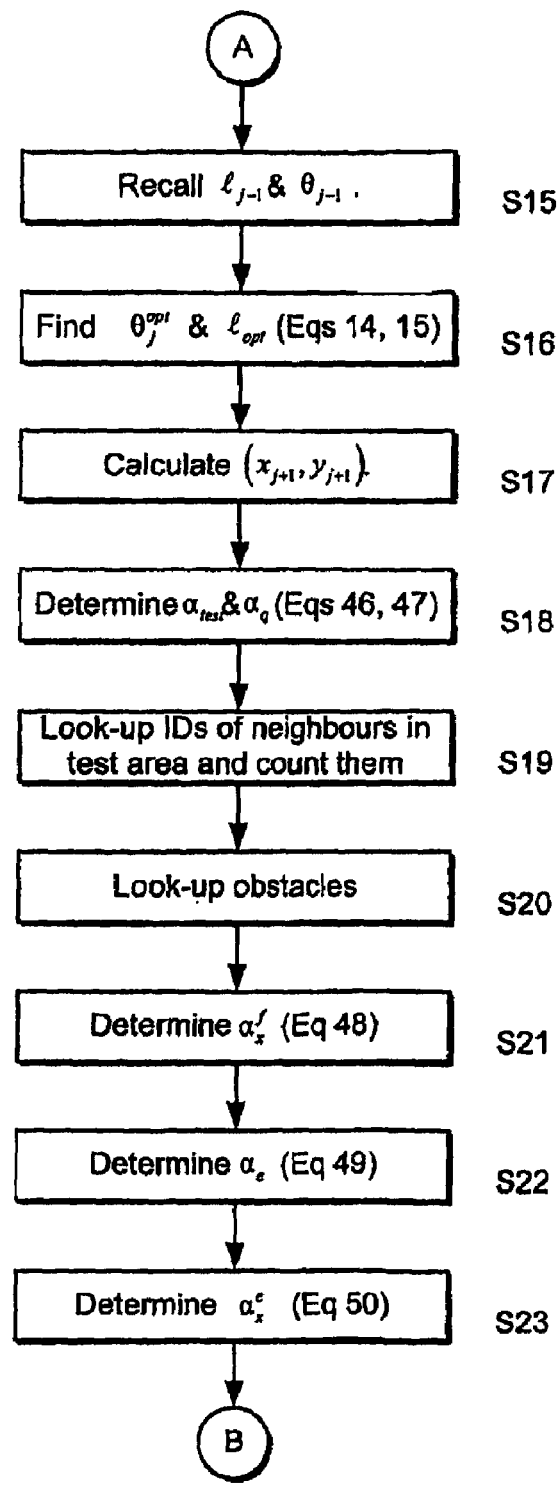
Figure 36C:
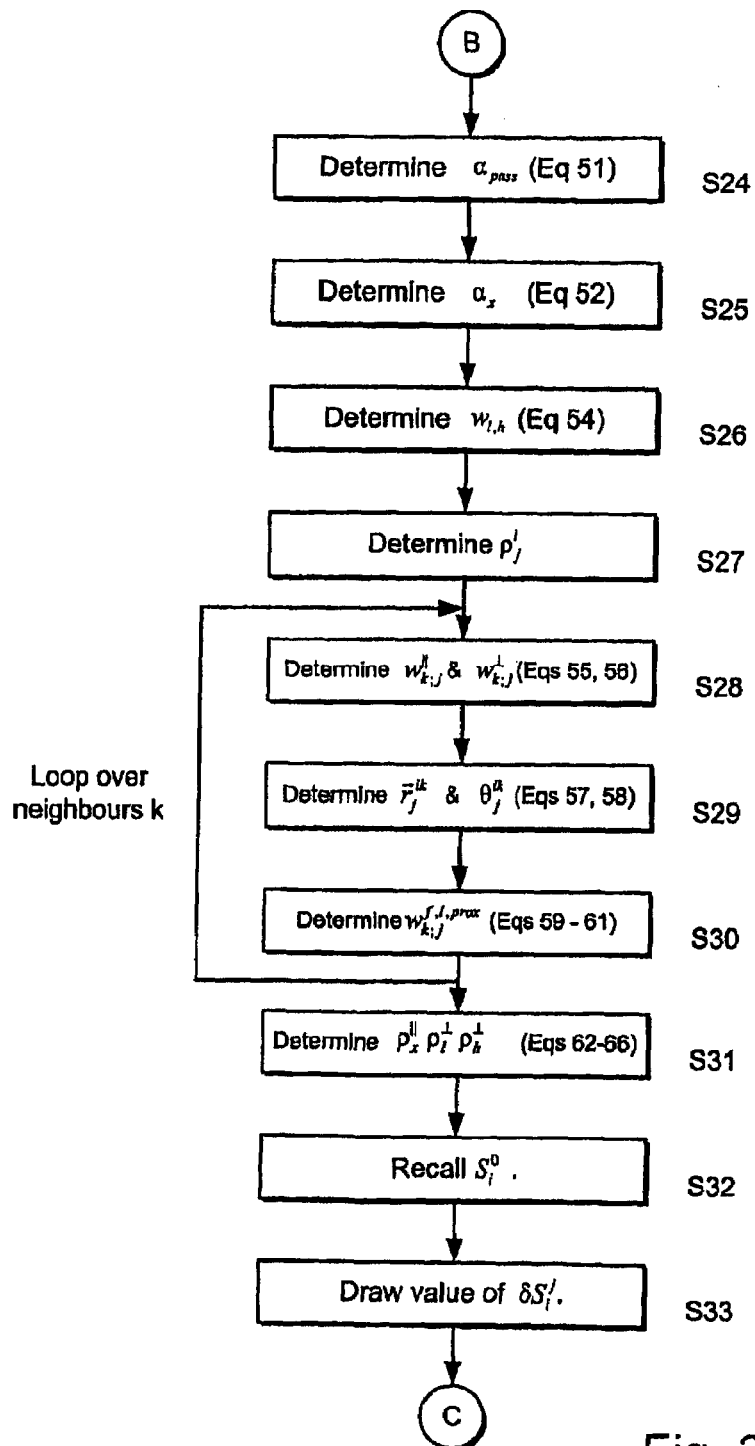
Figure 36D:
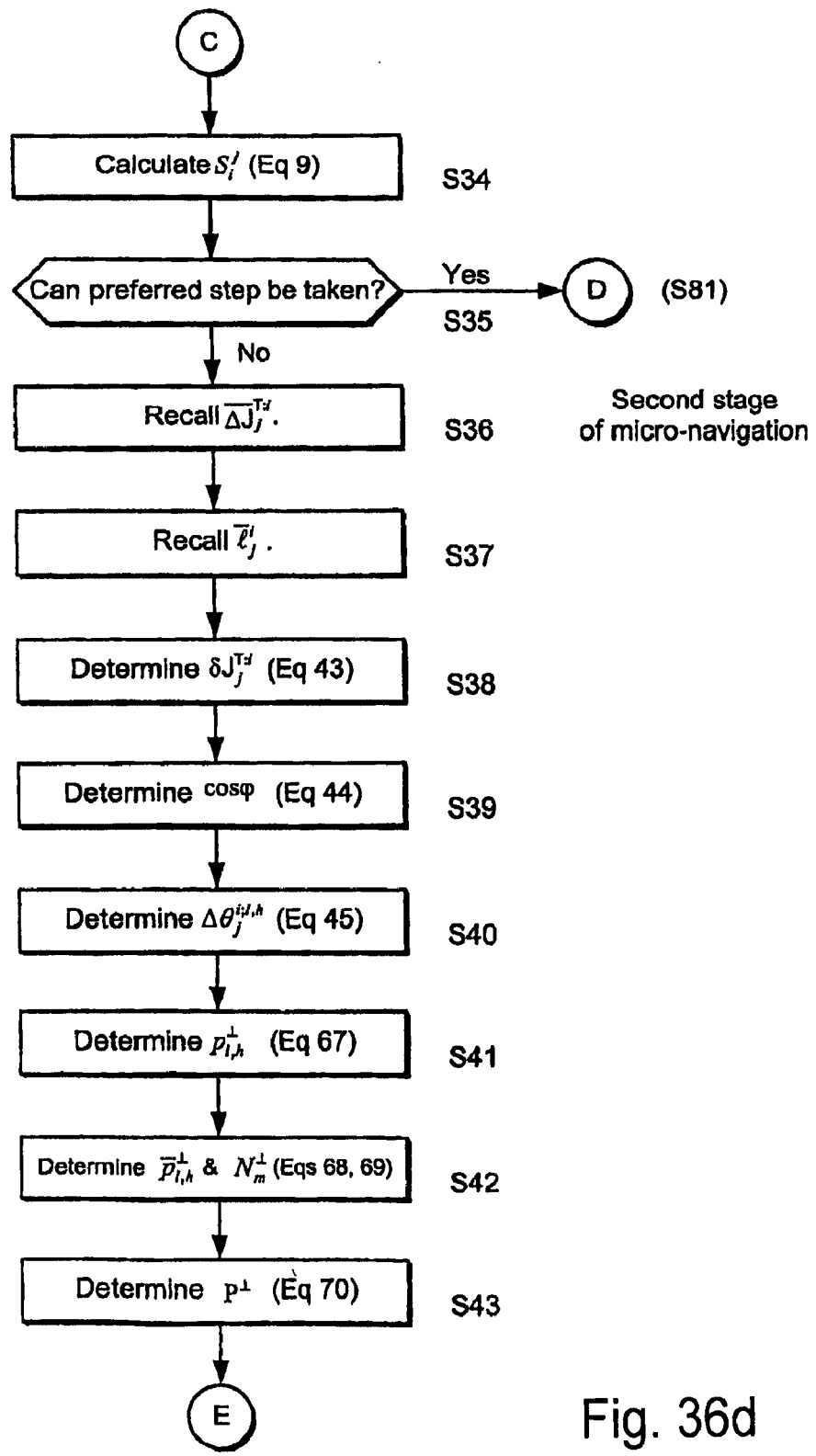
Figure 36E:
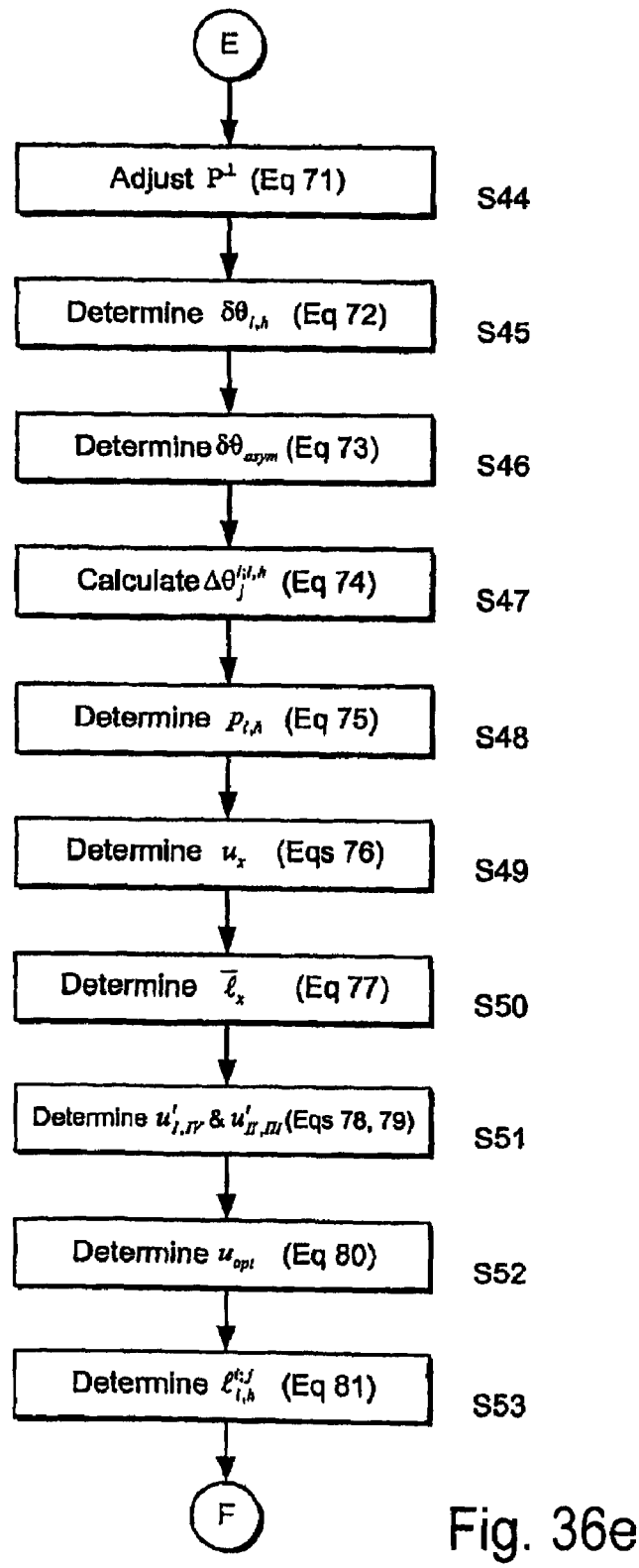
Figure 36F:
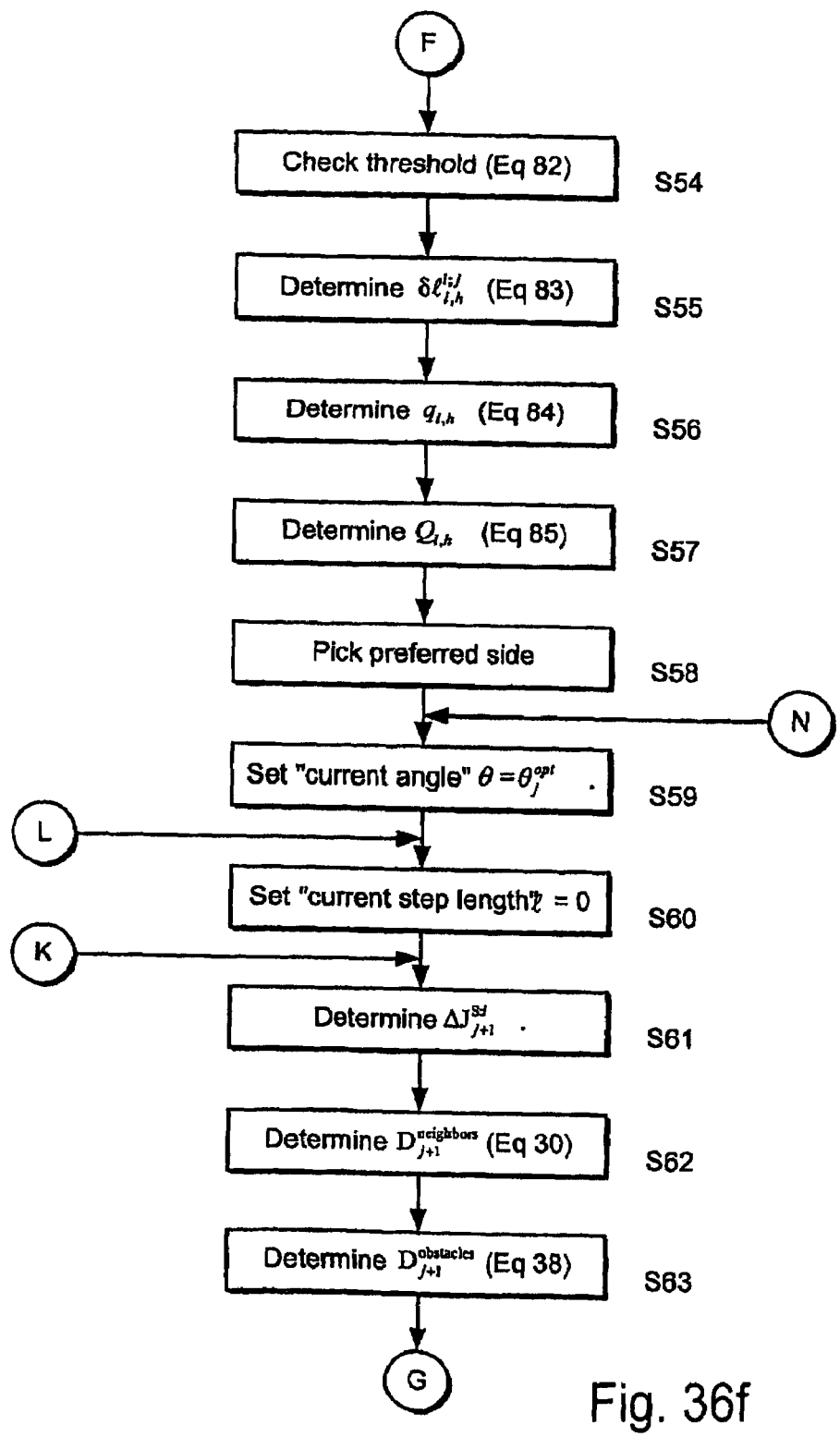
Figure 36G:
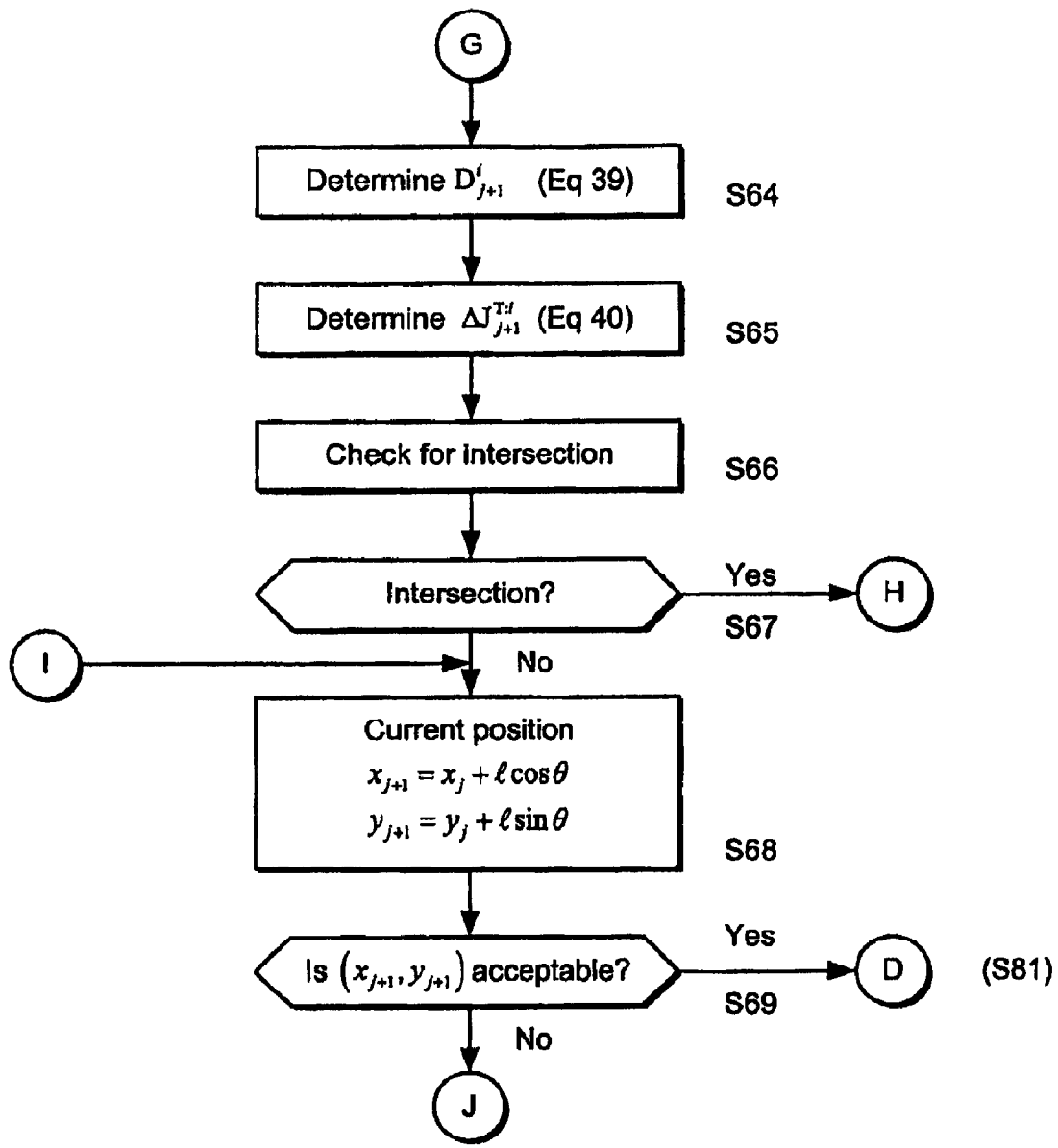
Figure 36H:
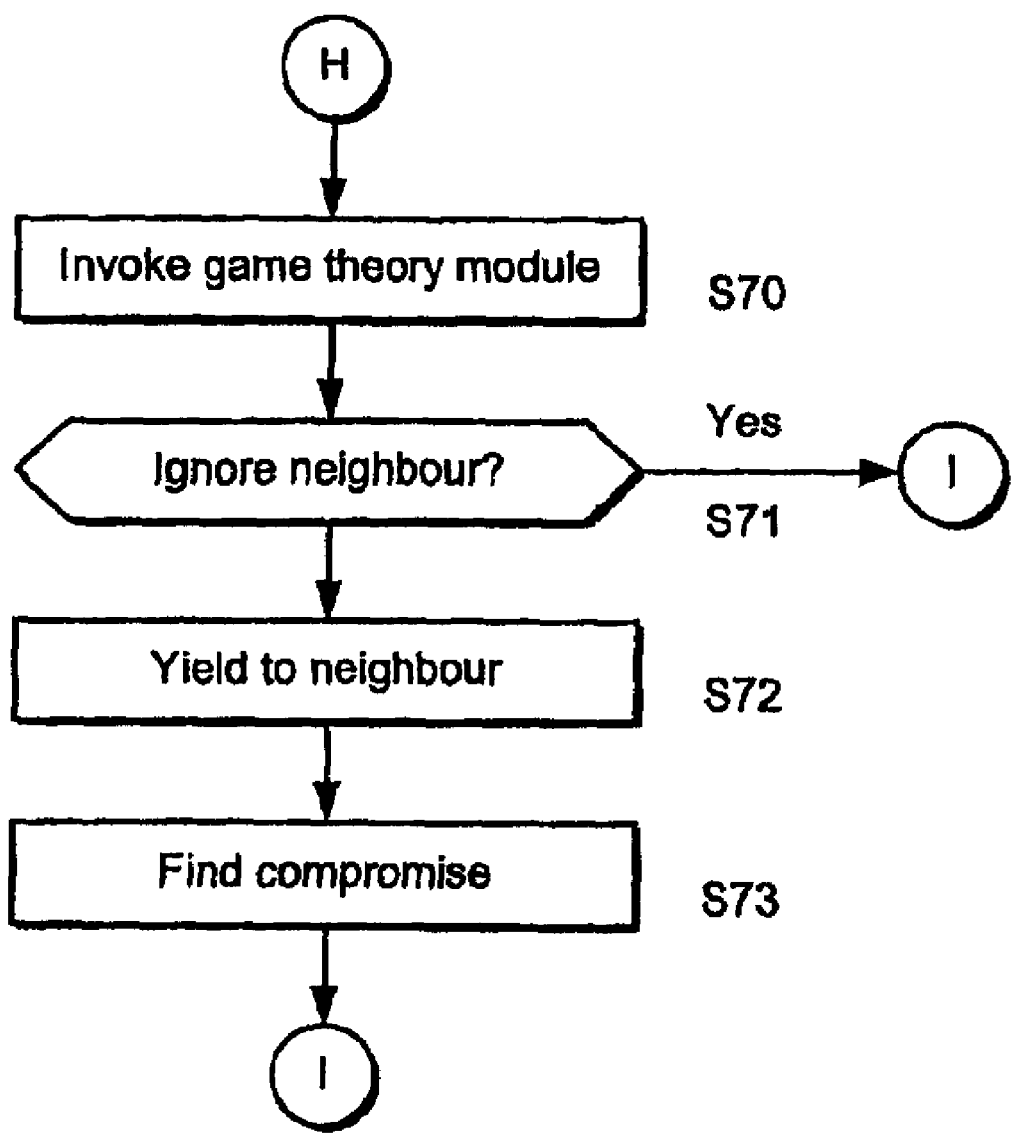
Figure 36I:
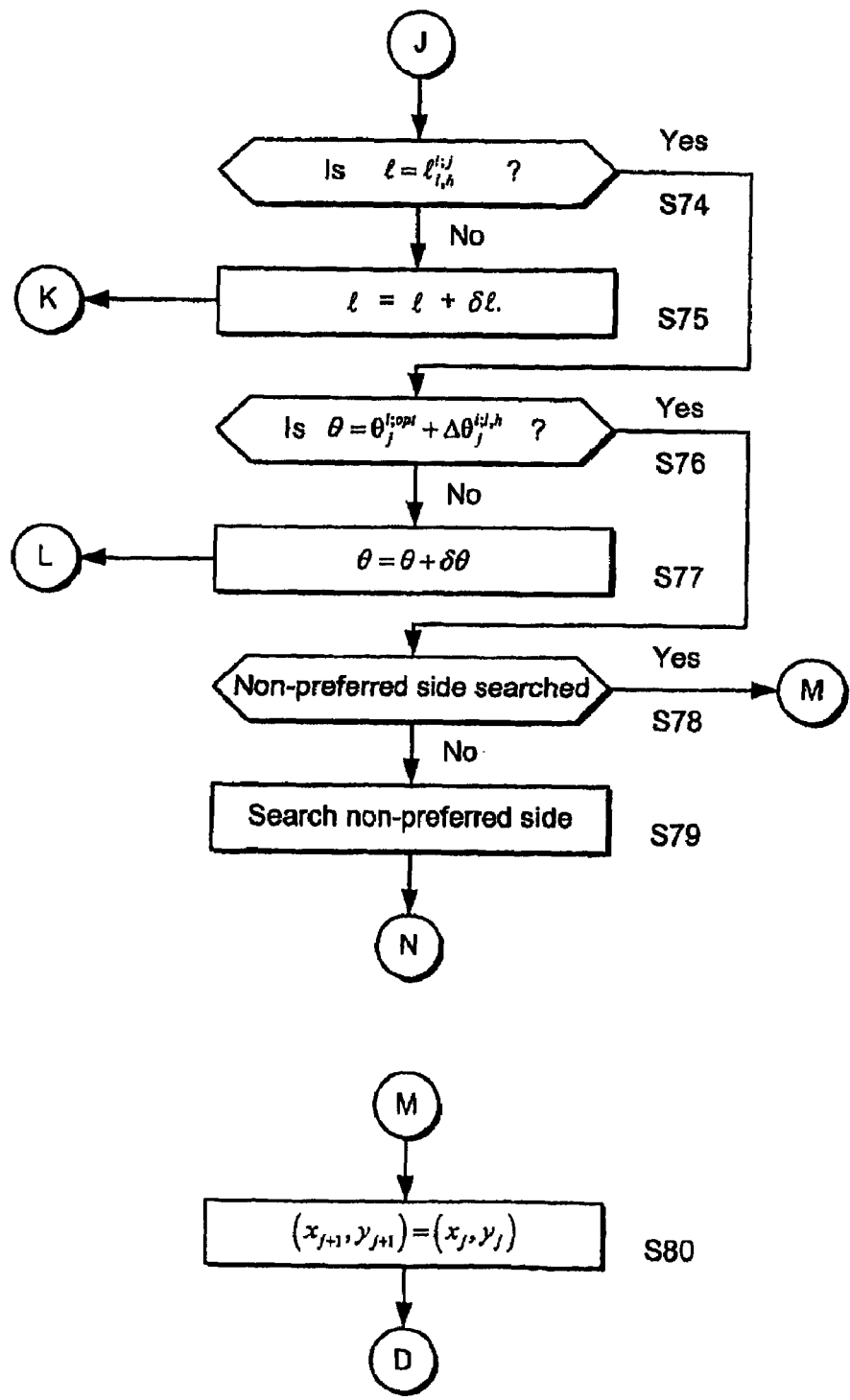
Figure 36J:
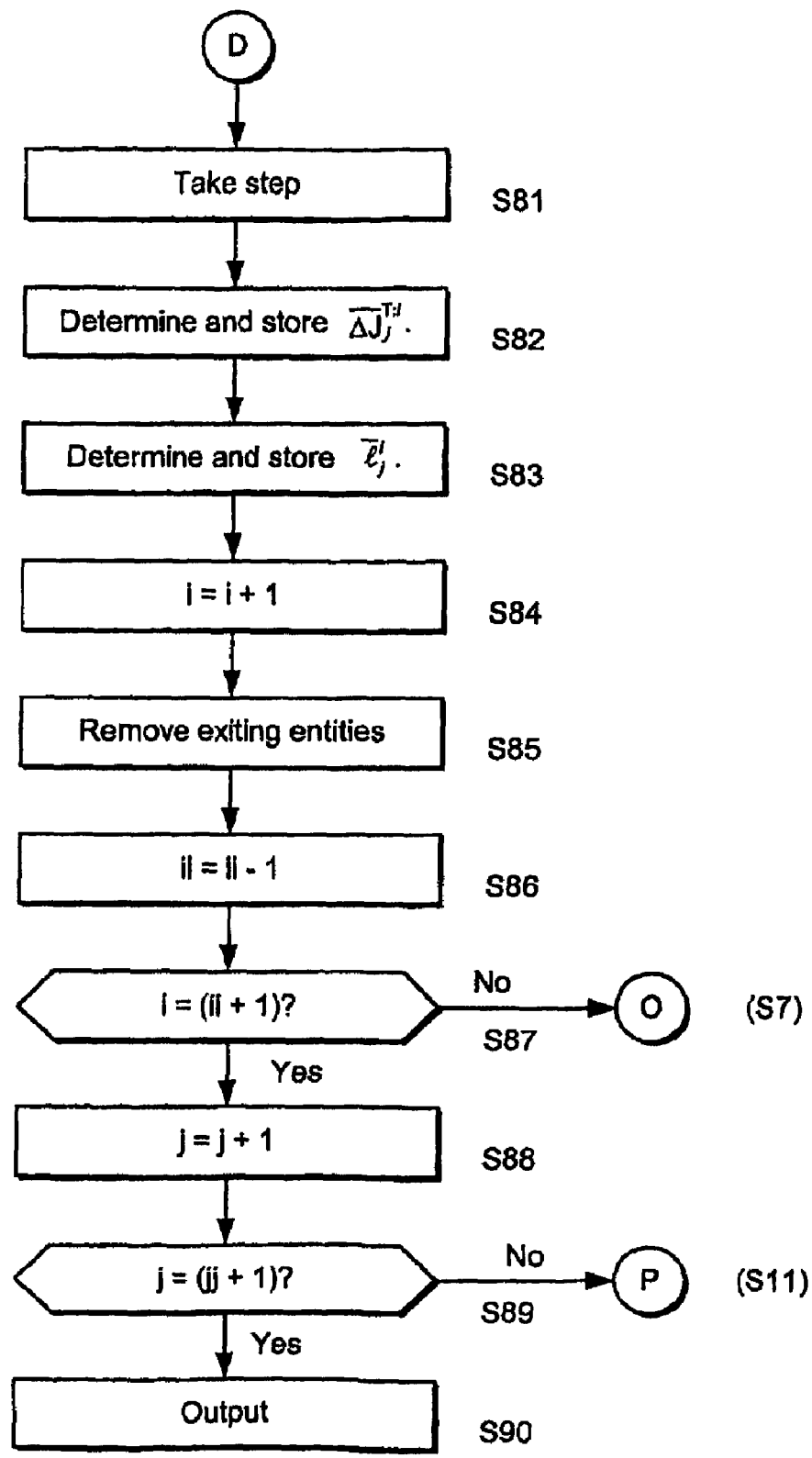

Referring to FIG. 29, a rectangular exit 62 is also defined. Again, this may involve drawing and "snapping" a rectangle to the corners of the corridor.

Referring to FIG. 30, a model 63 of the corridor is shown. The user links the entrance and exit and a line 64 is defined between a start point 65 with an intended destination 66.

The file is saved, for example in .dxf format and quality assurance may be performed. The file is also saved as a simulation file, for example with an extension ".ora", in project archive 41.

Step S4: Model Refinement, Simulation and Online Analysis

A simulation engine loads the model specification, in the form of the simulation file, from the project archive 41 and performs a simulation using the method of navigating according to the present invention. At discrete steps in the simulation, data are stored in the project archive 41, for example in the form of a ".res" file, that can be used to 'replay' the simulation at a later time and perform off-line analysis. The user may view the simulation as it runs and has the option to perform online analysis.

After a simulation is completed, the user has a minimal set of data generated by the simulation that is stored in the project archive 41 by default. The user may also optionally have stored reports generated from any online analysis performed during the simulation. High-level detailed data may be generated on-line or off-line from the minimal set in the project archive 41.

Step S5: Offline Analysis and Report Generation

The user interacts with a recorded session of a simulation and performs analysis using the recorded data. Additional data are generated depending on the analysis procedure specified by the user. These analysis data are then organized into reports and are finally generated in a human-readable format specified by the user. It is not mandatory that any analysis be performed off-line. In most cases off-line analysis will only be performed on large models due to performance constraints.

The project archive 41 contains the results of the analysis, and any customized analysis scripts/macros created by the user in an automated menu supplied in the UUI 48. Reports generated from the analysis may be stored in the project archive 41 or on disk.

Referring to FIG. 31, an example of a path 67 of a pedestrian through the corridor 52 at 600 ms intervals is shown.

In the example described above, macro-navigation is very simple because a single intended destination 66 is defined.

However, as described earlier, a more refined (but still simple) method of macro-navigation may be used, employing intermediate intended destinations.

Referring to FIG. 32, the user may divide the corridor 61 using guide lines $68_1, 68_2$.

Referring to FIG. 33, a pair of intermediate destinations $69_1, 69_2$, referred to here as foci, are defined in when defining the model. Corresponding areas $70_1, 70_2$, referred to here as focal drift zones, are also defined. When located in the first focal drift zone $70_1$ the user drafts towards the first focus $69_1$. Likewise, when located in the second focal drift zone $70_2$ the user drifts towards the second focus $69_2$. A requirement is also set that a pedestrian should be at least 0.5 m from a wall.

Referring to FIG. 34, the focal drift zones $70_1, 70_2$ are shown together with the preferred orientation angles $71_1, 71_2$.

The model is stored and run by the simulator, this time navigating the pedestrian from one intermediate destination to another.

Referring to FIG. 35, a revised path 67' of a pedestrian through the corridor 52 at 600 ms intervals is shown.

Having examined the simulation, the designer may consider that the time taken to pass down the corridor is too long. To reduce the time, they may decide to "round-off" corners, introduce a straighter or wider corridor.

It will be appreciated that more complicated models may be defined using a plurality of entrances and exits and more detailed models. For example, a more complicated model of a corridor using bi-directional flow, may show that pedestrians are likely to bump into one another. This may prompt the designer to make appropriate changes in design or consider the use of signs or barriers to guide pedestrians.

Simulator

Figure 37:
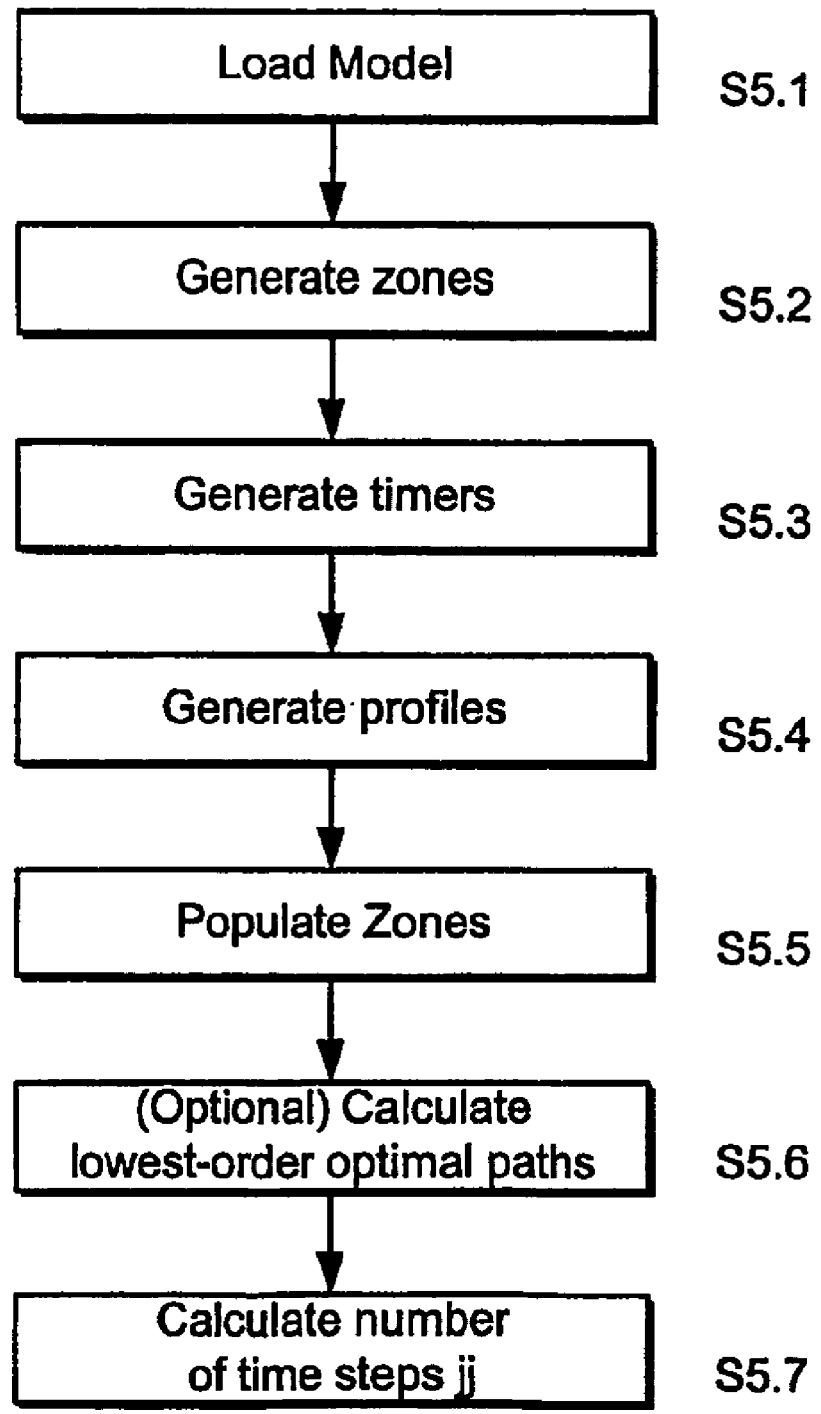
FIG. 37 is a process flow diagram for initialisation and
FIG. 38 is a process flow diagram for determining whether a preferred step is feasible.
Figure 38A:
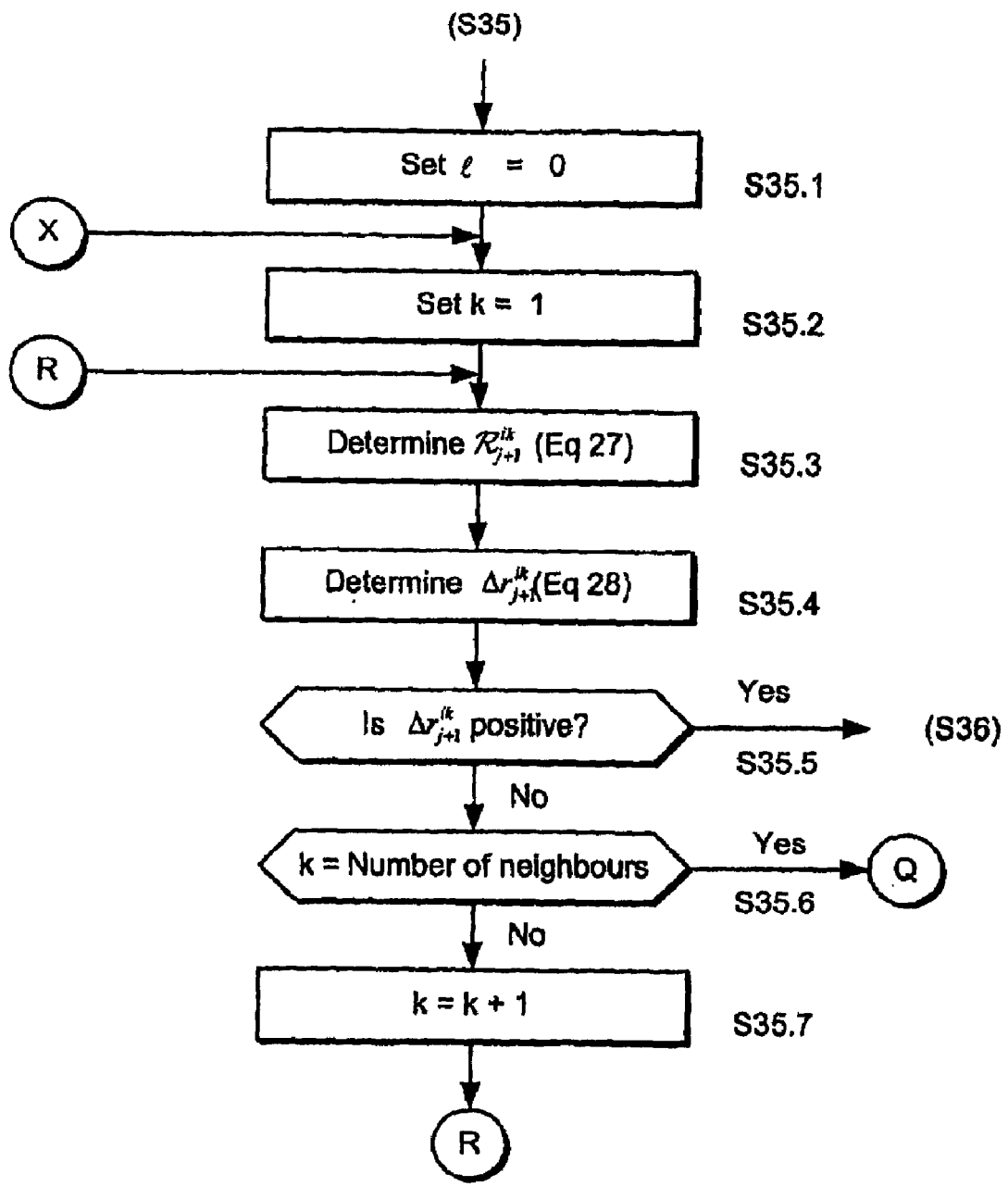
Figure 38B:
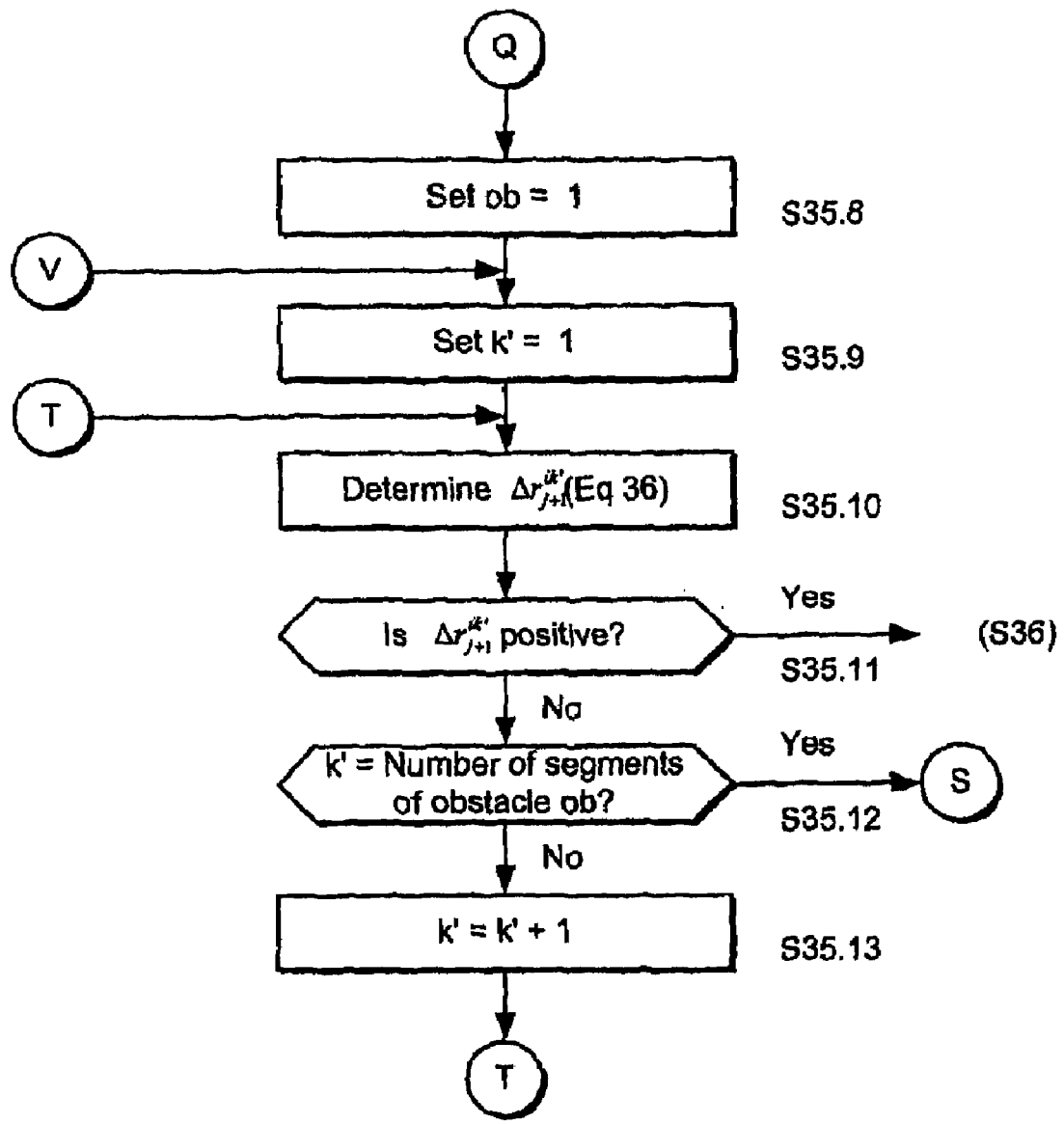
Figure 38C:
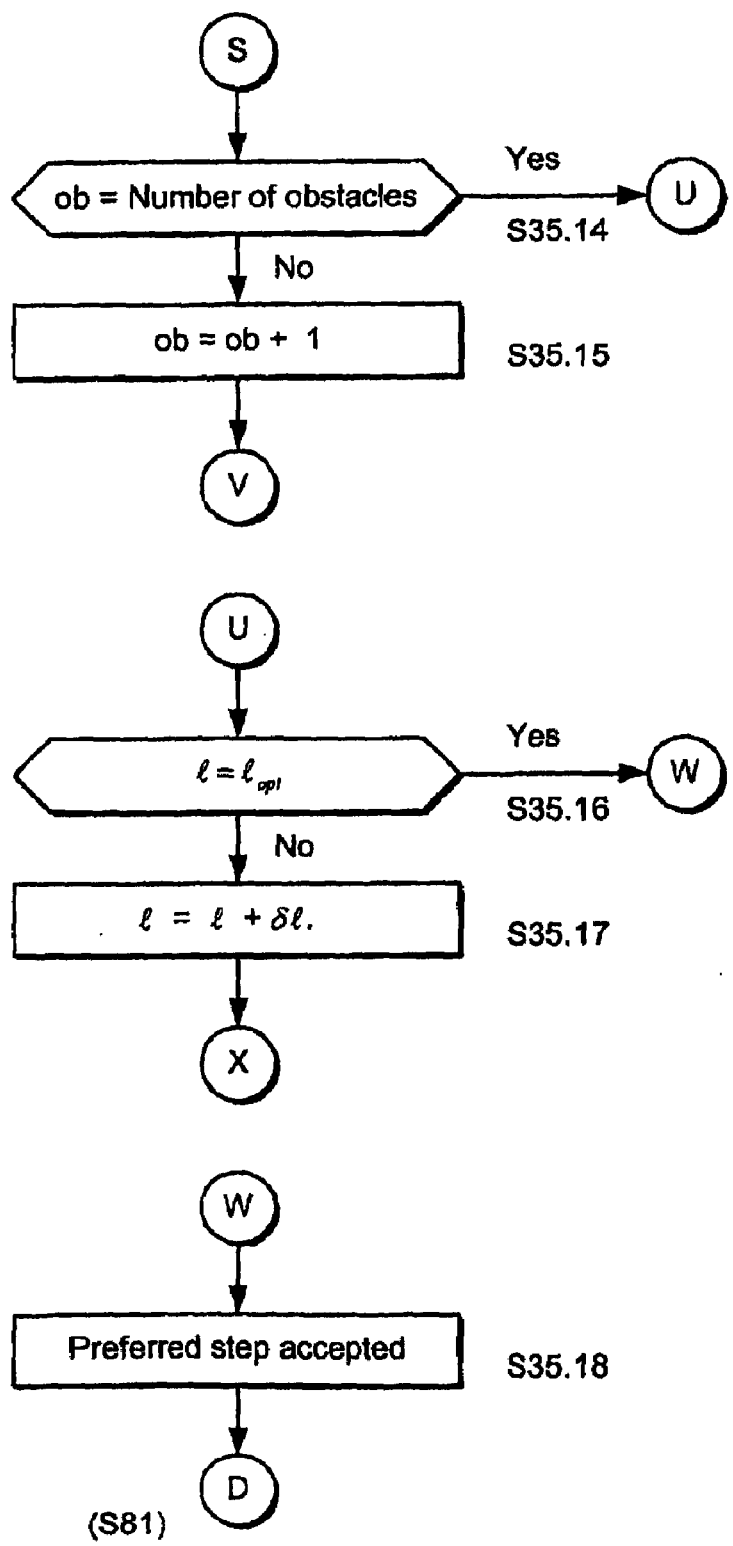

Referring to FIGS. 36, 37 and 38, a process flow diagram is shown of the method of simulating movement of an autonomous entity through an environment. For example it may be used to determine the path taken by the pedestrian through the corridor as described earlier. Parts of the process are described in more detail above.

The simulator is initialised (step S5) and includes loading the model including spatial information regarding the venue (step S5.1) and determining zones, for example by partitioning the venue into different regions, such as waiting zones and drift zones (step S5.2). Attributes, as specified during model building, are ascribed to the zones. Timers are generated (step S5.3). These include timers for controlling arrival/departure profiles from the demand data and timers associated with objects either supplied by the user or established experimentally from measurements. These later timers may include waiting times for entities buying a ticket from a vending machine, getting information from an information booth or consulting a bulletin board.

Initialisation also includes retrieving information from the system database 42 (FIG. 20) needed to generate profiles used in the simulation and generating new profiles from existing profiles (step S5.4). Entities are represented by one of these profiles. The method includes populating the zones (step S5.5) by dispersing entities throughout the venue. Each entity has a profile and a destination objective. Thus, this provides a snapshot of the venue at time zero, when the simulation starts.

In the example described above, macro-navigation is "hardwired". Nevertheless, macro-navigation may be more sophisticated and may comprise calculating lowest-order optimal paths associating every point in the venue with every destination objective specified in the model via a suitable direction angle (step S5.6). This comprises calculating a continuous field per destination objective, from where entities will subsequently seek their $\theta_o$ at each step throughout the simulation. This information is stored as multi-layered spatial grids.

Finally, initialisation includes calculating the number of time steps (jj) for the simulation (step S5.7). This may be calculated by dividing a duration specified by the designer, for example 6000 seconds, by the step duration 0.6 seconds.

The simulation then begins at the first step (step S6).

New entities are created at entrances according to so-called "demand data" specified by the user during model building (step S7). The demand data specifies arrival distributions as a function of time, broken down by profile and objective. For example, for a railway station, data are supplied relating to the distributions of people arriving at various entry points, with percentages of profiles represented in these populations, such as male commuters, tourist couples etc., as well as percentages of people with certain objectives, such as heading to a particular platform to catch train departing at a particular time. Entities are also eliminated when they exit the simulation, for example through an exit or departing train.

Generating an entity comprises randomly positioning a new entity just outside an entrance and attributing to it a destination objective and profile as prescribed by the demand data, and also attribute to it randomly drawn values from appropriate attribute continuous distribution functions pertaining to the profile which represents the entity.

For example, a profile defined by a locale, such as the UK, and venue, such as a railway Station, has associated with it a plurality of distribution functions including preferred speed, spontaneous speed noise, clearance tolerance, clearance tolerance noise, physical space radius and, optionally, luggage area. Thus, generating an entity for a UK train station comprises randomly drawing a value of preferred speed, a value of clearance tolerance, a value of physical size and, optionally, a value of luggage size form respective distribution functions and positioning the entity at an initial position just outside an entry point at a time commensurate with the "demand data". Subsequently, on its first successful step the entity will enter the simulated venue and proceed to advance toward its destination objective as described earlier.

The number of entities is updated (step S8). The order in which entities are considered and moved is shuffled (step S9). However, there may be regions where entities synchronised and this may be corrected (step S9).

A first entity is chosen and the process of determining a step begins (step S10).

A value of instantaneous speed $v_j^o$ is determined based upon preferred speed $v_0$ and a freshly obtained value of preferred speed noise $\delta v_j^o$ (steps S11 to S13).

Macro-navigation provides an orientation angle $\hat{\theta}_0^j$ (step S14). The entity recalls information regarding the previous step, namely previous step length $l_{j-1}$ and previous orientation angle $\theta_{j-1}$ (step S15). A preferred step may then be determined in terms of preferred orientation $\theta_j^{opt}$ and preferred step length $l_{opt}$ (step S16). A new position is then determined (step S17).

A process of determining whether the preferred step can be taken is executed (steps S18 to S35).

This comprises determining a test area 29 (FIG. 15) and identifying neighbouring entities and obstacles within the test area 29 (steps S18 to S20). The position and identity of the entities is stored in a spatial grid, which is updated at the end of a step. Identifying neighbouring entities comprises overlaying said test area and said grid.

A density of neighbours is identified by counting the number of entities within the test area 29 (FIG. 15) and dividing by the area (step S27).

Referring to FIG. 38, a process of determining whether the preferred step is feasible is then determined (step S35)

Step-increment and neighbour counters are set (steps S35.1 & 35.2). For a plurality of positions l along the step and for each neighbour and obstacle $R_{j+1}^{ik}$ and $\Delta r_{j+1}^{ik}$ are calculated (steps S35.3 to S35.18). If $\Delta r_{j+1}^{ik}$ is positive, then the step is deemed not to be feasible. This is done for each position l along the step (steps S35.16 & S35.17), for each neighbour k (steps S35.5 to S35.7) and for each segment of each obstacle (steps S35.8 to S35.13). If no such neighbour or obstacle is found, then the preferred step is accepted (step S35.18).

If the step is found to be unfeasible, then the second and third stages of micro-navigation are employed (steps S36 to S90).

An angular range over which to conduct a search is determined (steps S36 to S40), a preferred side and adjusted step length are also determined (steps S41 to S57). This is described in detail earlier. Steps S41 to S57 comprise a learning and adaptation routine.

A process of conducting a search for a compromise step within a sub-region 37 (FIG. 18) and determining whether potential compromise steps are feasible is then conducted (steps S58 to 81). For each potential compromise step expressed in terms of a current angle $\theta$ and current step length l self-dissatisfaction $$\Delta J_{j+1}^{S;i}$$

is calculated based on inconvenience and frustration.

$$D_{j+1}^{neighbors}$$

is determined (step S62). This comprises looping over candidate offending neighbours, calculating $R_{j+1}^{ik}$ for each in the loop, calculating $V_{j+1}^{ik}$ for each in the loop and summing contributions throughout the loop so as to determine $$D_{j+1}^{neighbors}.$$

$$D_{j+1}^{obstacles}$$

is determined (step S63) in a similar fashion. $D_{j+1}^i$ and $$\Delta J_{j+1}^{T;i}$$

are determined (steps S64 & S65).

A check is made whether the path of the step is intersected by another entity (step S66). If the path of the step is intersected by another entity, then game theory (step S70) may be used to determine whether the entity can ignore the neighbour (step S71) or yield to the neighbour (step S72) and find a compromise (step S73).

Otherwise, based upon the position of the step (Step S68), it is determined whether the current step is acceptable (step S69). This involves determining whether the total dissatisfaction $$\Delta J_{j+1}^{T;i}$$

at current position is less than the total dissatisfaction of the best solution so far and, if so, updating the best solution to be the current step. Then a check is performed as to whether the current step length is equal to feasible step length for the current angle, namely $$l = l_{l,h}^{i;j}.$$

If so and if the total discomfort $$\Delta J_{j+1}^{T;i} = 0,$$

then the current step is determined to be acceptable. Otherwise, a check is carried out whether the current angle is the last angle, namely $\theta = \theta_j^{i;\,opt} + \Delta \theta_j^{i;\,l,h}$. If so, the best solution so far is kept and determined to be acceptable.

If not, it is determined whether the current step length is equal to a "feasible" step length (step S74). If not, the step length is lengthened (step S75) and a new compromise step is considered (step S61). If the feasible step length is reached, then it is determined whether the preferred side has been swept (step S76). Is not, a wider orientation angle is used (step S77). If so, then the non-preferred side is swept (step S78 & S79).

Thus, the search continues towards less favourable solutions. If no solution is found, then the entity does not take a step.

The entity takes their step (step S81). Values for $\overline{\Delta J}_j^{T:i}$ and $I_j^i$ are determined and stored (steps S82 and S83), i.e. the entity "remembers" these values.

The process moves onto the next entity (step S84) and continues for each existing entity (step S85). Once all the entities have moved, those entities which leave the venue are removed (step S86 & S87). The process moves onto the next step (step S88).

Thus, the process is repeated for each entity for each step for the duration of the simulation (step S89). At the end of the simulation, data regarding each entity and each step is outputted and can be saved as a file (step S90). The data can be displayed so as to show the path of one or more of the entities as they move through the venue.

From reading the present disclosure, other variations and modifications will be apparent to persons skilled in the art. Such variations and modifications may involve equivalent and other features which are already known in methods of simulating movement of an entity and may be used instead of or in addition to features already described herein. For example, many of the formulas derived above are based on defining an action and minimizing energy-work expenditures using variational techniques. However, other derivations may be used, whose methods are analogous. Furthermore, although the methods herein described are suitable for simulating movement of an entity, they may be adapted for controlling and navigating entities, such as a robot. The methods of simulating and controlling movement of an entity are suitable for multi-level structures. A step may be replaced by a unit of translation.

It will be appreciated that functions such as discomfort, frustration and dissatisfaction may be expressed differently, merged or separated into one or more functions and still have substantially the same effect. It will be appreciated that whereas a function may be minimised, a corresponding function may be found which can be maximised and thereby achieve substantially the same result.

It will also be appreciated that stages such as the first and second stages can be merged or separated into one or more stages.

Although claims have been formulated in this application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of simulating movement of an autonomous entity through an environment, the method comprising:
   providing a provisional path through a model of the environment from a current location to an intended destination;
   providing a profile for said autonomous entity;
   determining a preferred step towards said intended destination based upon said profile and said provisional path, wherein determining said preferred step comprises determining a first dissatisfaction function for expressing a cost of taking a step comprising a sum of an inconvenience function for expressing a cost of deviating from a given direction and a frustration function for expressing a cost of deviating from a given speed;
   determining a personal space around said autonomous entity;
   determining whether said preferred step is feasible by considering whether obstructions infringe said personal space; and
   recording a feasible preferred step so as to allow movement of said autonomous entity to be determined.

2. A method according to claim 1, wherein if said preferred step is not feasible, then the method further comprises:
   determining a region in which to seek a compromise step;
   determining whether at least one compromise step is feasible;
   choosing one of a plurality of compromise steps; and
   recording said one of the plurality of compromise steps so as to allow movement of said autonomous entity to be determined.

3. A method according to claim 2, wherein determining said region includes adapting step parameters for determining said region in dependence upon at least one locally perceivable condition.

4. A method according to claim 2, wherein determining said region includes adapting step parameters for determining said region in dependence upon memory of past conditions.

5. A method according to claim 1, wherein the determining of said personal space comprises defining a region in which absence of obstructions is sought.

6. A method according to claim 1, wherein said obstructions include other autonomous entities.

7. A method according to claim 1, wherein said obstructions include fixed obstructions.

8. A method according to claim 1, further comprising determining said inconvenience function for expressing a cost of deviating from a given direction.

9. A method according to claim 8, wherein said provisional path includes a direction from said current location to said intended destination and said profile includes a preferred step length, and wherein the determining of said inconvenience function includes:
   determining a first amount of work required to take a step of given step length;
   determining a second amount of work which is a proportion of said first amount of work corresponding to a component which is not directed in said optimal direction.

10. A method according to claim 9, wherein the determining of said inconvenience function includes:
   determining an acceleration associated with a change in velocity between said step and a previous step and
   determining a third amount of work required to produce said acceleration.

11. A method according to claim 10, wherein the determining of said inconvenience function includes summing said second and third amounts of work.

12. A method according to claim 1, further comprising determining said frustration function.

13. A method according to claim 12, wherein said profile includes a preferred walking speed and the determining of said frustration function comprises:
   determining a preferred instantaneous walking speed by adding said preferred walking speed to walking speed noise;
   determining an amount of work dependent upon a walking speed and said preferred instantaneous walking speed.

14. A method according to claim 1, wherein the determining of said preferred step comprises:
- minimising said first dissatisfaction function in respect of step length;
- minimising said first dissatisfaction function in respect of step orientation;
- thereby to obtain a preferred step length and a preferred step orientation.

15. A method according to claim 1, wherein the determining of whether said preferred step is feasible comprises determining a discomfort function for expressing a cost arising from said autonomous entity having to keep a distance which is less than a preferred distance from an obstruction.

16. A method according to claim 1, further comprising
- providing a preferred clearance tolerance for said autonomous entity; and
- determining said personal space around said autonomous entity in dependence upon said preferred clearance tolerance.

17. A method according to claim 16, further comprising:
- determining a density of neighbouring entities and
- determining said personal space around said autonomous entity in dependence upon said preferred clearance tolerance and said density of neighbouring entities.

18. A method according to claim 16, further comprising:
- providing information relating to velocity of said autonomous entity; and
- determining an angular dependency for said personal space in dependence upon said velocity.

19. A method according to claim 1, wherein said considering of whether obstructions infringe said personal space comprises:
- determining whether said personal space is infringed at a first position along said preferred step and
- determining whether said personal space is infringed at a second position along said preferred step.

20. A method according to claim 19, wherein said considering of whether obstructions infringe said personal space further comprises:
- determining whether said personal space is infringed at a third position along said preferred step.

21. A method according to claim 1, wherein if said preferred step is not feasible, then the method further comprises:
- determining a region in which to seek a compromise step.

22. A method according to claim 21, wherein the determining of said region comprises defining an arc.

23. A method according to claim 1, further comprising:
- determining a set of attributes for said autonomous entity in dependence upon said profile.

24. A method according to claim 23, wherein the determining of said set of attributes comprises:
- determining at least one attribute at a time of generating said autonomous entity.

25. A method according to claim 23, further comprising:
- modifying at least one attribute of said set of attributes for said autonomous entity.

26. A method according to claim 1, wherein providing said profile for said autonomous entity comprises:
- basing said profile on a set of measured attributes.

27. A method according to claim 1, wherein providing said profile for said autonomous entity comprises:
- statistically assigning said profile.

28. A method according to claim 1, wherein providing said profile for said autonomous entity comprises:
- providing said profile in dependence upon at least one aspect of said environment.

29. A method according to claim 1, wherein providing said provisional path through said model of the environment from said current location to said intended destination comprises:
- determining a bearing from said current location to said intended destination.

30. A method according to claim 1, further comprising:
- providing a preferred clearance tolerance for said autonomous entity; and
- determining said personal space around said autonomous entity in dependence upon said preferred clearance tolerance.

31. A method according to claim 30, comprising:
- determining a density of neighbouring entities and
- determining said personal space around said autonomous entity in dependence upon said preferred clearance tolerance and said density of neighbouring entities.

32. A method according to claim 30, comprising:
- providing information relating to velocity of said autonomous entity; and
- determining an angular dependency for said personal space in dependence upon said velocity.

33. A method according to claim 1, further comprising:
- determining said preferred step towards said intended destination while minimising deviation from a preferred speed.

34. A method according to claim 1, further comprising:
- determining said preferred step towards said intended destination while maintaining at least a minimum distance from obstacles.

35. A method according to claim 1, further comprising:
- defining a neighbourhood;
- scanning said neighbourhood for obstacles;
- determining at least one condition relating to said obstacles and
- defining an area in which to seek a step towards said destination in dependence upon said at least one condition.

36. A method according to claim 35, wherein determining said at least one condition relating to said obstacles comprises:
- determining a density of one type of obstacle.

37. A method according to claim 35, wherein defining said area in which to seek a step towards said destination comprises:
- establishing an angular range for a search.

38. A method according to claim 35, wherein defining said area in which to seek a step towards said destination comprises:
- determining to which side of a preferred direction to search.

39. A method of designing a building structure, the method comprising:
- providing a model of said building structure;
- simulating movement of at least one autonomous entity through said building structure; and
- revising said model of said building structure in dependence upon movement of said at least one autonomous entity, wherein the simulating of the movement comprises:
- providing a provisional path through said model of the building structure from a current location to an intended destination;
- providing a profile for said autonomous entity;
- determining a preferred step towards said intended destination based upon said profile and said provisional path, wherein determining said preferred step comprises determining a first dissatisfaction function for expressing a cost of taking a step comprising a sum of an inconvenience function for expressing a cost of deviating from a given direction and a frustration function for expressing a cost of deviating from a given speed;

determining a personal space around said autonomous entity;

determining whether said preferred step is feasible by considering whether obstructions infringe said personal space; and recording a feasible preferred step so as to allow movement of said autonomous entity to be determined.

40. A method of simulating movement of an autonomous entity through an environment from a current location to an intended destination, the method comprising:

providing a provisional path through a model of the environment from a current location to an intended destination;

providing a profile for said autonomous entity;

determining a preferred step towards said intended destination based upon said profile and said provisional path;

determining a personal space around said autonomous entity;

determining whether said preferred step is feasible by considering whether obstructions infringe said personal space;

recording a feasible preferred step so as to allow movement of said autonomous entity to be determined; and if said preferred step is not feasible, determining a compromise step and recording the compromise step so as to allow movement of said autonomous entity to be determined, wherein determining a compromise step includes:

defining a neighbourhood;

scanning said neighbourhood for obstacles;

determining at least one condition relating to said obstacles and defining an area in which to seek a step towards said destination in dependence upon said at least one condition.

41. A computer program tangibly embodied on a computer-readable medium, the computer program comprising computer executable instructions for a method of simulating movement of an autonomous entity through an environment, the method comprising:

providing a provisional path through a model of the environment from a current location to an intended destination;

providing a profile for said autonomous entity;

determining a preferred step towards said intended destination based upon said profile and said provisional path, wherein determining said preferred step comprises determining a first dissatisfaction function for expressing a cost of taking a step comprising a sum of an inconvenience function for expressing a cost of deviating from a given direction and a frustration function for expressing a cost of deviating from a given speed;

determining a personal space around said autonomous entity;

determining whether said preferred step is feasible by considering whether obstructions infringe said personal space; and recording a feasible preferred step so as to allow movement of said autonomous entity to be determined.

42. A computer-readable medium storing a computer program comprising computer executable instructions for a method of simulating movement of an autonomous entity through an environment, the method comprising:

providing a provisional path through a model of the environment from a current location to an intended destination;

providing a profile for said autonomous entity;

determining a preferred step towards said intended destination based upon said profile and said provisional path, wherein determining said preferred step comprises determining a first dissatisfaction function for expressing a cost of taking a step comprising a sum of an inconvenience function for expressing a cost of deviating from a given direction and a frustration function for expressing a cost of deviating from a given speed;

determining a personal space around said autonomous entity;

determining whether said preferred step is feasible by considering whether obstructions infringe said personal space; and recording a feasible preferred step so as to allow movement of said autonomous entity to be determined.

43. Apparatus configured to perform a method of simulating movement of an autonomous entity through an environment, the method comprising:

providing a provisional path through a model of the environment from a current location to an intended destination;

providing a profile for said autonomous entity;

determining a preferred step towards said intended destination based upon said profile and said provisional path, wherein determining said preferred step comprises determining a first dissatisfaction function for expressing a cost of taking a step comprising a sum of an inconvenience function for expressing a cost of deviating from a given direction and a frustration function for expressing a cost of deviating from a given speed;

determining a personal space around said autonomous entity;

determining whether said preferred step is feasible by considering whether obstructions infringe said personal space; and recording a feasible preferred step so as to allow movement of said autonomous entity to be determined.

44. Apparatus for simulating movement of an autonomous entity through an environment, the apparatus comprising:

means for providing a provisional path through a model of the environment from a current location to an intended destination;

means for providing a profile for said autonomous entity;

means for determining a preferred step towards said intended destination based upon said profile and said provisional path; said determining means configured to determine a first dissatisfaction function for expressing a cost of taking a step comprising a sum of an inconvenience function for expressing a cost of deviating from a given direction and a frustration function for expressing a cost of deviating from a given speed;

means for determining a personal space around said autonomous entity;

means for determining whether said preferred step is feasible by considering whether obstructions infringe said personal space.

45. Apparatus for simulating movement of an autonomous entity through an environment, the apparatus comprising:

means for providing a provisional path through a model of the environment from a current location to an intended destination;

means for providing a profile for said autonomous entity;
means for determining a preferred step towards said intended destination based upon said profile and said provisional path;
means for determining a personal space around said autonomous entity;
means for determining whether said preferred step is feasible by considering whether obstructions infringe said personal space and, if said preferred step is not feasible, for determining a compromise step,
wherein said means for determining a compromise step includes:
means for defining a neighbourhood;
means for scanning said neighbourhood for obstacles;
means for determining at least one condition relating to said obstacles; and
means for defining an area in which to seek a step towards said destination in dependence upon said at least one condition.

46. Apparatus for simulating movement of an autonomous entity through an environment, the apparatus comprising:
an interface for providing a provisional path through a model of the environment from a current location to an intended destination and for providing a profile for said autonomous entity;
a processor for determining a preferred step towards said intended destination based upon said profile and said provisional path, wherein said processor is configured to determine a first dissatisfaction function for expressing a cost of taking a step comprising a sum of an inconvenience function for expressing a cost of deviating from a given direction and a frustration function for expressing a cost of deviating from a given speed;
said processor determining a personal space around said autonomous entity; and
said processor determining whether said preferred step is feasible by considering whether obstructions infringe said personal space.

47. Apparatus for simulating movement of an autonomous entity through an environment, the apparatus comprising:
an interface for providing a provisional path through a model of the environment from a current location to an intended destination and for providing a profile for said autonomous entity;
a processor for determining a preferred step towards said intended destination based upon said profile and said provisional path, for determining a personal space around said autonomous entity, and for determining whether said preferred step is feasible by considering whether obstructions infringe said personal space and, if said preferred step is not feasible, for determining a compromise step,
wherein said processor is configured define a neighbourhood, scan said neighbourhood for obstacles, determine at least one condition relating to said obstacles; and define an area in which to seek a step towards said destination in dependence upon said at least one condition.

* * * * *